US011892311B2

United States Patent
Lee et al.

(10) Patent No.: US 11,892,311 B2
(45) Date of Patent: Feb. 6, 2024

(54) IMAGE PROCESSING APPARATUS, IMAGE PROCESSING METHOD, COMPUTER PROGRAM AND COMPUTER READABLE RECORDING MEDIUM

(71) Applicant: THINKWARE CORPORATION, Seongnam-si (KR)

(72) Inventors: Ki Wook Lee, Seongnam-si (KR); Hye Kyung Byun, Seongnam-si (KR); Tae Kyu Han, Seongnam-si (KR); Shin Hyoung Kim, Seongnam-si (KR); Jeong Kyu Kang, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 188 days.

(21) Appl. No.: 17/464,953

(22) Filed: Sep. 2, 2021

(65) Prior Publication Data
US 2021/0396537 A1    Dec. 23, 2021

Related U.S. Application Data

(63) Continuation-in-part of application No. 17/308,105, filed on May 5, 2021, now Pat. No. 11,609,101, (Continued)

(30) Foreign Application Priority Data

Nov. 26, 2016  (KR) .......................... 10-2016-0158832
Nov. 8, 2017   (KR) .......................... 10-2017-0148115

(51) Int. Cl.
G01C 21/36    (2006.01)
G06F 16/23    (2019.01)
(Continued)

(52) U.S. Cl.
CPC ....... *G01C 21/3602* (2013.01); *G01C 21/005* (2013.01); *G01C 21/32* (2013.01);
(Continued)

(58) Field of Classification Search
CPC ...... G01C 21/36; G01C 21/005; G01C 21/32; G06T 1/0007; G06T 5/50; G01S 5/16
See application file for complete search history.

(56) References Cited

U.S. PATENT DOCUMENTS 5,555,312 A    9/1996   Shima et al.
6,047,234 A    4/2000   Cherveny et al.
(Continued)

FOREIGN PATENT DOCUMENTS

CN    105260988 A    1/2016
JP    2002-243469 A  8/2002
(Continued)

OTHER PUBLICATIONS

Notice of Allowance dated Nov. 23, 2022, issued in U.S. Appl. No. 17/308,105. (22 pages).
(Continued)

Primary Examiner — Tan Q Nguyen
(74) Attorney, Agent, or Firm — WHDA, LLP

(57) ABSTRACT

Disclosed is an image processing method. The method includes the steps of receiving an image obtained from a plurality of vehicles positioned on a road, storing the received images according to acquisition information of the received images; determining a reference image and a target image based on images having the same acquisition information among the stored images, performing an image registration using a plurality of feature points extracted from each of the determined reference image and target image, performing a transparency process for each of the reference image and the target image performed with the image
(Continued)

registration, extracting static objects from the transparency-processed image, and comparing the extracted static objects with objects on an electronic map pre-stored to updating the electronic map data, when the objects on the electronic map data pre-stored are different from the extracted static objects.

18 Claims, 40 Drawing Sheets

Related U.S. Application Data which is a continuation of application No. 17/011,610, filed on Sep. 3, 2020, now Pat. No. 11,365,979, which is a continuation of application No. 16/226,759, filed on Dec. 20, 2018, now Pat. No. 10,794,718, which is a continuation of application No. 15/822,705, filed on Nov. 27, 2017, now Pat. No. 10,197,413.

(51) Int. Cl.
  *G06T 7/20* (2017.01)
  *G06T 7/254* (2017.01)
  *G01C 21/32* (2006.01)
  *G01C 21/00* (2006.01)
  *G06T 1/00* (2006.01)
  *G06T 5/50* (2006.01)
  *G01S 5/16* (2006.01)

(52) U.S. Cl.
  CPC ............ *G06F 16/23* (2019.01); *G06T 1/0007* (2013.01); *G06T 5/50* (2013.01); *G06T 7/20* (2013.01); *G06T 7/254* (2017.01); *G01S 5/16* (2013.01); *G06T 2207/10004* (2013.01); *G06T 2207/20221* (2013.01); *G06T 2207/30252* (2013.01)

(56) References Cited

U.S. PATENT DOCUMENTS

| | | | |
|---|---|---|---|
| 6,789,015 B2 | 9/2004 | Tsuji et al. | |
| 7,089,110 B2 | 8/2006 | Pechatnikov et al. | |
| 7,356,408 B2 | 4/2008 | Tsuchiya et al. | |
| 8,605,947 B2 | 12/2013 | Zhang et al. | |
| 10,068,373 B2 | 9/2018 | Lee et al. | |
| 2004/0143380 A1 | 7/2004 | Stam et al. | |
| 2006/0195858 A1 | 8/2006 | Takahashi et al. | |
| 2007/0088497 A1* | 4/2007 | Jung | G01C 21/3647 348/113 |
| 2008/0243383 A1 | 10/2008 | Lin | |
| 2013/0114893 A1 | 5/2013 | Alakuijala | |
| 2014/0297185 A1 | 10/2014 | Lindner | |
| 2015/0284010 A1 | 10/2015 | Beardsley et al. | |
| 2020/0018821 A1* | 1/2020 | Matsuo | G01S 7/2923 |
| 2021/0133465 A1* | 5/2021 | Akamine | G06V 20/588 |
| 2021/0158779 A1 | 5/2021 | Singh | |
| 2021/0247201 A1* | 8/2021 | Hori | G01C 21/3673 |
| 2021/0279481 A1* | 9/2021 | Son | G08G 1/096783 |

FOREIGN PATENT DOCUMENTS

| | | |
|---|---|---|
| JP | 2008-235989 A | 10/2008 |
| WO | 2009059766 A1 | 5/2009 |

OTHER PUBLICATIONS

Office Action dated Apr. 21, 2022, issued in KR Application No. 10-2017-0148115 (counterpart to U.S. Appl. No. 17/011,610), with English translation. (6 pages).
Notice of Allowance dated Feb. 24, 2022, issued in U.S. Appl. No. 17/011,610. (17 pages).
Aparna Taneja et al.: "Image Based Detection of Geometric Changes in Urban Environments"; 2011 IEEE International Conference on Computer Vision (ICCV); Jun. 11, 2011; pp. 2336-2343.
Emanuele Palazzolo et al.: "Change Detection in 3D Model Based on Camera Images", IEEE Transactions on Consumer Electronics; Jan. 1, 2011; pp. 1465-1470.
Office Action dated Apr. 30, 2021, issued in CN application No. 201711203339.1 with English translation. (26 pages).

\* cited by examiner

IMAGE PROCESSING APPARATUS, IMAGE PROCESSING METHOD, COMPUTER PROGRAM AND COMPUTER READABLE RECORDING MEDIUM

CROSS-REFERENCE TO RELATED APPLICATION

This application is a continuation-in-part application of U.S. application Ser. No. 17/308,105 filed on May 5, 2021, which is a continuation application of U.S. application Ser. No. 17/011,610 filed on Sep. 3, 2020, which is a continuation application of U.S. application Ser. No. 16/226,759 filed on Dec. 20, 2018 which is a continuation application of U.S. application Ser. No. 15/822,705 filed on Nov. 27, 2017, which claims priority to Korean Patent Application Nos. 10-2016-0158832 filed on Nov. 26, 2016, and 10-2017-0148115 filed on Nov. 8, 2017, with the Korean Intellectual Property Office, the entire disclosures of which are incorporated herein by reference.

BACKGROUND OF THE INVENTION

1. Field of the Invention

The present invention relates to an image processing apparatus, an image processing method, a computer program, and a computer readable recording medium, and more particularly, to an image processing apparatus, an image processing method, a computer program, and a computer readable recording medium for providing a map having high accuracy using images obtained through cameras.

2. Description of the Related Art

Although automakers are recently trying to implement an autonomous vehicle with a higher level of advanced driver assistance system (ADAS), they are facing limitations due to the technical problems of conventional systems using sensors such as cameras and radar. In order to overcome such a limitation, the automakers try to find a solution utilizing additional information system to implement the autonomous vehicle, and an example of the representative additional information system is a detailed map.

The detailed map refers to a map including information on positions and types of all fixed objects on the road, and the detailed map serves to complement performance of the sensor in a situation in which it is difficult for the sensor to normally operate. In a case in which information of the sensor is not correct due to obstacles or bad weather, the vehicle may complement the incorrect information by utilizing information of the detailed map.

Since the detailed map should provide information on the positions and types of all fixed geographic features on the road, it is important to quickly reflect accuracy of the map and changes of an actual road and the geographic features. However, when it is difficult to know the accurate information on the types of fixed geographic features due to the geographic features covered by a moving object, or changes in a road environment such as an installation of a traffic light, extending/closing of the road, a change in lane information, and the like occur, there is a problem that such information is not quickly reflected on the actual map. Therefore, a method capable of solving such a problem is required.

SUMMARY

An aspect of the present invention may provide an image processing apparatus, an image processing method, a computer program, and a computer readable recording medium for creating a map.

An aspect of the present invention may also provide an image processing apparatus, an image processing method, a computer program, and a computer readable recording medium for creating map data using images obtained by a camera mounted in a vehicle.

An aspect of the present invention may also provide an image processing apparatus, an image processing method, a computer program, and a computer readable recording medium for updating map data using images transmitted from vehicles positioned on a road.

According to an aspect of the present invention, an image processing method may include receiving images obtained from a plurality of vehicles positioned on a road; storing the received images according to acquisition information of the received images; determining a reference image and a target image based on images having the same acquisition information among the stored images; performing an image registration using a plurality of feature points extracted from each of the determined reference image and target image; performing a transparency process for each of the reference image and the target image which are image-registered; extracting static objects from the transparency-processed image; and comparing the extracted static objects with objects on map data which is previously stored and updating the map data when the objects on the map data which is previously stored and the extracted static objects are different from each other.

The performing of the image registration may include extracting the plurality of feature points from each of the determined reference image and target image; and performing the image registration for the determined images using the plurality of extracted feature points.

The plurality of feature points may be points at which image brightness value suddenly changes in the reference image or the target image and may be edges of pixels or corner points.

The transparency process may multiply R, G, and B pixel values of respective pixels included in the images for which the transparency process is to be performed by a predetermined value smaller than 1, and the predetermined value may be a reciprocal number of N, which is a total number of the images for which the transparency process is to be performed.

The acquisition information may include at least one of information on positions at which the images are photographed, information on angles at which the images are photographed, and information on directions in which the images are photographed.

The extracting of the plurality of feature points may include extracting a plurality of first feature points from the reference image; and extracting a plurality of second feature points from the target image.

The performing of the image registration may include performing a matching operation matching a first feature point group in which the plurality of first feature points are grouped and a second feature point group in which the plurality of second feature points are grouped; calculating a homography using information of matched pairs between the first feature point group and the second feature point group through the matching operation; converting the target image using the calculated homography; and registering the reference image and the converted target image.

The updating of the map data may include confirming position information of the extracted static objects; examining whether or not objects different from the extracted static objects exist at a position corresponding to the confirmed position information of the static objects in the map data which is previously stored; and updating the map data by reflecting the extracted static objects to the map data which is previously stored corresponding to the position information, when the different objects exist as a result of the examination.

The image processing method may further include transmitting the updated map data to the plurality of vehicles positioned on the road.

According to another aspect of the present invention, an image processing apparatus may include a receiving unit receiving images obtained from a plurality of vehicles positioned on a road; a storing unit storing the received images according to acquisition information of the received images; a controlling unit determining a reference image and a target image based on images having the same acquisition information among the stored images; and an image processing unit performing an image registration using a plurality of feature points extracted from each of the determined reference image and target image and performing a transparency process for each of the reference image and the target image which are image-registered, wherein the controlling unit extracts static objects from the transparency-processed image, compares the extracted static objects with objects on map data which is previously stored, and updates the map data when the objects on the map data which is previously stored and the extracted static objects are different from each other.

The image processing unit may generate one synthesized image by extracting the plurality of feature points from each of the determined reference image and target image and performing the image registration for the determined images using the plurality of extracted feature points.

The plurality of feature points may be points at which image brightness value suddenly changes in the reference image or the target image and be edges of pixels or corner points.

The transparency process may multiply R, G, and B pixel values of respective pixels included in the images for which the transparency process is to be performed by a predetermined value smaller than 1, and the predetermined value may be a reciprocal number of N, which is a total number of the images for which the transparency process is to be performed.

The acquisition information may include at least one of information on positions at which the images are photographed, information on angles at which the images are photographed, and information on directions in which the images are photographed.

The image processing unit may include a feature point extracting unit extracting a plurality of first feature points from the reference image and extracting a plurality of second feature points from the target image; a feature point matching unit performing a matching operation matching a first feature point group in which the plurality of first feature points are grouped and a second feature point group in which the plurality of second feature points are grouped; a homography calculating unit calculating a homography using information of matched pairs between the first feature point group and the second feature point group through the matching operation; an image registration unit converting the target image using the calculated homography and registering the reference image and the converted target image; and a transparency processing unit performing a transparency process for the registered images.

The controlling unit may confirm position information of the extracted static objects, examines whether or not objects different from the extracted static objects exist at a position corresponding to the confirmed position information of the static objects in the map data which is previously stored, and update the map data by reflecting the extracted static objects to the map data which is previously stored corresponding to the position information, when the different objects exists as a result of the examination.

According to another aspect of the present invention, an image processing method may include selecting images for the same region among a plurality of images photographed by a moving body; performing a transparency process for each of the selected images; registering the transparency-processed images; and determining static objects in the registered image based on transparencies of objects included in the registered image.

In the selecting of the images, images having the same acquisition information for each of the plurality of images may be selected, and the acquisition information may include at least one of information on positions at which the images are photographed, information on angles at which the images are photographed, and information on directions in which the images are photographed.

The determining of the static objects may include calculating standard deviations of a pixel value of the registered image, a pixel value of the reference image, and pixel values of target images for each of pixels; and determining pixels of which the calculated standard deviation is a predetermined value or less as pixels for the static objects and determining pixels of which the calculated standard deviation exceeds the predetermined value as pixels for the dynamic objects.

The image processing method may further include excluding the dynamic objects from the registered image, confirming position information of the static objects in the registered image from which the dynamic objects are excluded, and updating map data based on the position information of the static objects.

According to another exemplary embodiment of the present invention, a computer readable recording medium in which a program for executing an image processing method is recorded may be provided.

According to another exemplary embodiment of the present invention, a computer program stored in a computer readable recording medium to execute an image processing method may be provided.

DETAILED DESCRIPTION

Figure 1:
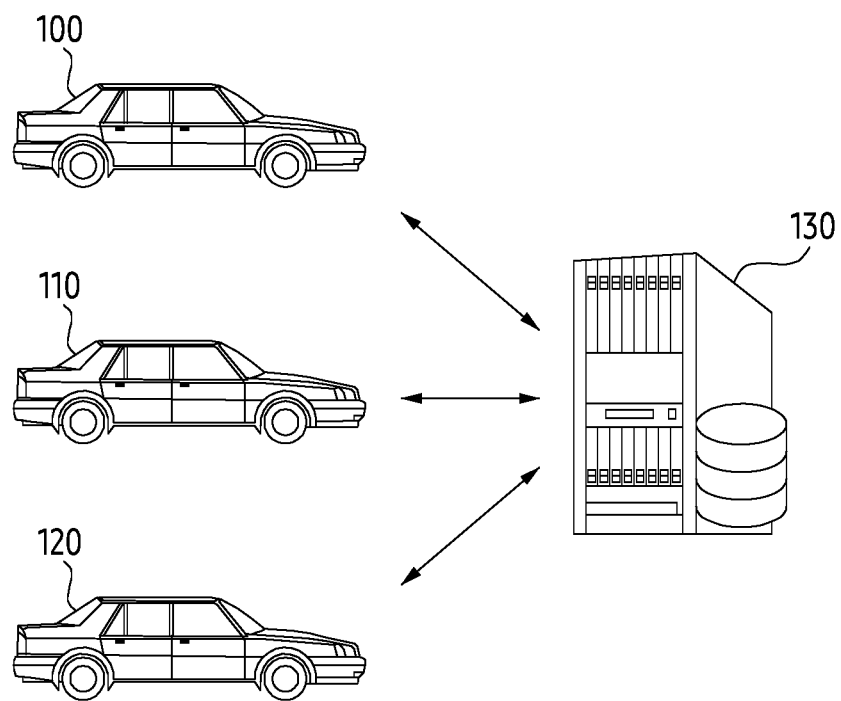
FIG. 1 is a diagram illustrating a map creating system according to an exemplary embodiment of the present invention.

The following description illustrates only a principle of the present invention. Therefore, those skilled in the art may implement the principle of the present invention and devise various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices devised so as to perform the same function regardless of a structure.

Therefore it is to be understood that, for example, a block diagram of the present specification shows a conceptual aspect of an illustrative circuit for embodying a principle of the present invention. Similarly, it is to be understood that all flowcharts, state transition views, pseudo-codes, and the like show various processes that may tangibly embodied in a computer-readable medium and that are executed by computers or processors regardless of whether or the computers or the processors are clearly illustrated.

Functions of various devices including processors or functional blocks represented as concepts similar to the processors and illustrated in the accompanying drawings may be provided by hardware having capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make unclear the gist of the present invention, it will be omitted.

Hereinafter, various exemplary embodiments of the present invention will be described in detail with reference to the accompanying drawings.

FIG. 1 is a diagram illustrating a map creating system 10 according to an exemplary embodiment of the present invention.

Referring to FIG. 1, a map creating system 10 according to the present invention includes first to third vehicles 100, 110, and 120, and an image processing apparatus 130.

The first to third vehicles 100, 110, and 120 are mounted with cameras, which are apparatuses capable of obtaining images, and transmit the obtained images to the image processing apparatus 130 while being positioned on a road. Although FIG. 1 illustrates the vehicles, other means other than the vehicle, for example, a movable means such as a person, a bicycle, a ship, a train, or the like, may also be implemented as long as they may transmit the images obtained by photographing the subjects on the road or around the road to the image processing apparatus 130. Such a movable means will be collectively referred to as a moving body. Hereinafter, a case in which the moving body is the vehicle will be described as an example, for convenience of explanation.

Meanwhile, the subjects described above include fixed static objects that may be reflected in map data such as bridges, buildings, roads, sidewalks, road construction marks, speed bumps, crosswalks, intersections, traffic lights, median strips, bus stops, directional signs, and the like.

Further, the image processing apparatus 130 according to an exemplary embodiment of the present invention may process images received from the first to third vehicles 100, 110, and 120 to create an electronic map, and may transmit the created electronic map to other vehicles positioned on the road including the first to third vehicles 100, 110, and 120.

Further, the image processing apparatus 130 according to an exemplary embodiment of the present invention may also be a map creating server.

Figure 2:
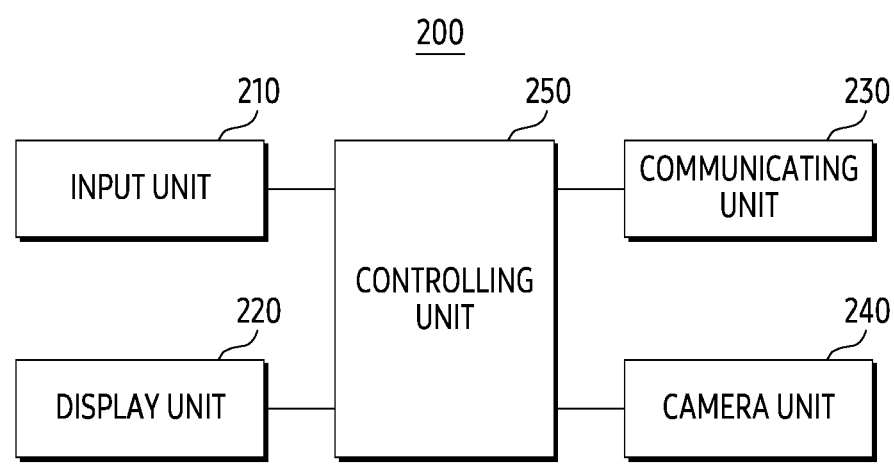
FIG. 2 is a diagram illustrating a block configuration of an electronic apparatus mounted in first to third vehicles according to an exemplary embodiment of the present invention.

FIG. 2 is a diagram illustrating a block configuration of an electronic apparatus 200 mounted in the first to third vehicles 100, 110, and 120 according to an exemplary embodiment of the present invention.

Referring to FIG. 2, an electronic apparatus 200 according to the present invention includes an input unit 210, a communicating unit 230, a camera unit 240, and a controlling unit 250, and may further include a display unit 220. As an example, the electronic apparatus 200, which is an apparatus capable of photographing an image, may be a mobile terminal such as a smartphone including a vehicle video camera or a camera. Further, the electronic apparatus 200 may be embedded in the vehicle so as to be connected to an electronic controller unit (ECU) of the vehicle through controller area network (CAN) communication, and may also be a mobile terminal which may be held in the vehicle such as the smartphone of the user and may transmit and receive data by being connected to a mobile communication system.

The inputting unit 210 may receive a command or the like for performing an operation from the user and may include a key-pad, a dome switch, a touch pad (resistive/capacitive), a jog wheel, a jog switch, a push switch, or the like.

The communicating unit 230 may transmit the image photographed by the camera unit 240 to the image processing apparatus 300, or transmit the photographed image to other communication means included in the vehicle. The communicating unit 230 may perform communication in a wired communication scheme as well as various wireless communication schemes such as Bluetooth, Wi-Fi, wireless broadband, 3rd generation (3G), WCDMA scheme, long term evolution (LTE), and a 4th generation (4G) communication schemes.

The camera unit 240 converts an image signal (e.g., light) received from the outside into a specific electric signal to generate image data. For example, the camera unit 240 may obtain image data of the inside and outside of the vehicle related to the driving of the vehicle.

The display unit 220 may output visual information to the user, and may output a map or an image photographed during the driving. The display unit 220 and the input unit 210 may be integrally formed as a touch panel or a touch screen.

The controlling unit 250 generally controls the electronic apparatus 200, for example, the controlling unit controls the camera unit 240 so as to photograph the image, and transmits the photographed image to the image processing apparatus 130 through the communicating unit 230. In addition, since the controlling unit 250 also transmits acquisition information including at least one of photographed position information of the image, photographed angle information thereof, and photographed direction information thereof when transmitting the image photographed by the camera unit 240 to the image processing unit 300 through the communicating unit 230, the image processing apparatus 300 according to the present invention may classify the received images according to the acquisition information, thereby making it possible to quickly update the map data only for a point at which the static object is changed. Further, the controlling unit 250 may perform a camera calibration process for adjusting camera parameters for the image photographed by the camera unit 240 and transmit it to the image processing apparatus 300 through the communicating unit 230.

Meanwhile, the electronic apparatus 200 mounted in the first to third vehicles 100, 110, and 120 may photograph the object in units of predetermined time, and transmit images of the photographed object to the image processing apparatus 300. As an example, the electronic apparatus 200 may photograph the object in unit of one minute and transmit images of the photographed object to the image processing apparatus 300. Since the images of the photographed object include information on a photographed time and place, the photographed images may be classified by the same place.

Further, according to an exemplary embodiment of the present invention, the controlling unit 250 of the electronic apparatus 200 may correct parameters such as positions, angles, features, and the like of the cameras installed in the respective vehicles through camera calibration. The reason for performing such a camera calibration process is that the photographed place and target of the images photographed by the cameras are the same as each other, but installation heights, angles, and the like of the cameras photographing the respective images are different from each other, and therefore, an image registration may be easily performed only by correcting such characteristic parameters of the camera.

Hereinafter, it is assumed that since the electronic apparatus 200 is mounted in the first to third vehicles 100, 110, and 120, the first to third vehicles 100, 110, and 120 photograph the images and transmit the photographed images to the image processing apparatus 130.

Figure 3:
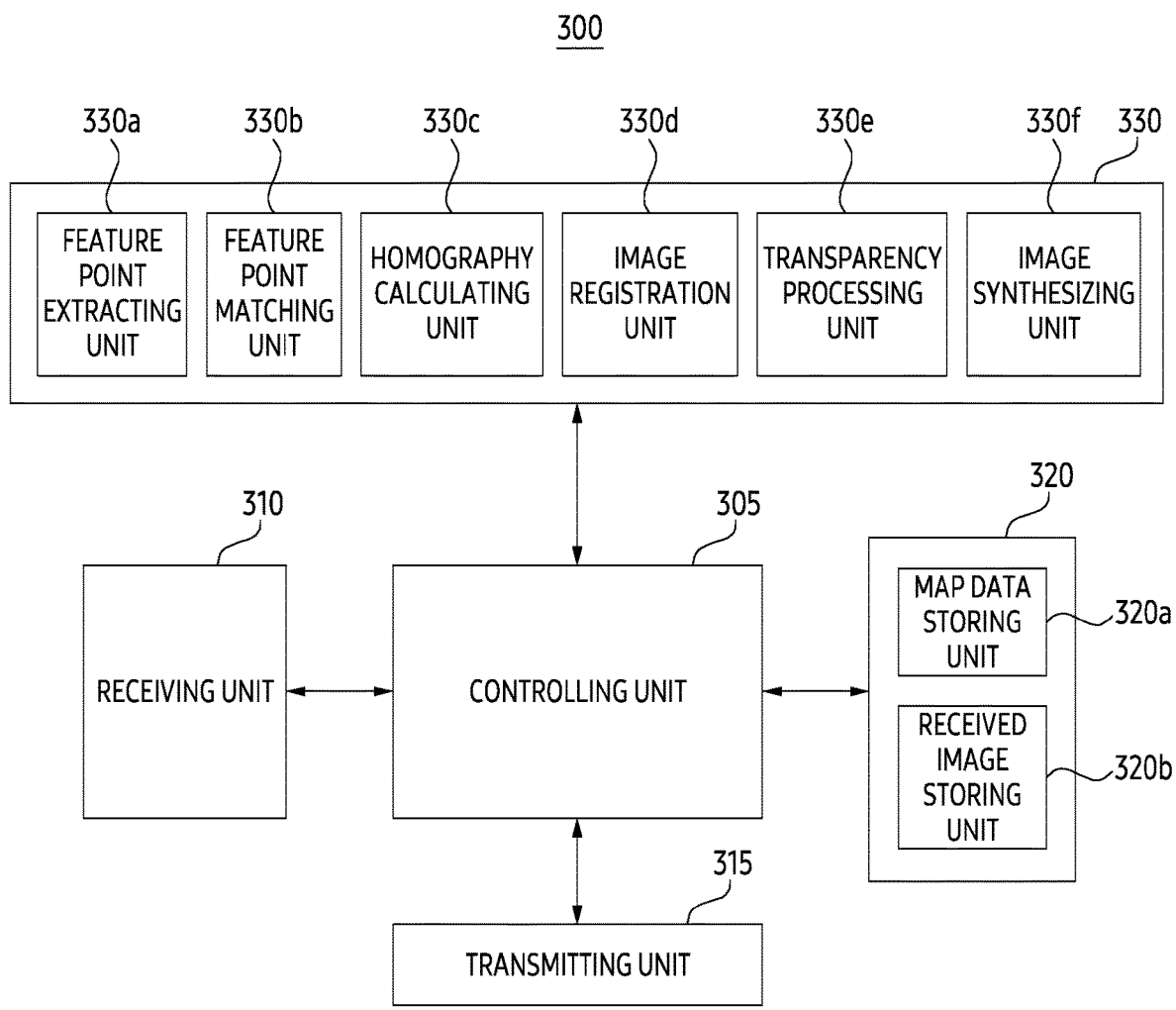
FIG. 3 is a diagram illustrating a block configuration of an image processing apparatus according to an exemplary embodiment of the present invention.

FIG. 3 is a block configuration of an image processing apparatus 300 according to an exemplary embodiment of the present invention. Referring to FIG. 3, the image processing apparatus 300 according to the present invention includes all or some of a controlling unit 305, a receiving unit 310, a transmitting unit 315, a storing unit 320, and an image processing unit 330.

The receiving unit 310 receives images obtained by the cameras mounted in a plurality of vehicles positioned on the road and acquisition information including at least one of information on positions at which the obtained images are photographed, information on angles at which the obtained images are photographed, and information on direction in which the obtained images are photographed through wireless communication such as long term evolution (LTE) or Wi-Fi, or wired communication.

The reason that the receiving unit 310 receives the obtained information other than the images is to allow the controlling unit 305 to easily classify the obtained images for image processing. Specifically, since the images obtained at the same point may have different photographing directions and angles, it is preferable that the controlling unit 305 classifies the images in consideration of the different photographing direction and angles and then performs the image processing according to an exemplary embodiment of the present invention.

For example, when the vehicle enters an intersection, the image processing apparatus 300 according to the exemplary embodiment of the present invention should be able to confirm whether the obtained image is an image obtained while the vehicle enters the intersection in either direction, so that the target images may be accurately selected.

That is, in the case of the intersection of four directions, since the vehicle may obtain the images while entering in the four directions, respectively, it is possible to accurately create or update map data around the intersection only in a case in which the image processing apparatus 300 may distinguish the photographed directions of the respective images.

Further, in a case in which the image processing apparatus 300 according to the exemplary embodiment of the present invention considers the information on the photographed angles of the obtained images, it is possible to create or update the map data through a more accurate image processing.

The transmitting unit 315 transmits the map data updated or the map data stored in the storing unit 320 by the controlling unit 305 to the electronic apparatus 200 of the vehicle of the user or the mobile terminal of the user by a control of the controlling unit 305.

The controlling unit 305 classifies the map data and the images received through the receiving unit 310 according to the obtained information of the received images and stores them in the storing unit 320. The map data is stored in a map data storing unit 320a as map data which is created previously, and the received images are each stored in a received image storing unit 320b. The controlling unit 305 may perform the image processing for images having the same position information, direction information, or the like using the classified and stored images, according to the exemplary embodiment of the present invention. Here, the storing unit 320 may be implemented as an embedded type of storage element such as a random access memory (RAM), a flash memory, a read only memory (ROM), an erasable programmable ROM (EPROM), an electronically erasable and programmable ROM (EEPROM), a register, a hard disk, a removable disk, a memory card, or the like, as well as a removable type of storage element such as a USB memory, or the like.

Such a storing unit 320 may be implemented within the image processing apparatus 300, and may be implemented in a type of external database (DB) server connected to the image processing apparatus 300.

Meanwhile, the controlling unit 305 determines a reference image and a target image based on images having the same obtained information among the images stored in the received image storing unit 320b, performs an image registration using a plurality of feature points extracted from the determined reference image and target image, respectively, and controls the image processing unit 330 so that a transparency process is performed for the image registered images. Here, the reference image refers to an image that is a reference for the image registration, and the target image refers to an image that is a target for the image registration.

Further, the controlling unit 305 registers the images transparency-processed by the image processing unit 330, and controls the image processing unit 330 to detect a static object region from the registered image. In this case, the image processing unit 330 may each calculate standard deviations of a pixel value of the registered image, a pixel value of the obtained reference image, and pixel values of the target images converted according to a homography for each of the pixels, and may detect a static object region from the registered image based on the calculated standard deviation.

In addition, the controlling unit 305 compares detected static objects with objects on the map data which is previously stored, and updates the map data stored in the map data storing unit 320a, when the objects on the map data which is previously stored are different from the extracted static objects.

Meanwhile, the image processing unit 330 may each calculate standard deviations of a pixel value of the registered image, a pixel value of the obtained reference image, and pixel values of the target images converted according to a homography for each of the pixels, and may detect a dynamic static object region from the registered image based on the calculated standard deviation. In this case, the controlling unit 305 may exclude the detected dynamic object from the registered image. In addition, the controlling unit 305 may confirm position information of the static object in the registered image from which the dynamic object is excluded, and may update the map data based on the position information of the static object.

The image processing unit 330 in FIG. 3 calculates a homography by extracting feature points between the obtained images and matching the feature points between the respective images to calculate the matched feature points having common feature points. In addition, the image processing unit 330 registers the images obtained by using the calculated homography.

The image processing unit 330 according to an exemplary embodiment of the present invention includes all or some of a feature point extracting unit 330a, a feature point matching unit 330b, a homography calculating unit 330c, an image registration unit 330d, a transparency processing unit 330e, and an image synthesizing unit 330f.

Here, the image processing unit 330 may be implemented in a separate module using software, hardware, or a combination thereof. As an example, according to a hardware implementation, the image processing unit 330 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

Figure 4:
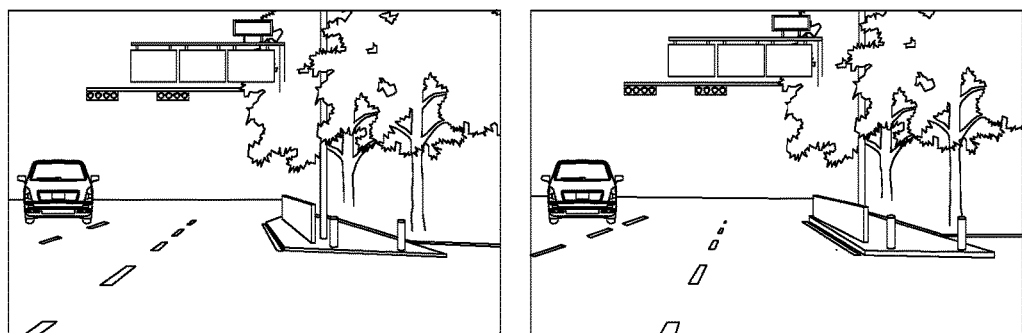
FIG. 4 is a diagram illustrating operations of a feature point extracting unit and a feature point matching unit of an image processing unit according to an exemplary embodiment of the present invention.
Figure 4:
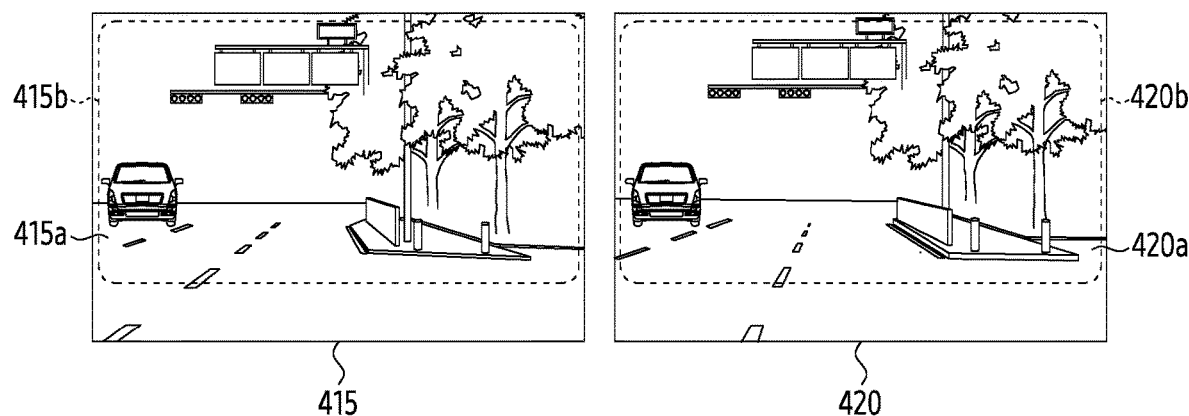
Figure 4:
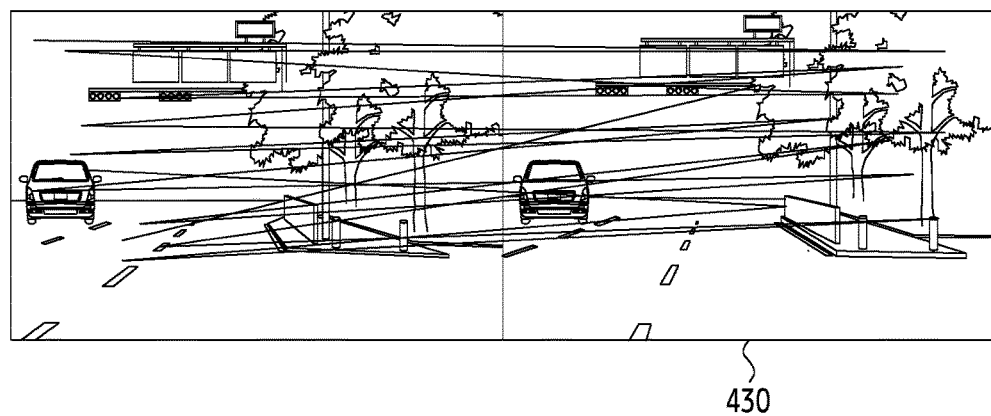
Figure 5:
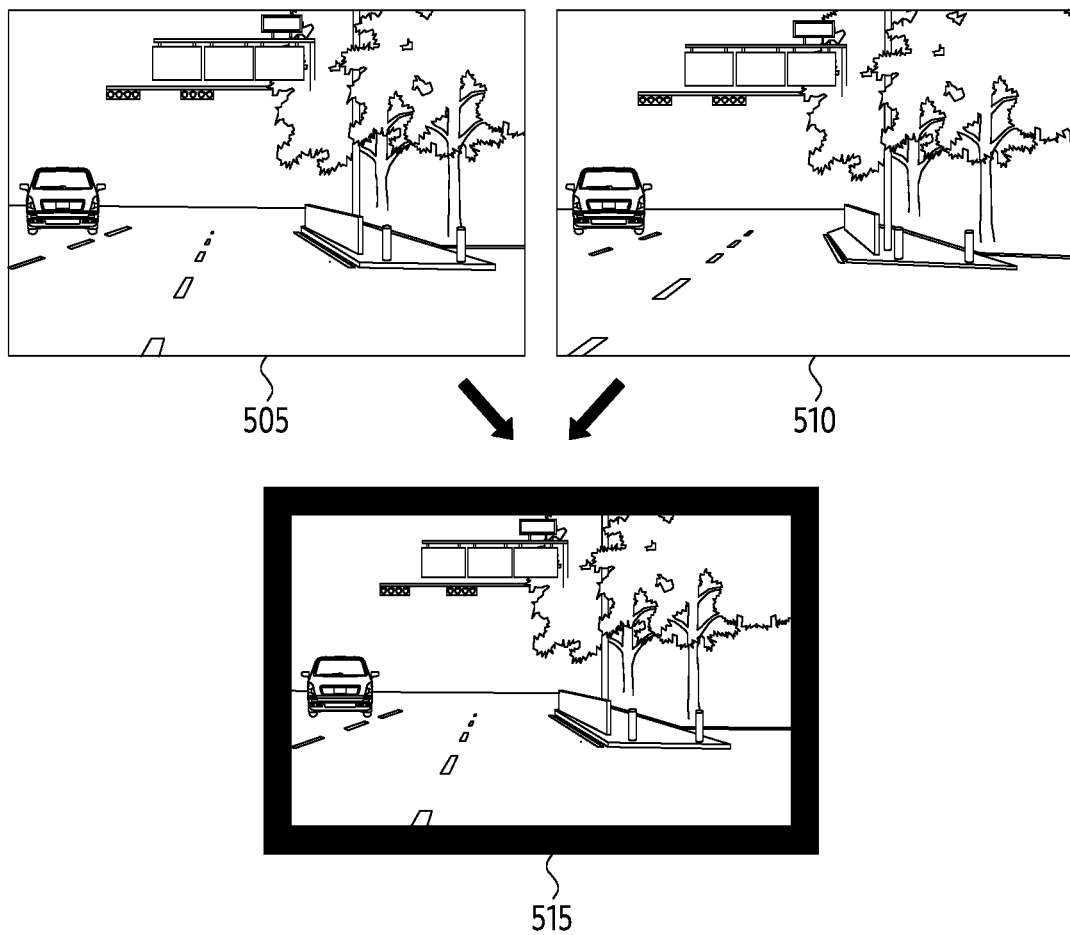
FIG. 5 is a diagram illustrating a process of matching a reference image with a target image according to a feature point matching described in FIG. 4 according to an exemplary embodiment of the present invention.

An operation of the image processing unit 330 according to an exemplary embodiment of the present invention will be described with reference to FIGS. 4 to 12. FIG. 4 is a diagram illustrating operations of a feature point extracting unit 330a and a feature point matching unit 330b of an image processing unit 330 according to an exemplary embodiment of the present invention and FIG. 5 is a diagram illustrating a process of matching a reference image with a target image according to a feature point matching described in FIG. 4 according to an exemplary embodiment of the present invention.

Figure 6:
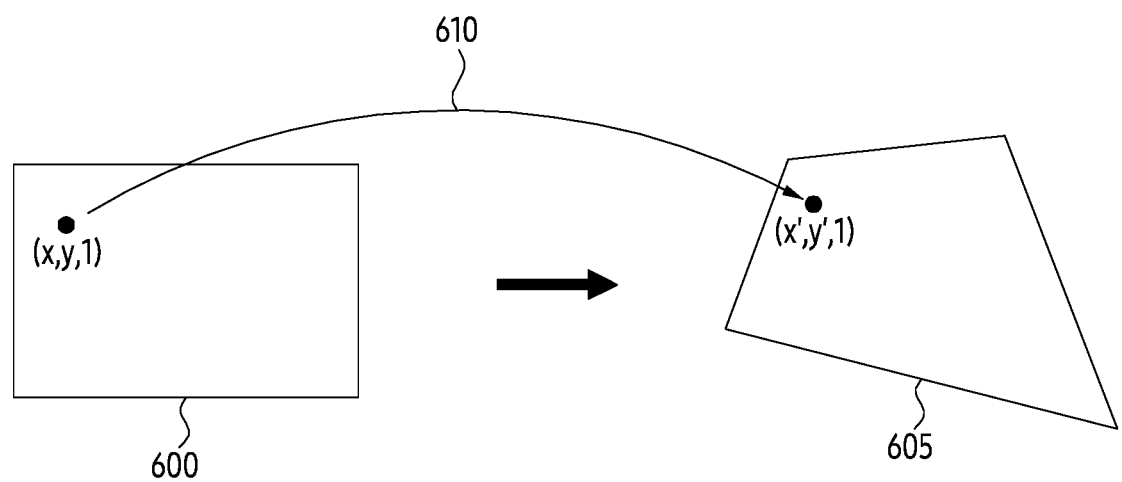
FIG. 6 is a diagram illustrating a matching relationship between the reference image and the target image by a homography calculated by a homography calculating unit of the image processing unit according to an exemplary embodiment of the present invention.

FIG. 6 is a diagram illustrating a matching relationship between the reference image and the target image by a homography calculated by a homography calculating unit 330c of the image processing unit 330 according to an exemplary embodiment of the present invention.

Figure 7:
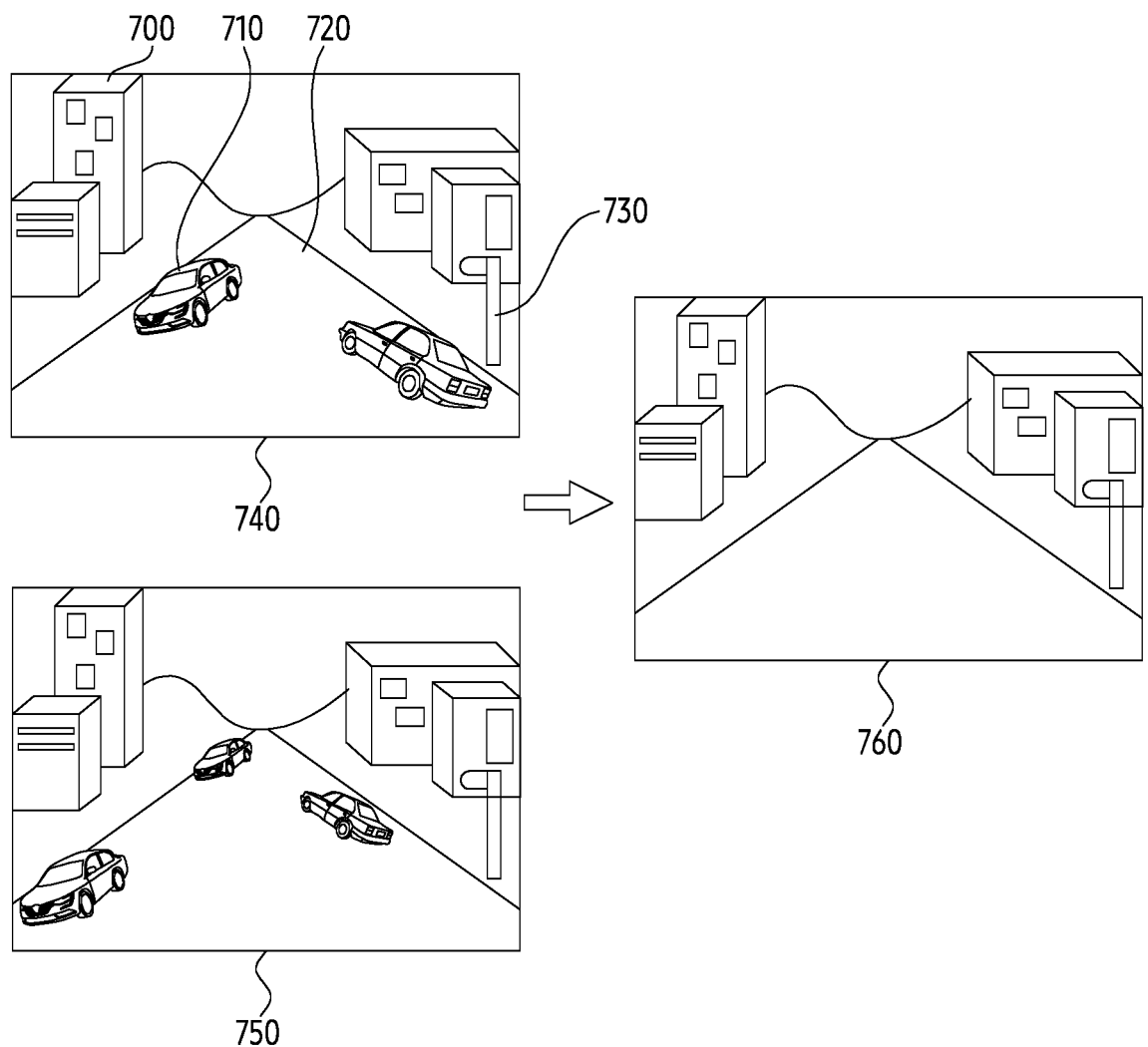
FIG. 7 is a diagram illustrating a distinction between a static object and a dynamic object according to an exemplary embodiment of the present invention.
Figure 8:
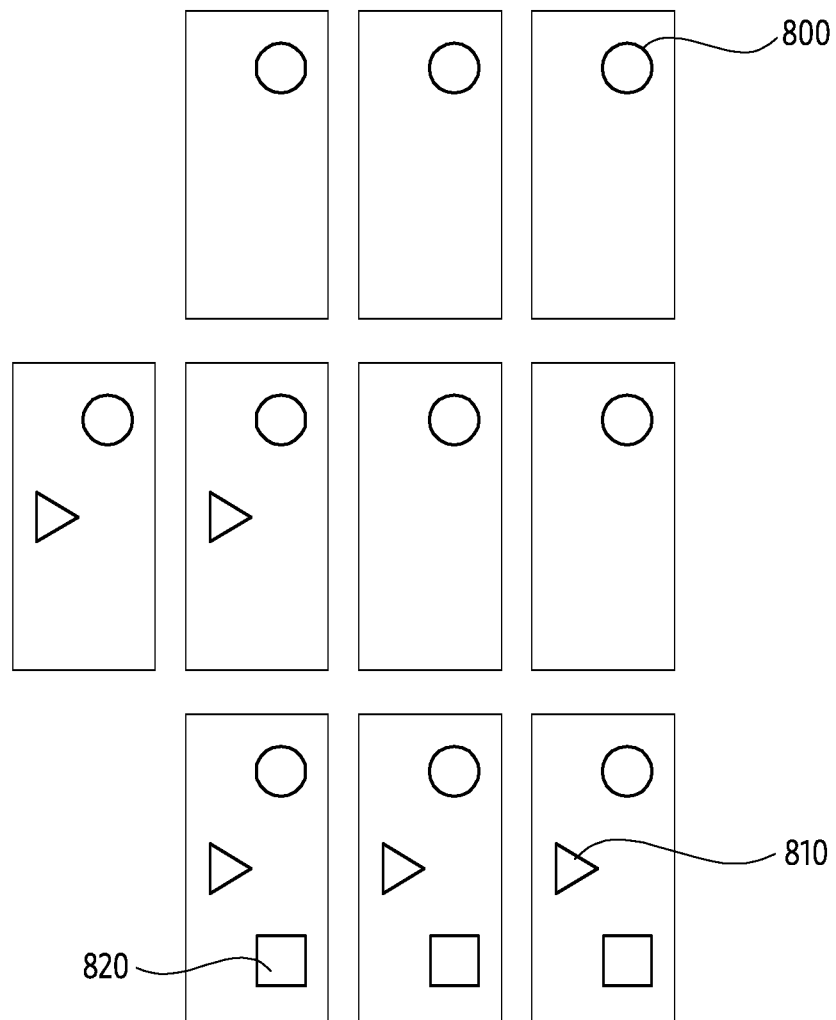
FIGS. 8 to 11 are diagrams illustrating a transparency process according to an exemplary embodiment of the present invention.

FIG. 7 is a diagram illustrating a distinction between a static object and a dynamic object according to an exemplary embodiment of the present invention. FIGS. 8 to 11 are diagrams illustrating a transparency process according to an exemplary embodiment of the present invention.

Figure 12:
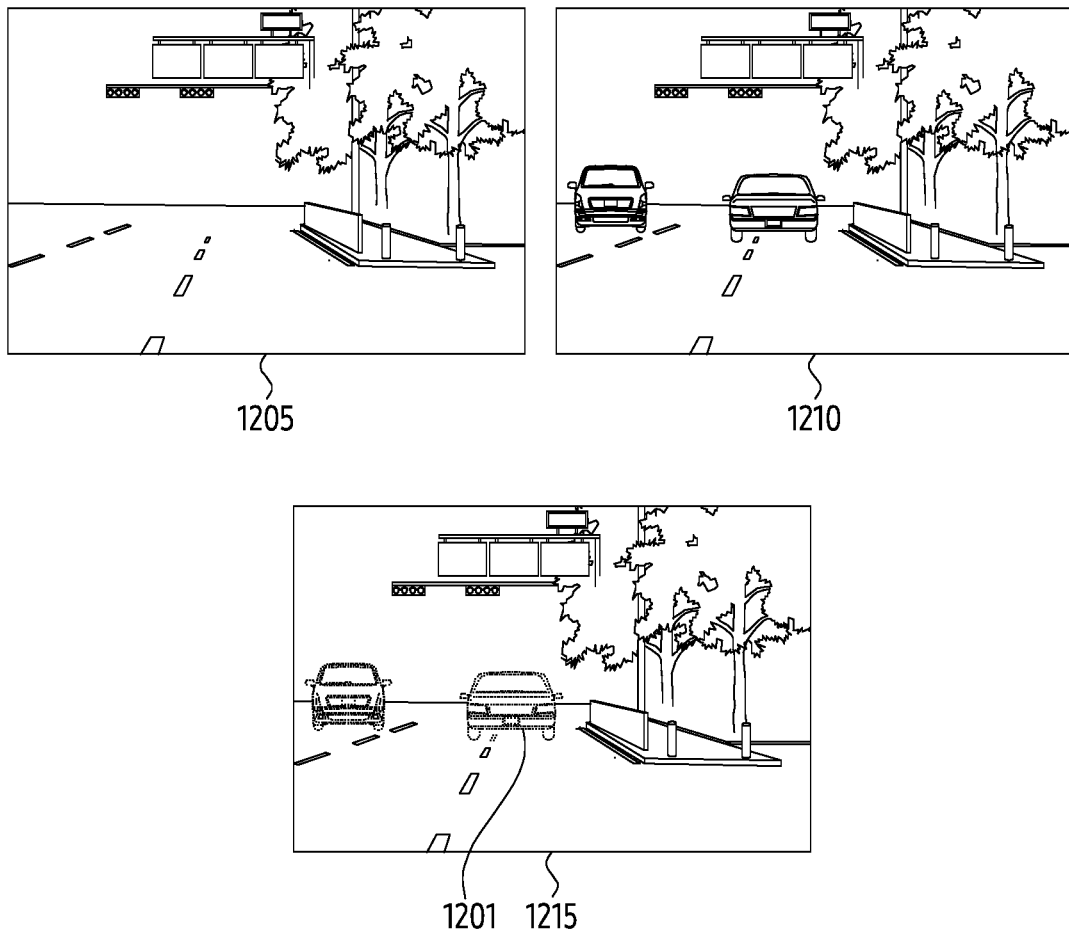
FIG. 12 is a diagram illustrating image processing results for the reference image and the target image according to an exemplary embodiment of the present invention.

FIG. 12 is a diagram illustrating image processing results for the reference image and the target image according to an exemplary embodiment of the present invention. The feature point extracting unit 330a extracts a plurality of feature points from each of the reference image and the target image determined by the controlling unit 305. Here, the plurality of feature points extracted from the reference image and the target image, which are points at which an image brightness value suddenly changes in the reference image or the target image, may be edges of pixels or corner points. Specifically, an operation of extracting the feature points by the feature point extracting unit 330a according to an exemplary embodiment of the present invention will be described with reference to FIG. 4.

In FIG. 4, reference numerals 405 and 410 denote images photographed at the same place and denotes images in which the camera calibration process is completed. It is assumed in FIG. 4 that the image of reference numeral 405 and the image of reference numeral 410 are registered, and accordingly, the image of reference numeral 410 refers to the reference image that is a reference for the image registration, and the image of reference numeral 405 refers to the target image that is a target for the image registration.

In FIG. 4, the feature point extracting unit 330a each extracts the feature points from the reference image 410 and the target image 405, where reference number 415 is a diagram illustrating the feature points extracted from the target image 405, and reference numeral 420 is a diagram illustrating the feature points extracted from the reference image 410.

The feature extraction of the respective images refers to extracting characterized points from the respective images, and as an example, points at which the image brightness value suddenly changes, such as edges of pixels or corner points in the images may correspond to the feature points. As algorithms for extracting the feature points of the respective images, a Harris scheme, a scale invariant feature transform (SIFT) scheme, an oriented fast and rotated brief (ORB) scheme, a features from accelerated segment test (FAST) scheme, and the like may be used.

An image of reference numeral 415 illustrates feature points determined as the feature points in the image of reference numeral 405 by applying the FAST scheme, and an image of reference numeral 425 illustrates feature points determined as the feature points in the image of reference numeral 410 by applying the FAST scheme.

Reference number 415a illustrates one of the feature points extracted from reference numeral 415, and reference numeral 415b illustrates a first feature point group in which the plurality of feature points extracted from reference numeral 415 are grouped. In addition, reference number 420a illustrates one of the feature points extracted from reference numeral 420, and reference numeral 420b illustrates a second feature point group in which the plurality of feature points extracted from reference numeral 420 are grouped.

According to an exemplary embodiment of the present invention, when the feature point extracting unit 330a completes the extraction of the feature points such as reference numerals 415 and 420, the feature point matching unit 330b matches the feature points of the reference image and the target image using the first feature point group 415b extracted from the reference image and the second feature point group 420b extracted from the target image such as reference numeral 430. The feature point matching according to the present invention refers to matching the feature points extracted from the respective images to each other to find common feature points existing between the reference image and the target image, and may use a random sample consensus (RANSAC) scheme. The RANSAC scheme is a method of selecting data in which a consensus is maximally formed by randomly selecting sample data from data, and is a method capable of more accurately matching the feature points by acquiring the data in which error and noise are minimized in the data.

Reference numeral 430 illustrates a matching relationship between the image 415 and the image 420 by matching the extracted feature points between the image 415 on which the feature points extracted from the target image 405 are marked and the image 420 on which the feature points extracted from the reference image 410 are marked. Examples of the method of matching the feature points of the respective images may include a least square method, M-estimator SAC (MSAC), maximum likelihood SAC (MLESAC), locally optimized RANSAC (LO-RANSAC), and the like other than the RANSAC scheme.

When the feature points of the reference image and the feature points of the target image are matched by the feature point matching unit 330b, the homography calculating unit 330c calculates a homography, which is a transformation matrix between the reference image and the target image, using information of matched pairs between the first feature point group 415b and the second feature point group 420b.

The homography is a transformation matrix for matching a target image of a 2D plane to the reference image. In order to determine the homography, at least four matched pointed are required in the respective images, and a relationship matrix H between the matched points is defined as a 3×3 matrix H as in the Equation 1.

$$w\begin{bmatrix} x' \\ y' \\ 1 \end{bmatrix} = \begin{bmatrix} h11 & h12 & h13 \\ h21 & h22 & h23 \\ h31 & h32 & h33 \end{bmatrix} \begin{bmatrix} x \\ y \\ 1 \end{bmatrix}$$ [Equation 1]

Here, x and y denote feature point coordinates of the reference image, and '1' means that the reference image and the target image are homogenous to each other. W, which is a weight, is defined as a constant, not '0'. The 3×3 matrix is the transformation matrix H.

FIG. 6 is a diagram illustrating a matching relationship between the reference image and the target image according to an exemplary embodiment of the present invention. In FIG. 6, reference numeral 600 denotes a reference image, reference numeral 605 denotes a target image, and reference numeral 610 illustrates that a matching relationship between a feature point matrix (x, y, 1) of the reference image and a feature point matrix (x', y', 1) of the target image exists using the calculated homography matrix.

The image registration unit 330d converts the target image 410 to be registered to the reference image 405 using the homography calculated by the homography calculating unit 330c.

Specifically, in FIG. 5, reference numeral 505 denotes the reference image 410 in FIG. 4 and reference numeral 510 denotes an image obtained by converting the target image of reference numeral 405 in FIG. 4 using the homography matrix calculated by the homography calculating unit 330c. In addition, the image registration unit 330d registers the reference image 505 and the converted target image 510 as in reference numeral 515 of FIG. 5. As illustrated in FIG. 5, the image registration unit 330d performs the registration based on the matched feature points of the respective images and naturally registers two different images by blending different images.

The transparency processing unit 330e performs a transparency process for each of the reference image and the target image which are registered by the image registration unit 330d.

Figure 9:
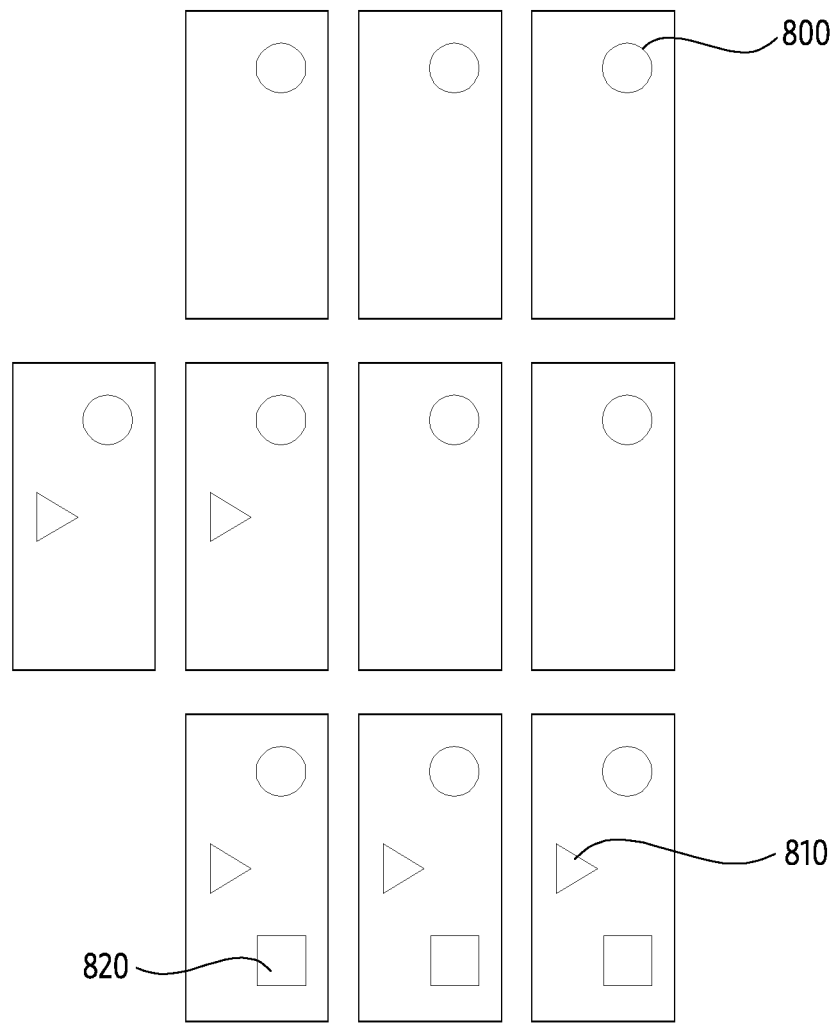
Figure 10:
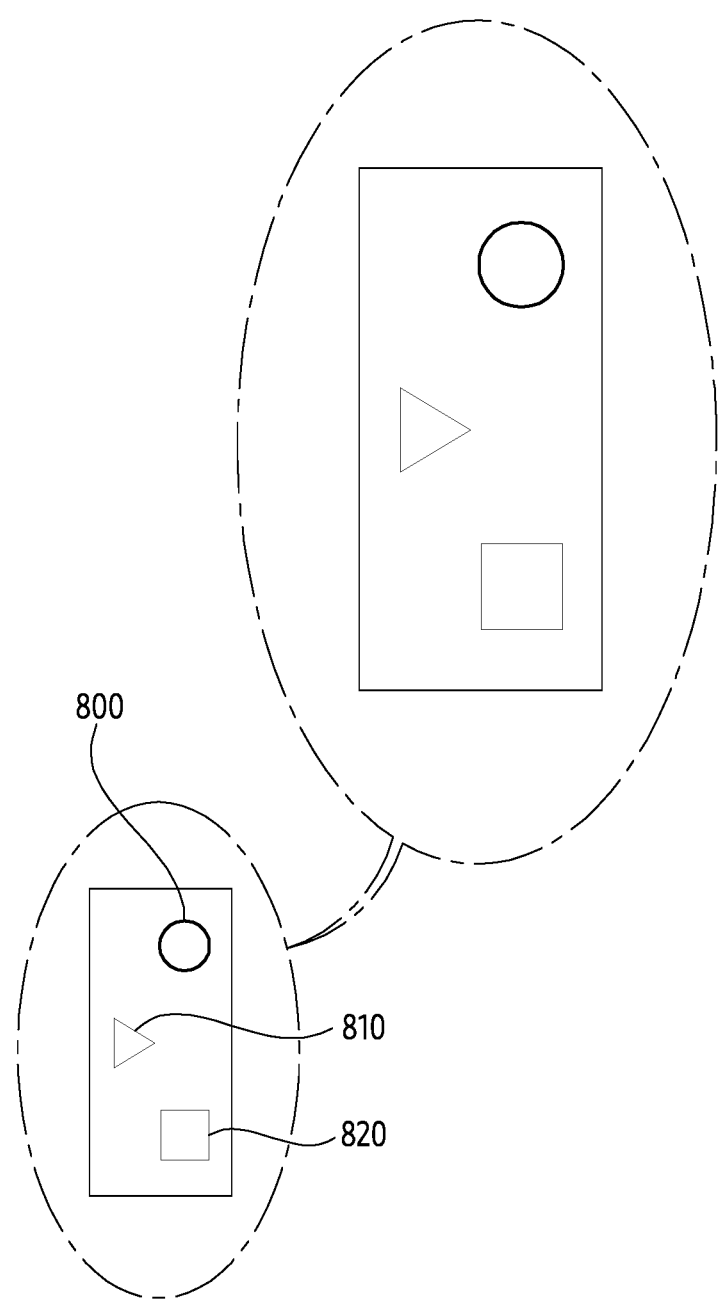

An operation of performing the transparency process by the transparency processing unit 330e according to an exemplary embodiment of the present invention will be described in detail with reference to FIGS. 8 to 11. The transparency process performed by the transparency processing unit 330e according to the present invention may be performed as in a method described in FIGS. 8 to 11. A total of ten images exist in FIG. 8, a first FIG. 800 of a circular shape exists in all of the ten images, a second FIG. 810 of a triangular shape exists in five images, and a third FIG. 820 of a quadrangular shape exists in three images. In this state, when the respective images are converted with a predetermined transparency, pixel values of the first to third FIGS. 800, 810, and 820 decrease as illustrated in FIG. 9, thereby causing a blurring effect. Thereafter, when the respective images which are transparency-processed are overlapped with each other, as illustrated in FIG. 10, the first FIG. 800 has the same clear shape as before the transparency process, but the second FIG. 810 and the third FIG. 820 have lower definition than before the transparency process.

As described above, a method of performing a transparency process for the target image in the transparency processing unit 330e according to an exemplary embodiment of the present invention includes performing an image processing such that a transparency target image has a pixel value smaller than the pixel value of the original image by multiplying each pixel value (0 to 255) of the transparency target image by a predetermined constant. In general, R, G, and B pixel values of each pixel have values of 0 to 255, and when the pixel value has a small value, each pixel is visually blurred, and as a result, the entire image is also blurred.

Figure 11:
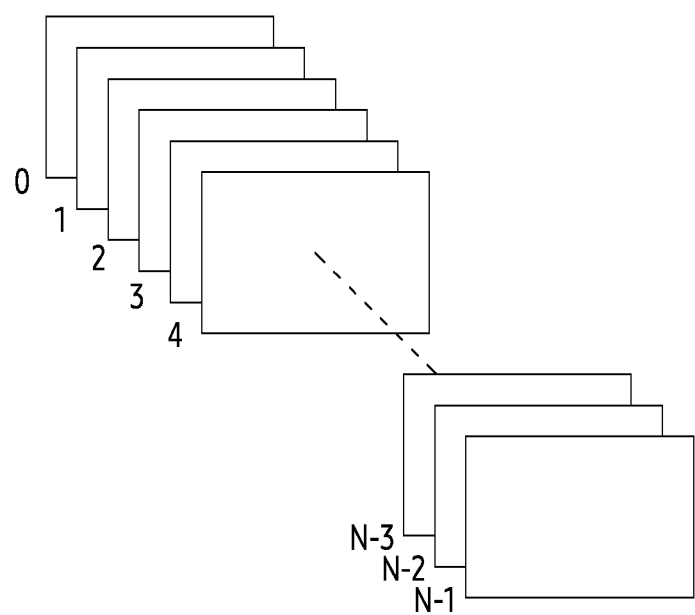

As illustrated in FIG. 11, according to an exemplary embodiment of the present invention, assuming that N images are registered, when it is assumed that transparency of images for which the transparency process is not performed is '1', the transparency process may be performed by multiplying pixel values of the respective image to be transparentized by 1/N. FIG. 9 illustrates transparency of each image of a case of multiplying a pixel of each image by $1/10$ because the total number of transparency target images is ten. Here, in FIG. 11, a 0-th image is the reference image, and first to N−1-th images are the target images converted by the homography.

When the N images transparentized as described above are registered, the static objects existing in each image remain on the registered image as it is, but the dynamic objects disappear. That is, when the respective images are transparentized and then registered, since the pixel corresponding to the static object in each image is in a state in which the transparency multiplied by the same constant is applied, in a case in which the respective pixel values are added, the added pixel value is equal to an original pixel value or is close thereto, and as a result, the respective image also exists on the registered image as it is.

An operation of extracting the static object through the transparency process according to an exemplary embodiment of the present invention will be again described in detail. First, a pixel value for each of pixels of the registered image generated by registering the reference image and the target image converted according to the homography is calculated. Here, the calculated pixel value for each of the pixels of the registered image is equal to an average value of each of pixels of the N registered images.

In addition, standard deviations of the calculated pixel value of the registered image, the pixel value of the obtained reference image, and the pixel values of the converted target images are calculated for each of the pixels. The image processing apparatus 300 according to an exemplary embodiment of the present invention may determine a pixel having a value within a predetermined threshold value among the calculated standard deviations as a pixel configuring the static object.

On the contrary, the image processing apparatus 300 according to an exemplary embodiment of the present invention may determine a pixel having a value exceeding a predetermined threshold value among the calculated standard deviations as a pixel configuring the dynamic object. With such a scheme, the image processing apparatus 300 may classify the static object and the dynamic object from the registered image by calculating the standard deviations of the pixel values of the respective image and the pixel values of the registered image.

As such, the reason that the image processing apparatus 300 may classify the static object and the dynamic object from the average value for each of the pixels of the registered image is because the static object exists per each obtained image and a change of the pixel value for each of the respective images is small, such that the standard deviation of the pixel values included in the static object is lower than a predetermined threshold value.

On the other hand, since the dynamic object does not exist per the obtained image but exists only in some images, a change of the pixel value for each of the respective images is large, and accordingly, the standard deviation of the pixel values included in the dynamic object is higher than the predetermined threshold value. Here, the predetermined threshold value may be determined by an experiment.

In addition, the background other than the roads, the traffic lights, the crosswalks, and the buildings may exist in the static objects extracted according to an exemplary embodiment of the present invention. In this case, according to the present invention, in order to create the map, it is necessary to identify only the static objects to be reflected to the actual road data among the extracted static objects through an additional method, where the extracted static objects may be identified through a deep learning or a machine learning. Therefore, the controlling unit 305 of the image processing apparatus 300 according to an exemplary embodiment of the present invention may separate only the static objects such as the traffic lights, the roads, the crosswalks, and the like necessary to create or update the map data from the extracted static objects through the deep learning or the machine learning.

In FIG. 9, in a case in which the transparency processing unit 330e multiplies the pixel value of each image by 1/10 for the transparency process of each image and registers ten images, it may be confirmed that the first FIG. 800 exists in the same way as before performing the transparency process, but the second and third FIGS. 810 and 820 disappear as compared to before performing the transparency process, as illustrated in FIG. 10. FIG. 10 illustrates a case in which the image registration for ten images is performed, but when an infinite number of images are overlapped, the dynamic objects having a large change of the pixel value between the images will be recognized as nonexistent.

The contents of overlapping the respective images will be described using the Equation 2 below.

$$A(t) = \alpha(A(t-1)) + (1-\alpha)f(t), 1 \le t \le N-1 \quad \text{[Equation 2]}$$

Here, A(t) uses a t−1-th image and a t-th image as average images obtained for t time. Further, α, which is a weight, has a value of 0.5 and refers to add a 50% pixel value of the t−1-th image and a 50% pixel value of the t-th image. Further, f(t) denotes the t-th image.

As an example, the Equation 2 will be applied as follows.

$$A(1) = \alpha f(0) + (1-\alpha)f(1),$$

$$A(2) = \alpha(A(1)) + (1-\alpha)f(2),$$

$$A(3) = \alpha(A(2)) + (1-\alpha)f(3)$$

Further, the image processing apparatus 300 may perform an image processing using the images received in units of predetermined period such as one day or one week, and may perform the image processing using all of the received images or using an arbitrarily selected image. As an example, as illustrated in FIG. 11, if there are N images from 0 to N−1 obtained by photographing a specific region for one day by the first to third vehicles 100, 110, and 120 and transmitted to the image processing apparatus 300, the image processing apparatus 300 may also extract the static objects by performing the transparency process and registration for the entirety of the images from 0 to N−1, and may also extract the static objects only using some of the entirety of the images.

A method of extracting, by the controlling unit 305 of the image processing apparatus 300, the static objects such as the buildings, the roads, and the like from the images transparentized by the transparency processing unit 330e according to the contents described above will be described.

In FIG. 7, reference numerals 740 and 750, which are images photographed at a predetermined time interval in a specific region, are image photographed by the cameras or smart phones mounted in the vehicles. The photographed images include a building 700, a road 720, and a traffic light 730 as the static objects and include vehicles 710 as the dynamic objects. The image processing apparatus 300 may obtain a plurality of images related to the specific region by classifying only the images related to the specific region using acquisition information of the images received from the electronic apparatus 200 for a predetermined time (e.g., 'one day').

In addition, when the image processing apparatus 300 performs the image registration and the transparency process for the received images, the static objects such as the building 700, the road 720, and the traffic light 730 exist as it is, but the dynamic objects such as the vehicles disappear, as illustrated by reference numeral 760. According to an exemplary embodiment of the present invention, as the number of the registered images is increased, the static object and the dynamic object may be more clearly classified when the transparency process is performed.

The image synthesizing unit 330f performs synthesis for the transparency-processed images and transmits the synthesized image to the controlling unit 305.

The storing unit 320 includes a map data storing unit 320a and a received image storing unit 320b. The map data storing unit 320a store map data which is previously created and also store map data which is updated by the controlling unit 305. The received image storing unit 320b stores the image received through the receiving unit 310.

The controlling unit 305 according to an exemplary embodiment of the present invention performs a control so that the images received through the receiving unit 310 are stored in the received image storing unit 320b, and updates the map data when it is necessary to update the stored map data to store the updated map data in the map data storing unit 320a.

In addition, the controlling unit 305 extracts the static objects from the images transparency-processed by the image processing unit 330, compares the extracted static objects with objects on the map data which is previously stored in the map data storing unit 320a, and updates the map data when the objects on the map data which is previously stored and the extracted static objects are different.

Specifically, the controlling unit 305 confirms position information of the extracted static objects and examines whether or not the objects different from the extracted static objects exist at positions corresponding to the position information of the static objects confirmed in the map data which is previously stored. In addition, as a result of the examination, if the different objects exist, the controlling unit 305 reflects the extracted static objects to the map data which is previously stored corresponding to the position information and update the map data to store it in the map data storing unit 320a.

The images received by the image processing apparatus 300 from the vehicles positioned on the road according to an exemplary embodiment of the present invention include fixed geographic features, static objects such as lane information marked on the road such as left turn/right turn, and dynamic objects such as other vehicles positioned on the road, pedestrians, and the like. Therefore, it is important to exclude unnecessary dynamic objects except for the static objects from the images received when the image processing apparatus 300 generates or updates the map data according to an exemplary embodiment of the present invention.

However, since the static objects in the received images are covered by the dynamic objects, a case in which it is difficult for the image processing apparatus 300 to identify the static objects may occur. Therefore, according to an exemplary embodiment of the present invention, in order to solve the above-mentioned problem, the image processing apparatus 300 registers the reference image and the target image, performs the transparency process, and then extracts the static objects.

FIG. 12 is a diagram illustrating an operation of extracting static objects using the obtained images on an actual road according to an exemplary embodiment of the present invention.

In FIG. 12, a right turn lane marking 1201 exists on a road of reference numeral 1205 but a vehicle exists on a road of reference numeral 1210 in which it is difficult to extract the right turn lane marking 1201. In this case, when the image processing is performed according to an exemplary embodiment of the present invention, the vehicle, which is the dynamic object, appears to be dim, but the extraction of the right turn lane marking 1201, which is the static object, may be easily identified, as in reference numeral 1215. Therefore, according to an exemplary embodiment of the present invention, since the image processing apparatus 300 may confirm the right turn marking 1201 existing on the road, it may update the map data so as to reflect the corresponding contents when the right turn marking 1201 does not exist in the map data which is previously created.

The transmitting unit 315 transmits the map data stored in the storing unit 320 or the map data updated by the controlling unit 305 to the electronic apparatus 200 of the vehicle or the smartphone of the user. Further, the transmitting unit 315 may also transmit a message requesting a transmission of images obtained at a current position to the electronic apparatuses 200 of the vehicles.

Further, the exemplary embodiment of the present invention describes that the transparency processing unit 320e performs the transparency process after the image registration is performed by the image registration unit 320d, but is not limited thereto.

According to another exemplary embodiment of the present invention, the transparency processing operation may also be performed after determining the images to be registered by the controlling unit 305, may also be performed after the feature points are extracted, and may also be performed after the homography is calculated.

Figure 13:
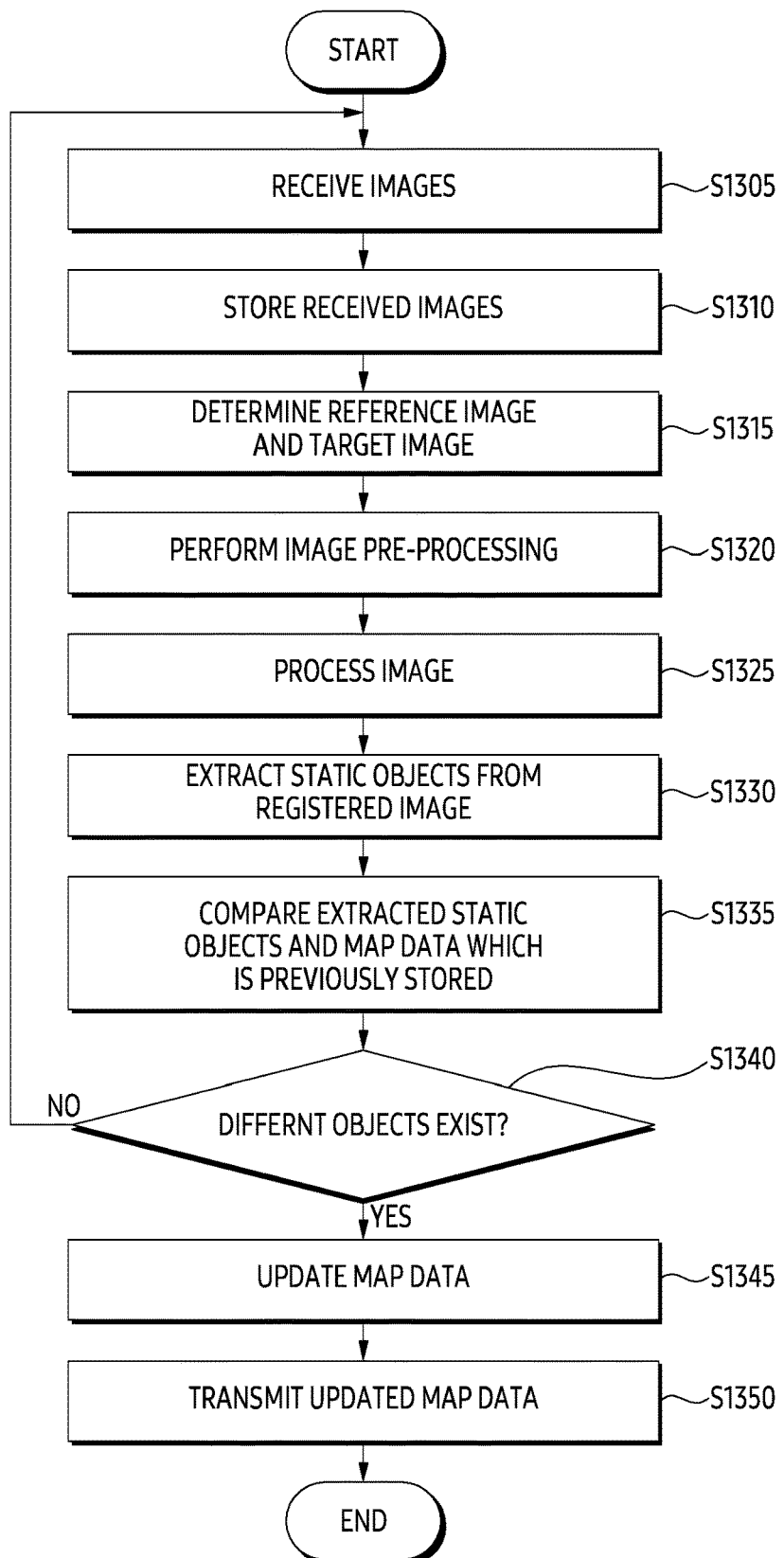
FIG. 13 is a diagram illustrating an operation flow of an image processing apparatus according to an exemplary embodiment of the present invention.

FIG. 13 is an operation flowchart of an image processing apparatus according to an exemplary embodiment of the present invention.

The image processing apparatus 300 receives images in an operation (S1305) and stores the received images in the storing unit in an operation (S1310). In addition, the image processing apparatus 300 determines the reference image and the target image in an operation (S1315) and performs an image pre-processing in an operation (S1320). The image pre-processing operation includes an image processing to unify the color, brightness, and definition of the image so as not to be influenced by recognition of the image and a synthesizing process with other images, and mainly uses functions such as Curves, Levels, Brightness/Contrast, Color Balance, Shadows/Highlight, and the like.

If the image pre-processing operation is completed, the image processing apparatus 300 performs an image processing operation according to an exemplary embodiment of the present invention in an operation (S1325). The image processing operation performed in the operation (S1325) will be descried with reference to FIG. 14.

If the image processing in the operation (S1325) is completed, the image processing apparatus 300 extracts static objects from the registered image in an operation (S1330) and compares the extracted static objects with the map data which is previously store in an operation (S1335). Specifically, the image processing apparatus 300 confirms whether or not objects different from the extracted static objects exist at a position corresponding to position information of the static object confirmed in the map data which is previously stored.

As a result of the confirmation of the operation (S1335), if the objects different from the static objects extracted from the map data which is previously stored exist in an operation (S1340), the image processing apparatus 300 update the map data in an operation (S1345) and transmits the updated map data to the electronic apparatus or the smartphone of the user in an operation (S1350).

Figure 14:
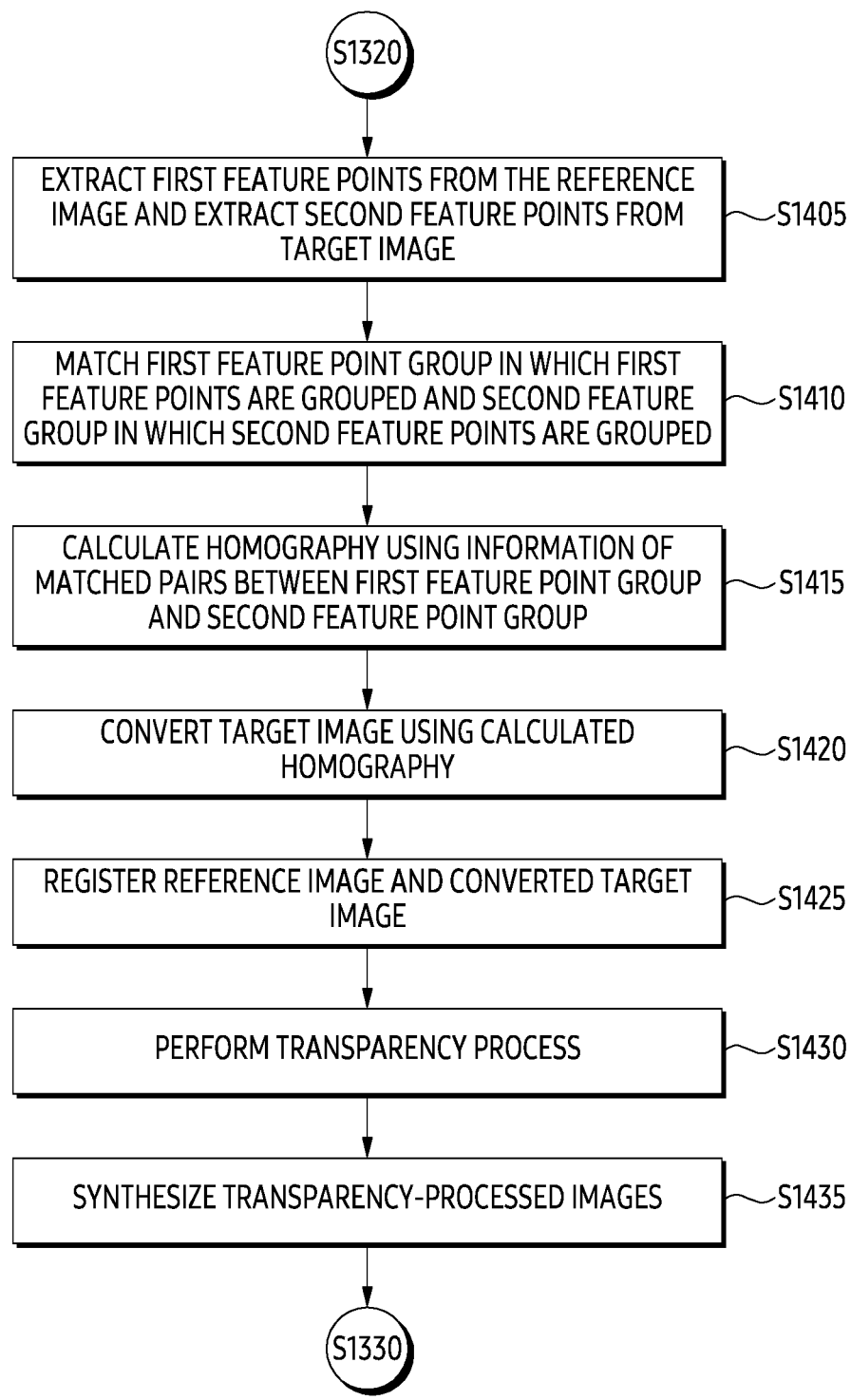
FIG. 14 is a diagram illustrating an operation (S1325) of FIG. 13 in detail.

FIG. 14 is a flowchart illustrating the operation (S1325) of FIG. 13 in detail.

The image processing apparatus 300 extracts first feature points from the reference image and extracts second feature points from the target image in an operation (S1405). In addition, the image processing apparatus 300 matches a first feature point group in which the first extracted feature points are grouped and a second feature point group in which the second extracted feature points are grouped in an operation (S1410), and calculates a homography using information of matched pairs between the first feature point group and the second feature point group in an operation (S1415).

The image processing apparatus 300 converts the target image using the homography calculated in the operation (S1415) in an operation (1420), and registers the reference image and the converted target image in an operation (S1425).

In addition, the image processing apparatus 300 performs the transparency process for the registered images in an operation (S1430) and then synthesizes the transparency-processed images in an operation (S1435). The operation (S1435) is an optional operation and may not also be performed as needed. That is, when the image processing apparatus 300 extracts the static objects from the registered images according to an exemplary embodiment of the present invention, the image processing apparatus 300 may also extract the static objects in a state in which the transparency process is completed and may also extract the static objects after the transparency process is performed and the image synthesis is also completed.

Figure 15:
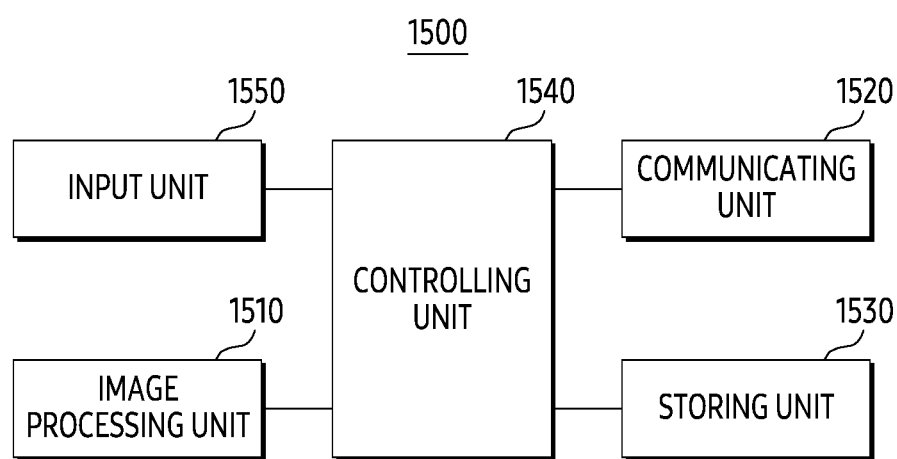
FIG. 15 is a diagram illustrating a block configuration of an image processing apparatus for creating a map according to another exemplary embodiment of the present invention.

FIG. 15 is a block configuration diagram of an image processing apparatus for creating a map according to another exemplary embodiment of the present invention. An input unit 1550 may receive a command for performing an operation of an image processing apparatus 1500 from the user, and may include a keypad, a touch pad (resistive/capacitive), and the like.

An image processing unit 1510 processes images received from the vehicles positioned on the road and extracts a variety of information such as fixed geographic features, extending/closing of the road, or lane information such as a left turn/right turn from the received images.

A communicating unit 1520 performs communication with electronic apparatuses or mobile terminals such as smartphones included in the vehicles to receive the photographed images or transmit created map data to the electronic apparatuses or the mobile terminals. The communicating unit 1520 may perform communication in a wired communication scheme as well as various wireless communication schemes such as Bluetooth, Wi-Fi, wireless broadband, 3rd generation (3G), WCDMA scheme, long term evolution (LTE), and a 4th generation (4G) communication schemes.

A storing unit 1530 stores the images received by the electronic apparatuses or the mobile terminals such as the smartphones included in the vehicles, map data generated by a map creating server (not shown) or the image processing apparatus 1500, and instructions which are executable by the controlling unit 340 of the image processing apparatus 1500. As the storing unit 1530, various storing mediums such as a random access memory (RAM), a static random access memory (SRAM), a read only memory (ROM), an electrically erasable programmable read-only memory (EEPROM), a programmable read-only memory (PROM), a magnetic memory, a magnetic disk, an optical disc, and the like may be used.

A controlling unit 1540 performs a control to process the received image to generate the map data, or generate updated data for updating the map data, and transmit the generated map data to the electronic apparatuses or the mobile terminals such as the smartphones included in the vehicles through the communicating unit 1520.

Figure 16:
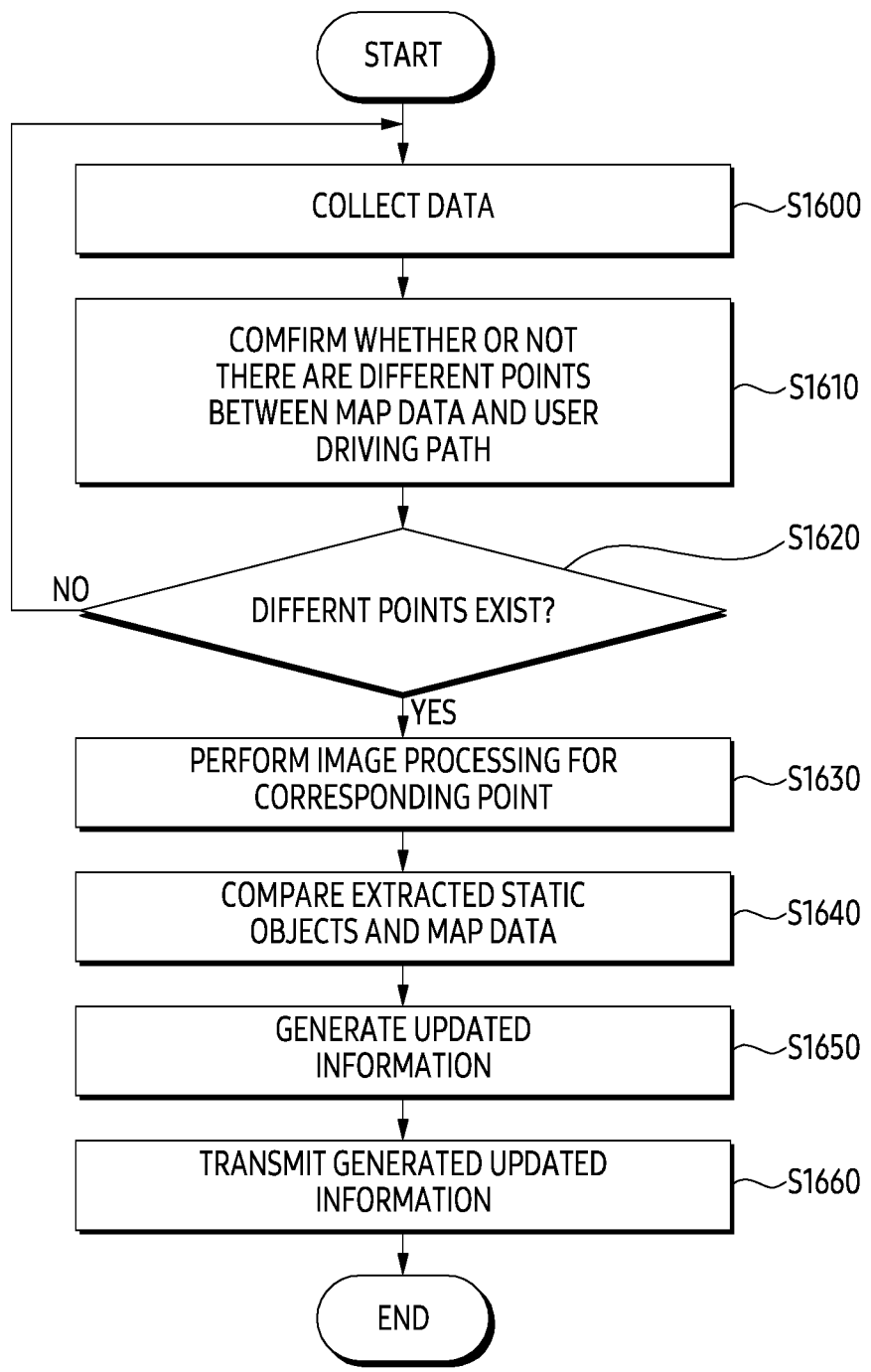
FIG. 16 is a diagram illustrating a method for creating a map of the image processing apparatus of FIG. 15.

FIG. 16 is a method flowchart illustrating a method for creating a map of the image processing apparatus of FIG. 15.

FIG. 16 relates to a case of updating map data which is previously stored when driving paths of the vehicles driving on the road are different from the map data which is previously stored. As an example, a case in which the road is a left turn no region on the map data which is previously stored, but the vehicle turns left, a case in which the vehicle is being driven even though there is no road in the map data which is previously stored, or the like may correspond to such a situation. Here, since the road or the lane information marked on the road corresponds to the static object, the map which is previously stored may be modified by the image processing method as described above.

Specifically, the image processing apparatus 1500 receives and stores a variety of data such as the images received from the electronic apparatuses of the vehicles driving on the road, user driving logs, and the like in an operation (S1600). Next, in an operation (S1610), the controlling unit 1540 of the image processing apparatus 1500 confirms whether or not there are different points between the map data such as the road, the lane information, and the like stored in the map data which is previously stored and the user driving contents by analyzing the user driving logs.

If there are the different points in an operation (S1620) (Yes in S1620), the controlling unit 1540 controls the image processing apparatus 1510 so as to perform the image processing for the corresponding point and extracts static objects such as the road and the lane information for the corresponding point in an operation (S1630). Here, it is preferred that the image processing apparatus 1500 performs the image processing operation when the images are obtained from the electronic apparatuses of the plurality of vehicles which are driven at the corresponding point.

Next, the controlling unit 1540 compares the extracted static objects with the map data to confirm whether to necessary to modify data for the static objects included in the map data in an operation (S1640), and generates update information for modifying the map data when it is necessary to modify the data for the static objects in an operation (S1650). The controlling unit 1540 modifies the map data using the update information generated in the operation (S1650) in an operation (S1660) and transmits the update information generated in the operation (S1660) to the electronic apparatuses of the vehicles which are driven on the road. Here, the controlling unit 1540 may transmit the map data to the electronic apparatus capable of using the map data such as the smartphone or the like through the communicating unit 1520 so that the user may conveniently use the map data.

Figure 17:
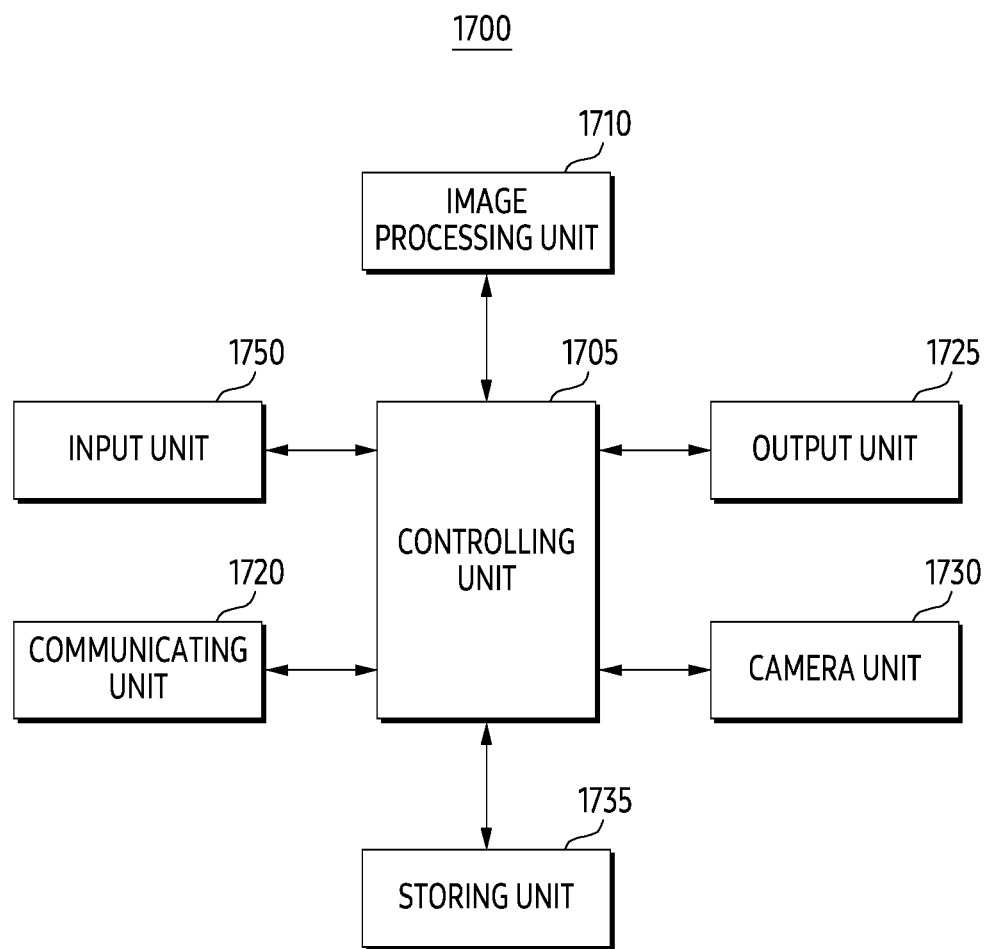
FIG. 17 is a diagram illustrating a block configuration of an electronic apparatus according to still another exemplary embodiment of the present invention.

FIG. 17 is a block configuration diagram of an electronic apparatus according to still another exemplary embodiment of the present invention.

An input unit 1715 transmits a variety of control commands input from the user to a controlling unit 1705, and may be a touch screen panel, a keyboard, or a mouse. A communicating unit 1720 performs communication with the image processing apparatus according to an exemplary embodiment of the present invention or other electronic apparatuses. An output unit 1725, which is a configuration for providing information to the user in sound or visual way, may be a display or a speaker. A camera unit 1730 photographs subjects by a control of the controlling unit 1705.

The image processing unit 1710 may perform image processing such as feature point extraction, transparency process, or image registration for the images photographed by the camera unit 1730 as described in the present specification to allow the controlling unit 1705 to extract the static objects.

A storing unit 1735 stores instructions and map data which may be performed by the controlling unit 1705 so that the electronic apparatus 1700 may be operated.

In a case in which the vehicle in which the electronic apparatus 1700 according to another exemplary embodiment of the present invention is mounted drives on the road, the controlling unit 1705 performs a control so that the images are obtained through the camera unit 1730 and loads the map data stored in the storing unit 1735. In addition, the controlling unit 1705 performs a path guidance through the output unit 1725 using the loaded map data and a position of the vehicle which is currently measured, and extracts the static objects by performing the image processing for the images obtained by the camera unit 1730 by the image processing unit 1710.

In addition, the controlling unit 1705 compares the extracted static objects with the map data, examines whether or not the extracted static objects exist in the map data used for the path guidance, and request an update of the map data stored in the storing unit 1735 to the image processing apparatus through the communicating unit 1720 when the extracted static objects do not exist in the map data.

If the updated map data is received through the communicating unit 1720, the controlling unit 1735 updates the map data which is previously stored in the storing unit 1735.

Figure 18:
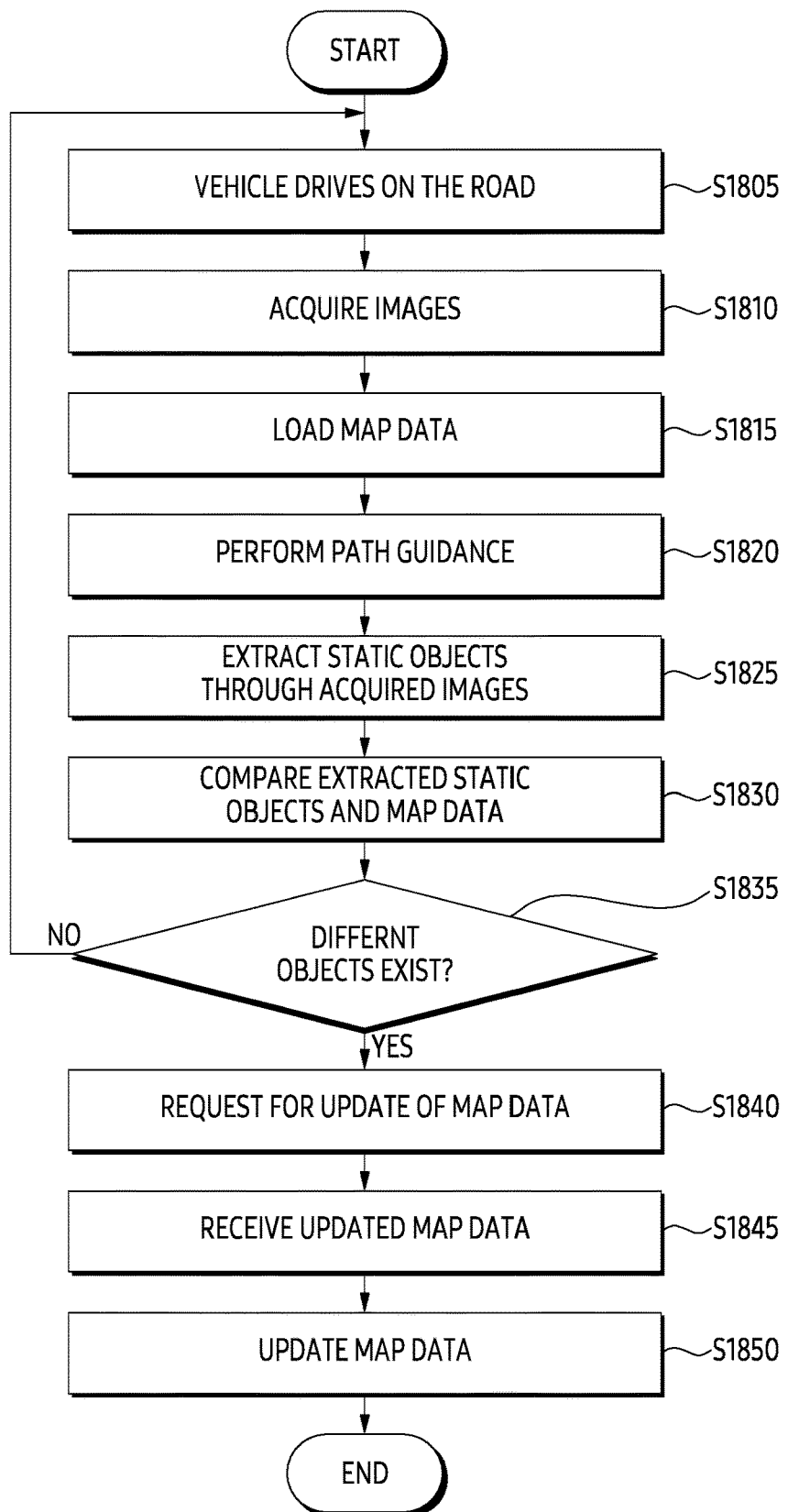
FIG. 18 is a diagram illustrating an operation flow of the electronic apparatus of FIG. 17.

FIG. 18 is a flowchart of an operation of the electronic apparatus 1700 of FIG. 17.

If the vehicle drives on the road (S1805), the electronic apparatus 1700 installed in the vehicle obtains images in an operation (S1810) and loads map data in an operation (S1815). In addition, the electronic apparatus 1700 performs a path guidance using the loaded map data and a position of the vehicle which is currently measured in an operation (S1820), and extracts static objects by performing an image processing for the obtained images in an operation (S1825).

The electronic apparatus 1700 compares the extracted static objects with the map data in an operation (S1830) and examines whether or not the extracted static objects exist in the map data used for the path guidance in an operation (S1835). As a result of the examination of the operation (S1835), if the static object different from the extracted static objects exist in the map data, the electronic apparatus 1700 requests an update of the map data which is previously stored to the image processing apparatus in an operation (S1840). If the updated map data is received in an operation (S1845), the electronic apparatus 1700 updates the map data which is previously stored in an operation (S1850).

Figure 19:
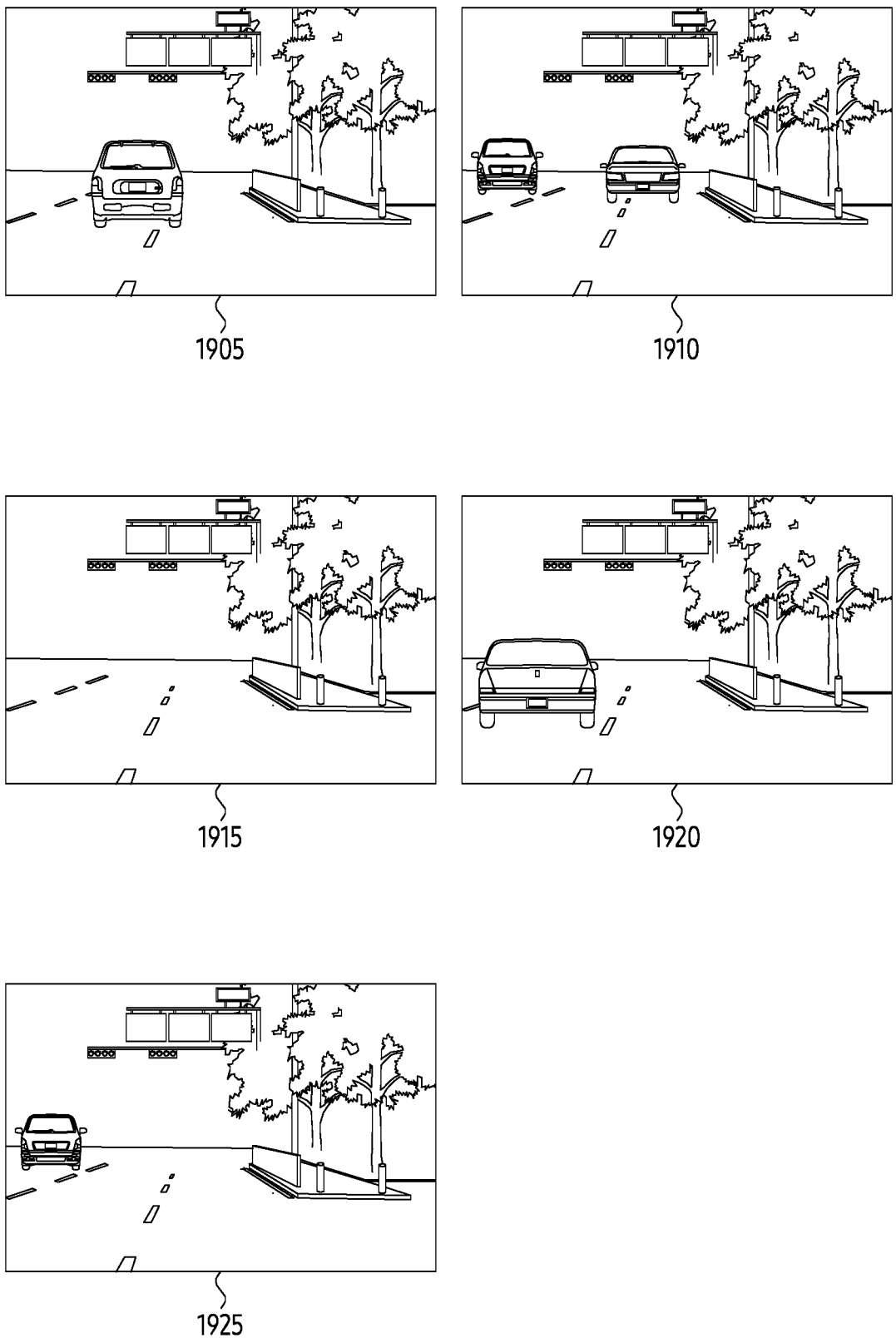
FIGS. 19 and 20 are diagrams illustrating a transparency process for five images.
Figure 20:
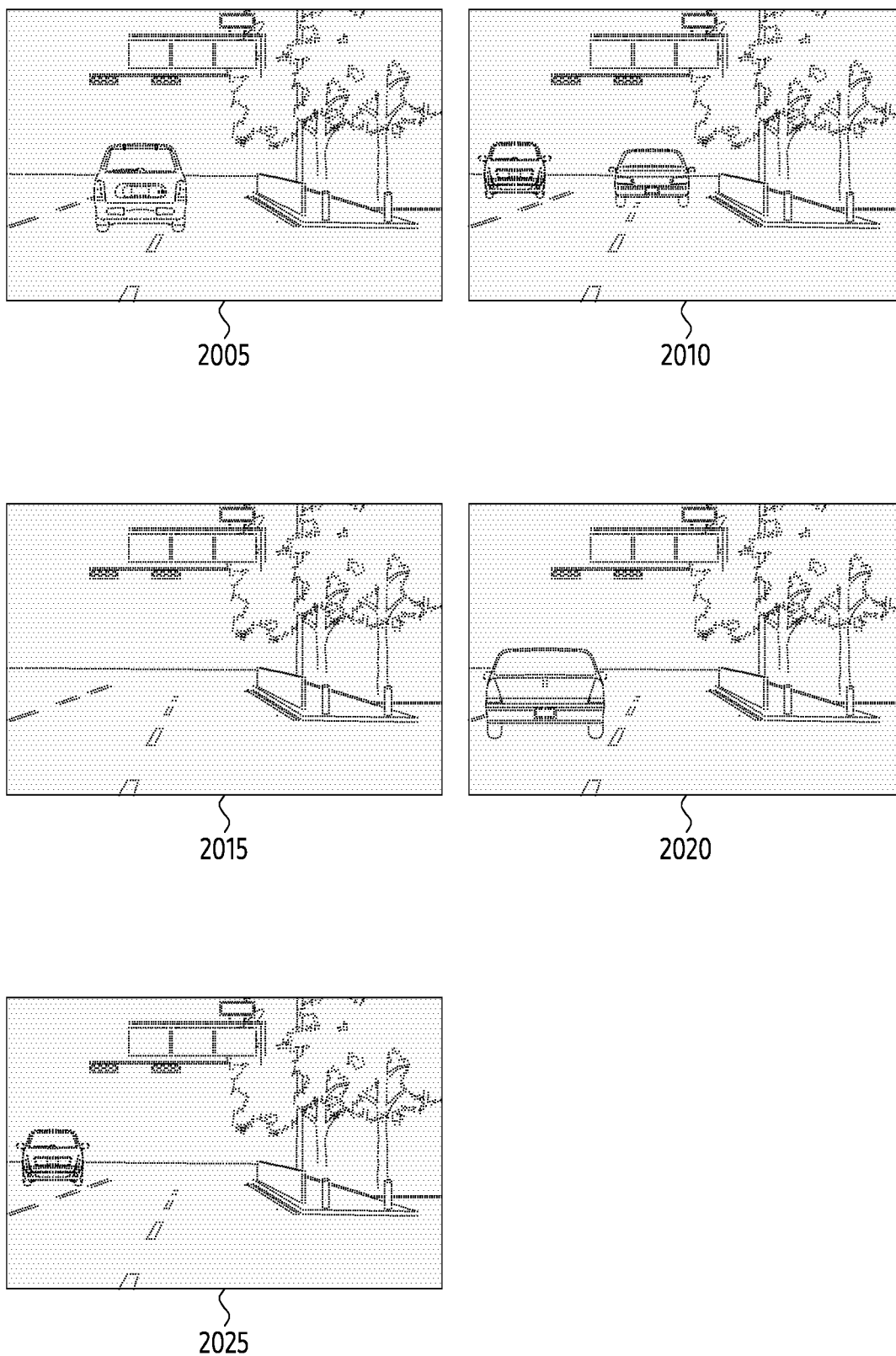

FIGS. 19 and 20 are diagrams illustrating a transparency process for five images according to an exemplary embodiment of the present invention.

FIG. 19 illustrates a total of five images (reference numerals 1905, 1910, 1915, 1920, and 1925) obtained at the same point according to an exemplary embodiment of the present invention and reference numerals 2005, 2010, 2015, 2020, and 2025 of FIG. 20 illustrate results obtained by performing a transparency process for each of the images of reference numerals 1905, 1910, 1915, 1920, and 1925 of FIG. 19. Since the total number of images to be targeted to the transparency process is 5 (N=5) in FIGS. 19 and 20, a constant multiplied with a pixel value of each of the images of reference numerals 1905, 1910, 1915, 1920, and 1925 of FIG. 19 to perform the transparency process according to an exemplary embodiment of the present invention is ⅕. That is, the respective images of FIG. 20 are the transparency-processed images obtained by multiplying the respective pixel values of the respective images of FIG. 19 by ⅕.

Figure 21:
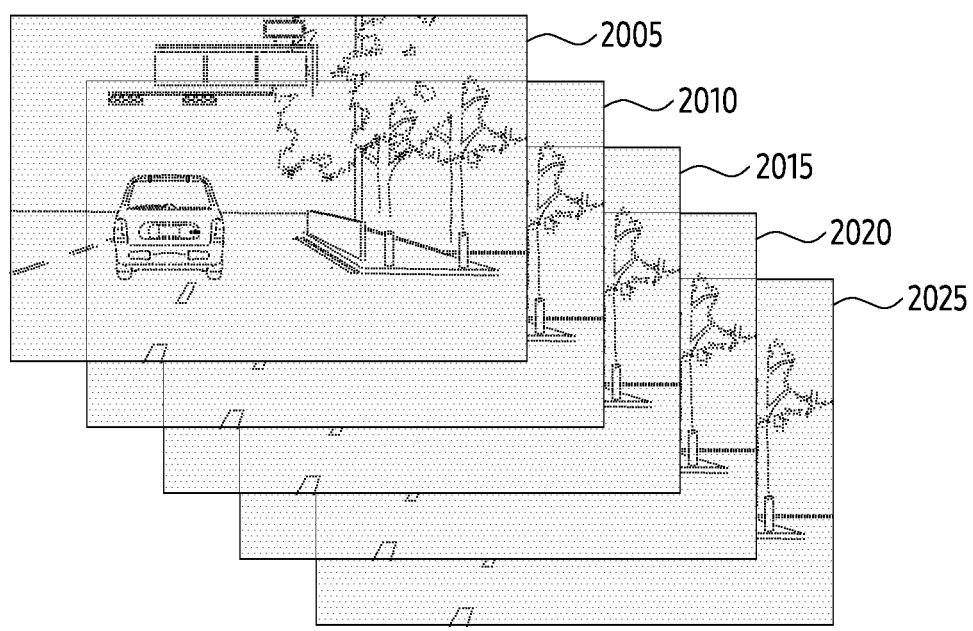
FIG. 21 is a diagram illustrating an image registration of the transparency-processed images of FIG. 20.
Figure 22:
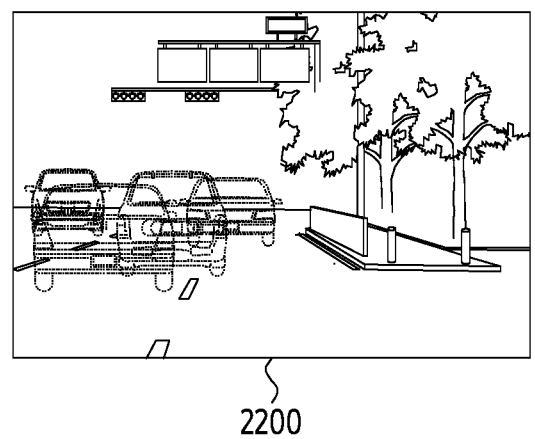
FIG. 22 is a diagram illustrating a result of the image registration according to FIG. 21.

In addition, FIG. 21 is a diagram illustrating an image registration of the transparency-processed images of FIG. 20 and FIG. 22 is a diagram illustrating a result of the image registration of FIG. 21, where it may be seen that the vehicles, which are the dynamic objects, disappear, while roads, lane marking lines, crosswalks, traffic lights, and the like, which are static objects, exist as it is. According to the present invention, the static objects may be extracted from the images in this method and used to update or create the map data.

Meanwhile, the above-mentioned example illustrates that the transparency processing unit performs the transparency process by multiplying the respective pixel values (0 to 255) of the transparency target images by a predetermined constant and performing the image processing so that the respective pixel values (0 to 255) of the transparency target images have a pixel value smaller than the original pixel values of the images, but is not limited thereto. According to another implementation of the present invention, the transparency processing unit may adjust transparency of the corresponding image by adjusting an ALPHA (A) value corresponding to a transparency level in an RGBA value of the transparency target image. Here, the Alpha (A) value may be defined in advance and may also be updated periodically.

Further, the above-mentioned example illustrates that the static objects and the dynamic objects are extracted from the registered image by calculating the standard deviations of the pixel value of the registered image, the pixel value of the reference image, and the pixel value of the target image for each of the pixels, determining the pixels in which the calculated standard deviation is the predetermined value or less as the pixels for the static objects, and determining the pixels in which the calculated standard deviation exceeds the predetermined value as the pixels for the dynamic objects, but is not limited thereto. According to another implementation of the present invention, the static objects and the dynamic objects may also be classified by comparing an ALPHA (A) value in an RGBA value of the registered image with a predetermined transparency value.

According to the various exemplary embodiments of the present invention described above, it is possible to extract static objects positioned on the road through the images obtained by the cameras installed in the vehicles positioned on the road and to accurately and quickly create the map using the extracted static object.

Further, according to the various exemplary embodiments of the present invention described above, it is possible to remotely update the map data in real time by receiving the images obtained through the cameras of the vehicles positioned on the road in real time, unlike an existing map creating system through a survey.

Further, according to the various exemplary embodiments of the present invention described above, it is possible to provide the map service to which the newest road environment is applied to the users by transmitting the map data which is updated in real time to the vehicles positioned on the road.

Figure 23:
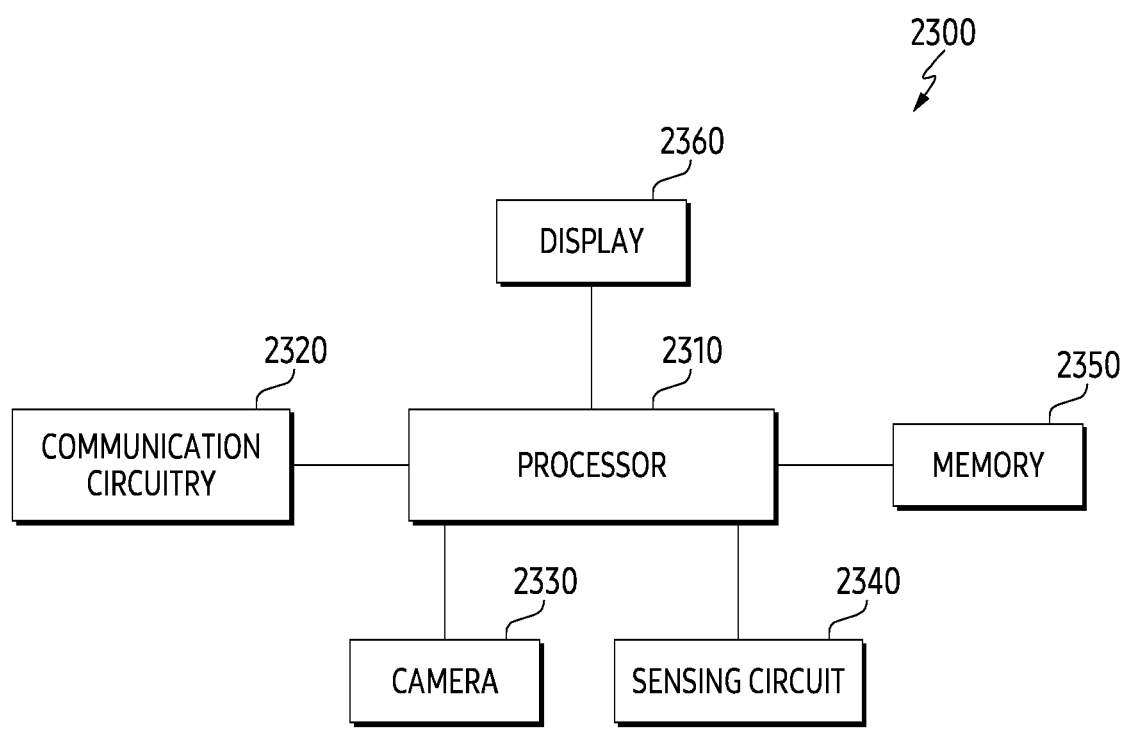
FIG. 23 shows a simplified block diagram of an electronic device according to various embodiments.

FIG. 23 shows a simplified block diagram of an electronic device according to various embodiments.

Referring now to FIG. 23, an electronic device 2300 may be associated with the electronic device 200 shown in FIG. 2. The electronic device 2300 may include at least one of the elements included in the electronic device 200, such as e.g., the input unit 210, the communicating unit 230, the camera unit 240, the display unit 220, and the display unit 220. The electronic device 2300 may be incorporated into a vehicle. For example, the vehicle may be stationary or in motion. In the following description, for convenience of description, the electronic device 2300 incorporated into the vehicle may be described in the form of a vehicle.

The electronic device 2300 may include a processor 2310, a communication circuitry 2320, a camera 2330, a sensing circuit 2340, a memory 2350, and/or a display 2360.

The processor 2310 may be associated with the control unit 250 of FIG. 2. The processor 2310 may operate to control the overall operation of the electronic device 2210. The processor 2310 may execute applications that provide an advertisement service, an Internet service, a game service, a multimedia service, and/or a navigation (or map) service. In various embodiments, the processor 2310 may include a single processor core or may include multiple processor cores. For example, the processor 2310 may include a multi-core such as e.g., a dual-core, a quad-core, a hexa-core or the like. According to an embodiment, the processor 2310 may further include a cache memory located inside or outside of it.

The processor 2310 may receive instructions from other elements of the electronic device 2300, analyze the received instructions, and perform calculations or process data according to the analyzed instructions.

The processor 2310 may process data or signals generated or provided from an application. For example, the processor 2310 may request instructions, data, or signals from the memory 2350 to execute or control the application. The processor 2310 may operate to write (or store) or update the instructions, data, or signals into the memory 2350 to execute or control the application.

The processor 2310 may analyze and process messages, data, instructions, or signals received from the communication circuitry 2320, the camera 2330, the sensing circuit 2340, the memory 2350, or the display 2360. Further, the processor 2310 may generate new messages, data, instructions, or signals based on the received messages, data, instructions, or signals. The processor 2310 may provide the processed or generated messages, data, instructions, or signals to the communication circuitry 2320, the camera 2330, the sensing circuit 2340, the memory 2350, the display 2360, or the like.

An entirety or a portion of the processor 2310 may be electrically or operably coupled with or connected to any other elements in the electronic device 2300 such as e.g., the communication circuitry 2320, the camera 2330, the sensing circuit 2340, the memory 2350, or the display 2360.

According to an embodiment, the processor 2310 may include one or more processors. For example, the processor 2310 may include an application processor (AP) to control an upper layer of program such as e.g., an application program, a graphics processing unit (GPU) for configuring a screen displayed on the display 2360 and controlling the screen, an image signal processor to control the camera 2330, a sensor hub to control the sensing circuit 2340, a communication processor (CP) to control the communication circuitry 2320, or the like.

The communication circuitry 2320 may be related to the receiving unit 310 or the transmitting unit 320 shown in FIG. 2. The communication circuitry 2320 may be used to establish a communication path between the electronic device 2300 and another electronic device (e.g., a server, an external electronic device, or any device embedded in a vehicle). The communication circuitry 2320 may support a predetermined protocol capable of connecting to the other electronic device in either wired or wireless connection. For example, the communication circuitry 2320 may include a module (or circuit) for at least one of Bluetooth communication technique, BLE (Bluetooth low energy) communication technique, Wi-Fi (Wireless-Fidelity) communication technique, cellular (or mobile) communication technique, or a wired communication technique. As another example, the communication circuitry 2320 may include an HDMI, a USB interface, an SD card interface, or an audio interface, being operable in association with a connection terminal such as, for example, a high definition multimedia interface (HDMI) connector, a universal serial bus (USB) connector, an SD card connector, an audio connector (e.g., a headphone connector) or the like.

The communication circuitry 2320 may include a communication circuitry for global positioning system (GPS) (or GNSS). The communication module 210 may transmit/receive GPS signals. Depending on regions or bandwidths in use, the GPS may include at least one of GLONASS (global navigation satellite system), Beidou Navigation Satellite System (hereinafter, referred to as "Beidou"), QZSS (quasi-zenith satellite system), IRNSS (Indian regional satellite system) or Galileo (the European global satellite-based navigation system).

The communication circuitry 2320 may provide the processor 2310 with information or data received from the other electronic device through the communication path. The communication circuitry 2320 may transmit information or data provided from the processor 2310 to the other electronic device through the communication path.

The camera 2330 may capture a still image or a moving image. In various embodiments, the camera 2330 may include at least one of one or more lenses (e.g., a lens assembly), an image sensor, a flash, an image stabilizer, a buffer memory or the like. For example, the one or more lenses may collect light emitted from a subject for an image to be captured.

According to an embodiment, the camera 2330 may include a plurality of cameras. For example, the camera 2330 may include a first camera and a second camera. The first camera and the second camera may be configured at different positions of the electronic device 2300, and may be used to capture images of external objects in different directions.

According to an embodiment, the camera 2330 may include a plurality of lens assemblies. For example, the plurality of lens assemblies may have the same lens properties (e.g., angle of view, focal length, auto-focus, f number, or optical zoom). For example, at least one of the plurality of lens assemblies may have the lens properties that are different from those of at least one of the plurality of lens assemblies. For example, at least one of the plurality of lens assemblies may be configured for a wide-angle lens, and at least another of the plurality of lens assemblies may be configured for a telephoto lens.

In various embodiments, the flash may emit a light source that is used to enhance light given off from a subject. For example, the flash may include one or more light emitting diodes (e.g., a red-green-blue (RGB) LED, a white LED, an infrared LED, or an ultraviolet LED), or a xenon lamp.

In various embodiments, the image sensor may convert light transmitted from a subject through one or more lenses into an electrical signal to obtain an image corresponding to the subject (e.g., an image related to the vehicle equipped with the electronic device 2300). In an embodiment, the image sensor may include one image sensor selected from image sensors having different properties (such as e.g., an RGB sensor, a BW (black and white) sensor, an IR sensor or a UV sensor), a plurality of image sensors having the same properties, or a plurality of image sensors having different properties. Each image sensor included in the image sensors may be implemented with, for example, a charged coupled device (CCD) sensor or a complementary metal oxide semiconductor (CMOS) sensor.

In various embodiments, the image stabilizer may, in response to a movement of the camera 2330 or the electronic device 2300, may move or adjust the one or more lenses or the image sensor in a certain direction (e.g., adjusting read-out timing, etc.) to at least partially compensates for any negative effects (such as e.g., shaking image) that might be caused by a movement of the captured image. According to an embodiment, the image stabilizer may be implemented with an optical image stabilizer, and a gyro sensor (e.g., the sensing circuit 2340) or an acceleration sensor (e.g., the sensing circuit 2340) disposed either inside or outside the electronic device 2300 or the camera 2330 may be used to detect the movement.

In various embodiments, the buffer memory may at least temporarily store at least part of the image captured through the image sensor for a next image processing operation. For example, when a delay in image acquisition according to a shutter or a high-speed acquisition of a plurality of images is performed, the obtained original image (e.g., high-resolution image) may be stored in the buffer memory, and a copy image (e.g., low-resolution image) may be previewed via the display 2360. When a predetermined condition is satisfied after such a preview (e.g., by a user input or a system command), at least part of the original image stored in the buffer memory may be obtained and processed by the image signal processor. In an embodiment, the buffer memory may be configured with at least a part of the memory 2350 or a separate memory operated independently of the memory 2350.

The memory 2350 may store instructions, control instruction codes, control data or user data, for controlling the electronic device 2300. For example, the memory 2350 may include at least one application, an operating system (OS), a middleware, and/or a device driver.

The memory 2350 may include one or more of a volatile memory, a non-volatile memory and so on. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), and a ferroelectric RAM (FeRAM). The non-volatile memory may include a read-only memory (ROM), a programmable ROM (PROM), an electrically programmable ROM (EPROM), an electrically erasable programmable ROM (EEPROM), a flash memory, and the like.

The memory 2350 may include non-volatile media such as e.g., a hard disk drive (HDD), a solid-state disk (SSD, solid state disk), an embedded multi-media card (eMMC), a universal flash storage (UFS).

The sensing circuit 2340 may generate an electrical signal or a data value corresponding to an internal operation status (e.g., power or temperature) within the electronic device 2300 or an external environmental state outside the electronic device 2300. For example, the sensing circuit 2340 may include a radar sensor, a lidar sensor, a gesture sensor, a gyro sensor, a barometric pressure sensor, a magnetic sensor, an acceleration sensor, a speed sensor (or speedometer), a grip sensor, and a proximity sensor, a color sensor, an infrared (IR) sensor, a biometric sensor, a temperature sensor, a humidity sensor, an illuminance sensor, or the like.

In various embodiments, the sensing circuit 2340 may include a transmitter configured to emit a signal (or pulse) and a receiver configured to receive a reflected signal for the signal.

For example, the sensing circuit 2340 may emit a signal (e.g., light) under the control of the processor 2310 and receive its reflected signal. The sensing circuit 2340 may analyze the time up until the reflected signal is received, a phase shift of the reflected signal, a pulse power of the reflected signal and/or a pulse width of the reflected signal, and the like, so as to identify the external environment surrounding the electronic device 2300. The sensing circuit 2340 may transmit information on the identified environment to the processor 2310.

For example, the sensing circuit 2340 may measure the time from when the signal is emitted from the transmitter until the signal is reflected and then received by the receiver so as to obtain distance information from the electronic device 2300 to the object. For example, the sensing circuit 2340 may include a radar sensor and/or a lidar sensor.

The display 2360 may output contents, data, or signals. In various embodiments, the display 2360 may display an image signal processed by the processor 2310. For example, the display 2360 may display a captured or still image. As another example, the display 2360 may display a motion picture or a camera preview image. As still another example, the display 2360 may display a graphic user interface (GUI) so that the user can interact with the electronic device 2300.

The display 2360 may be configured with a liquid crystal display (LCD) or an organic light emitting diode (OLED).

According to an embodiment, the display 2360 may be coupled with a sensor capable of receiving a touch input or the like to be configured with an integrated type of touch screen.

In various embodiments, at least one of the communication circuitry 2320, the camera 2330, or the sensing circuit 2340 may be disposed outside the electronic device 2300.

Figure 24:
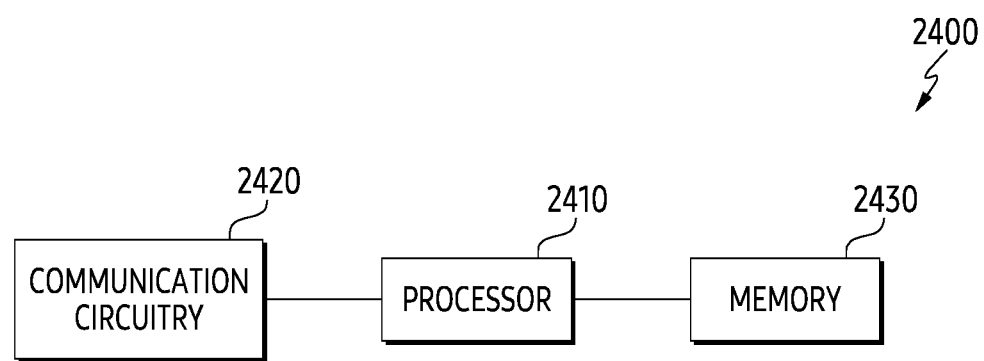
FIG. 24 shows a simplified block diagram of a server according to various embodiments.

FIG. 24 shows a simplified block diagram of a server according to various embodiments.

Referring then to FIG. 24, the server 2400 may include a processor 2410, a communication circuitry 2420 and/or a memory 2430. In various embodiments, the server 2400 may operate to perform some or all of the functions of the electronic device 2300 of FIG. 23.

The server 2400 may be associated with the image processing apparatus 300 of FIG. 3. The processor 2410 may be associated with the control unit 305 and/or the image processing unit 330 of FIG. 3. The communication circuitry 2420 may be associated with the receiving unit 310 and/or the transmitting unit 315 of FIG. 3. The memory 2430 may be related to the storage unit 320 of FIG. 3.

According to an embodiment, the server 2400 may obtain an image from the electronic device 2300 and analyze the image. The server 2400 may identify information on a fixed external object located out of the electronic device 2300, based on the image obtained from the electronic device 2300, and identify information on a geographic location of the fixed external object.

In various embodiments, the server 2400 may receive information on an external object from the electronic device 2300 of FIG. 23 and add content corresponding to the external object to an electronic map. The server 2400 may transmit data about the electronic map with the content being added thereto, to the electronic device 2300.

Various embodiments described below may be performed through the electronic device 2300 illustrated in FIG. 23 and the server 2400 illustrated in FIG. 24.

Figure 25:
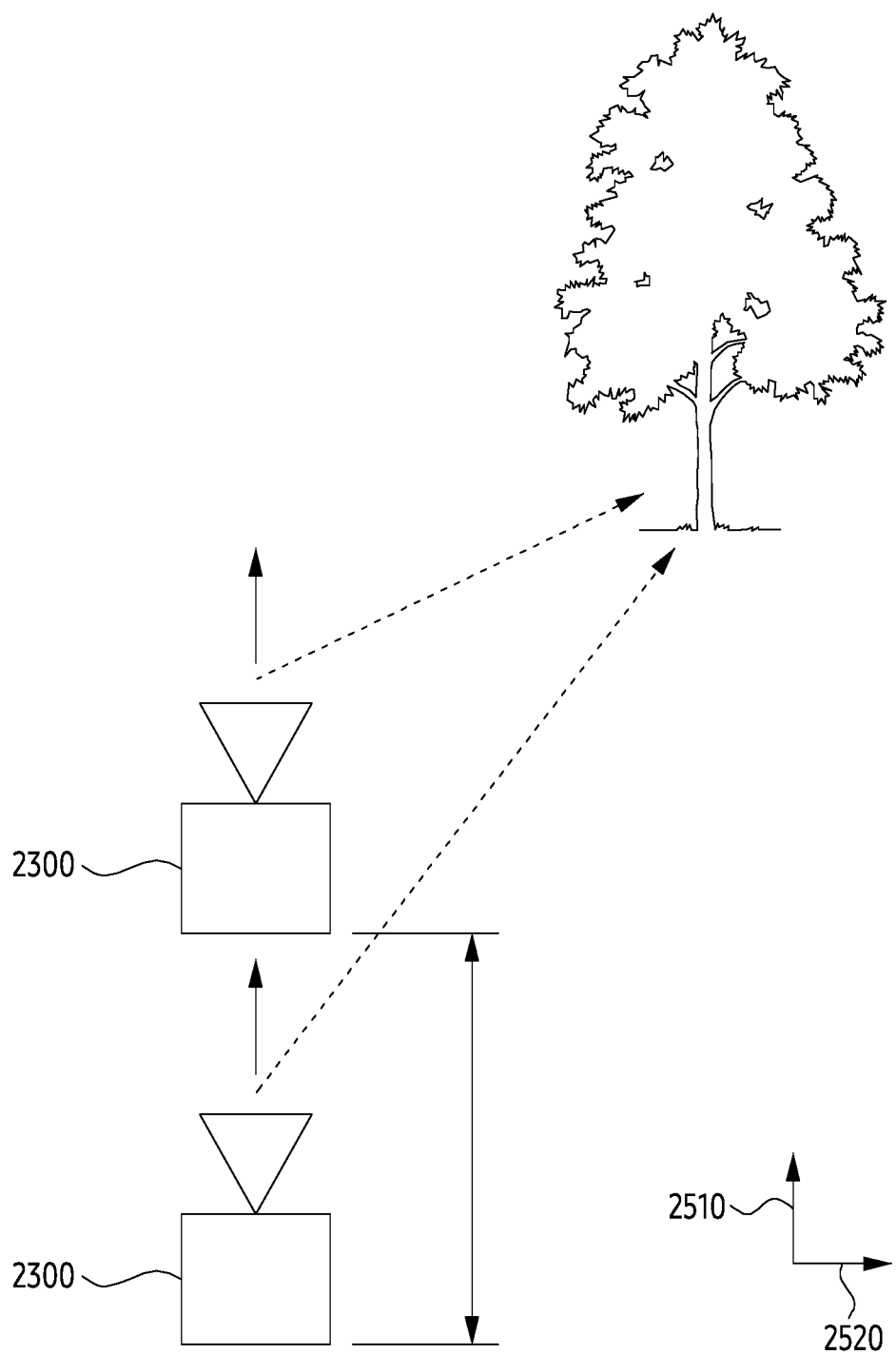
FIGS. 25 and 26 show diagrams for explaining an embodiment for identifying a geographic location of a fixed external object according to various embodiments.
Figure 26:
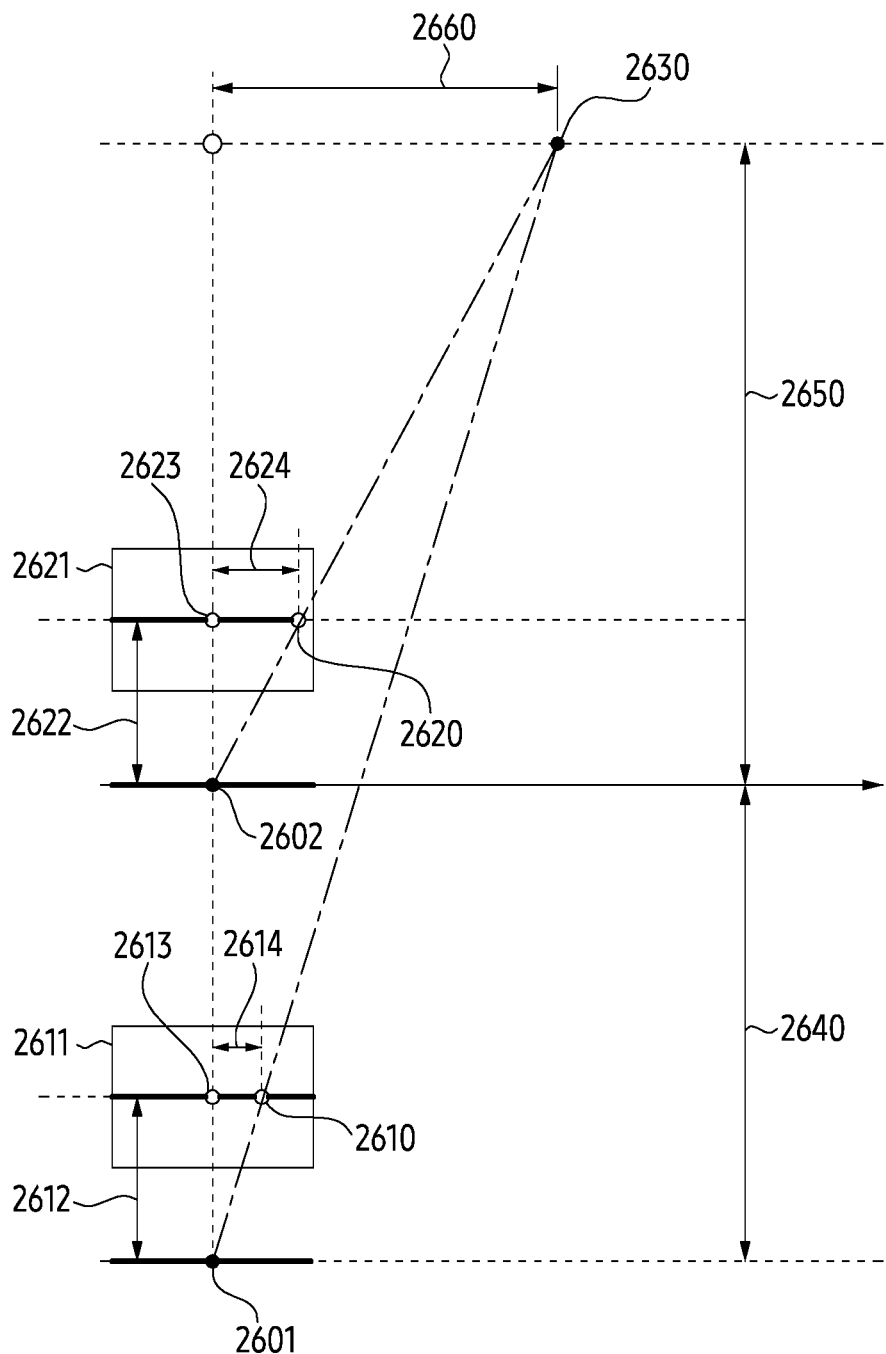

FIGS. 25 and 26 each show a diagram for explaining an embodiment for identifying a geographic location of a fixed external object according to various embodiments of the present disclosure.

Referring first to FIG. 25, the electronic device 2300 may be incorporated into a moving vehicle. The electronic device 2300 in the vehicle may move in a first direction 2510. For example, the electronic device 2300 in the vehicle may move from a first location to a second location, wherein the first location may be of a position at a first timing point of the vehicle moving in the first direction 2510, and the second location may be of a position at a second timing point of the vehicle moving in the first direction 2510. The first timing may be earlier than the second timing on the basis of time.

The electronic device 2300 may capture a first image corresponding to the exterior of the vehicle through the camera 2330 at the first location. The electronic device 2300 may identify a first visual object corresponding to a fixed external object of a plurality of visual objects included in the first image.

For example, the first image may include a plurality of visual objects. The electronic device 2300 may obtain the first image including the plurality of visual objects corresponding to a plurality of external objects outside the vehicle through the camera 2330. The plurality of external objects may be fixed or movable. For example, the plurality of visual objects respectively corresponding to the plurality of external objects may include the aforementioned stationary object or dynamic object.

According to an embodiment, the electronic device 2300 may identify widths of the plurality of visual objects. The electronic device 2300 may identify a plurality of external objects corresponding to each of the plurality of visual objects, based on the widths of the plurality of visual objects.

For example, the electronic device 2300 may store information on an average width of roadside trees in the memory 2350. The electronic device 2300 may obtain a visual object corresponding to an external object. The electronic device 2300 may identify the width of the external object, based on the width of the visual object. The electronic device 2300 may identify that the external object is a roadside tree by comparing the width of the external object with the average width of the roadside trees. For example, the electronic device 2300 may receive information on the average width of the roadside trees from an external server (e.g., the server 2400) and store the information on the average width of the roadside trees into the memory 2350. As another example, the electronic device 2300 may perform a learning for the width of the roadside tree. The electronic device 2300 may obtain information on the average width of those roadside trees, based on the learning.

According to an embodiment, the electronic device 2300 may identify the widths of the plurality of visual objects as well as various information of the plurality of visual objects (e.g., color, shape, type, and/or size, etc.). The electronic device 2300 may identify a plurality of external objects respectively corresponding to the plurality of visual objects, based on various information of the plurality of visual objects. For example, the electronic device 2300 may identify the shape of one of the plurality of visual objects. The electronic device 2300 may identify an external object corresponding to the one visual object as a traffic light, based on the shape of the one visual object being of the traffic light shape.

Meanwhile, while the electronic device 2300 is located in the first location, the electronic device 2300 may identify a first virtual plane spaced apart from a center point of the lens of the camera 2330 by a focal length of the lens in a first direction 2510. For example, the first virtual plane may be formed perpendicular to the first direction 2510.

The electronic device 2300 may identify, at the first location, a first intersection point between a first straight line extending from the center point of the lens towards a fixed external object and the first virtual plane.

After moving from the first location in the first direction 2510, the electronic device 2300 may obtain a second image corresponding to the exterior of the vehicle at a second location, through the camera 2330. The electronic device 2300 may identify a second visual object corresponding to the fixed external object of a plurality of visual objects included in the second image. For example, the electronic device 2300 may identify the fixed external object based on the first image and the second image, being obtained at different positions.

While the electronic device 2300 is located in the second location, the electronic device 2300 may identify a second virtual plane spaced apart from the center point of the lens of the camera 2330 by the focal length of the lens, in the first direction 2510.

The electronic device 2300 may identify, at the second location, a second intersection point between a second straight line extending from the center point of the lens towards the fixed external object and the second virtual plane.

The electronic device 2300 may determine a geographic location of the fixed external object, based on the first intersection point and the second intersection point. The geographic location of the fixed external object may imply an absolute location. For example, the geographic location of a fixed external object may be represented in latitude and longitude.

According to an embodiment, the electronic device 2300 may identify a distance between the first location and the second location in order to determine the geographic location of the fixed external object.

For example, the electronic device 2300 may obtain a speed of the electronic device 2300 between the first location and the second location. The electronic device 2300 may identify the time taken to move from the first location to the second location. The electronic device 2300 may identify a distance between the first location and the second location, based on the speed of the electronic device 2300 between the first location and the second location and the time taken to move from the first location to the second location.

As another example, the electronic device 2300 may identify the first location of the electronic device 2300 based on the GPS communication circuitry. In other words, the electronic device 2300 may identify the first location of the electronic device 2300 as an absolute location, based on the GPS communication circuitry. That is, the electronic device 2300 may identify the latitude and longitude of the first location, based on the GPS communication circuitry.

The electronic device 2300 may identify the second location of the electronic device 2300 based on the GPS communication circuitry. In other words, the electronic device 2300 may identify the second location of the electronic device 2300 as an absolute location, based on the GPS communication circuitry. That is, the electronic device 2300 may identify the latitude and longitude of the second location, based on the GPS communication circuitry. The electronic device 2300 may identify a distance between the first location and the second location, based on the identified first location and second location.

In the meantime, the electronic device 2300 may determine the geographic location of the fixed external object, based on the first intersection point, the second intersection point, and the distance between the first location and the second location. In other words, the electronic device 2300 may determine a relative location of the fixed external object on the basis of the second location, based on the first intersection point and the second intersection point. The electronic device 2300 may obtain the geographic location of the second location based on the GPS communication circuitry, and on the basis of the obtained geographic location of the second location and the second location, may determine the geographic location of the fixed external object, based on the relative location of the fixed external object.

The electronic device 2300 may transmit information on the geographic location of the fixed external object to the server 2400, in order to add a content corresponding to the fixed external object to the electronic map. In other words, the information on the geographic location of the fixed external object may be transmitted to the server 2400, in order to add the content corresponding to the fixed external object to the electronic map.

Hereinafter, a more detailed technical feature of determining a geographic location of a fixed external object will be described with reference to FIG. 26.

Referring to FIGS. 25 and 26, the electronic device 2300 may determine a geographic location 2630 of a fixed external object, based on a first intersection point 2610 and a second intersection point 2620. A process for determining the geographic location 2630 of the fixed external object will be described in further detail, hereinafter.

While the electronic device 2300 is located in the first location, the electronic device 2300 may identify a first virtual plane 2611 spaced apart from a center point 2601 of the lens of the camera 2330 by a focal length 2612 of the lens in a first direction 2510.

In the first location, the electronic device 2300 may identify a first intersection point 2610 between a first straight line extending from the center point 2601 of the lens towards the fixed external object and the first virtual plane 2611. The electronic device 2300 may identify a third intersection point 2613 between a third straight line extending in the first direction 2510 from the center point 2601 of the lens and the first virtual plane 2611. The electronic device 2300 may identify a distance 2614 between the first intersection point 2610 and the third intersection point 2613.

While the electronic device 2300 is located in the second location, the electronic device 2300 may identify a second virtual plane 2621 spaced apart from the center point 2602 of the lens of the camera 2330 by the focal length 2622 of the lens in the first direction 2510.

In the second location, the electronic device 2300 may identify a second intersection point 2620 between a second straight line extending from the center point 2602 of the lens towards the fixed external object and the second virtual plane 2621. The electronic device 2300 may identify a fourth intersection point 2623 between a third straight line extending in the first direction 2510 from the center point 2602 of the lens and the second virtual plane 2621. The electronic device 2300 may identify a distance 2624 between the second intersection point 2620 and the fourth intersection point 2623.

The electronic device 2300 may identify a distance 2640 between the center point 2601 of the lens and the center point 2602 of the lens. The distance 2640 may correspond to a distance that the electronic device 2300 moved from the first location to the second location. For example, the distance 2640 may be identified based on the GPS communication circuitry of the electronic device 2300. As another example, the distance 2640 may be identified based on a speed between the first location and the second location and the time taken to move from the first location to the second location.

The electronic device 2300 may determine the relative location of the fixed external object on the basis of the second location, based on the distance 2614, the distance 2624, and the distance 2640.

On the basis of the second location, a distance 2650 spaced apart in the first direction 2510 of the fixed external object can be set as shown in the following Equation 3.

$$Z = \frac{B \times x_r}{(x_l - x_r)} \quad \text{[Equation 3]}$$

Referring to Equation 3, 'Z' is a distance 2650 by which the geographical location 2630 of the fixed external object is spaced apart in the first direction 2510 on the basis of the second location. 'B' is the distance 2640, '$x_r$' is the distance 2614, and '$x_l$' is the distance 2624.

On the basis of the second location, a distance 2660 spaced apart in a second direction 2520 perpendicular to the first direction 2510 of the fixed external object can be set as in the Equation 4 below.

$$X = \frac{B \times x_r \times x_l}{(x_l - x_r) \times F} \quad \text{[Equation 4]}$$

Referring to the Equation 4, 'X' is a distance 2660 by which the geographic location 2630 of the external object is spaced apart in the second direction 2520 perpendicular to the first direction 2510, on the basis of the second location. 'B' is the distance 2640, '$x_r$' is the distance 2614, and '$x_l$' is the distance 2624. F is the focal length (2612, 2622) of the lens of camera 2330.

Meanwhile, the electronic device 2300 may identify the geographic location of the second location through the GPS communication circuitry. For example, the electronic device 2300 may identify the latitude and longitude of the second location.

The electronic device 2300 may identify the geographic location of the fixed external object, based on the geographic location of the second location and the relative location of the fixed external object on the basis of the second location.

According to an embodiment, at least part of the above-described operation of the electronic device 2300 may be performed in the server 2400.

For example, the electronic device 2300 may transmit the first image obtained at the first location and the second image obtained at the second location, to the server. The server 2400 may receive the first image and the second image from the electronic device 2300. The server 2400 may identify a first visual object corresponding to a fixed external object of a plurality of visual objects. For example, the server 2400 may respectively classify the plurality of visual objects into one of a stationary object and a dynamic object. The server 2400 may identify the first visual object corresponding to the fixed external object among at least one visual object classified as a stationary object of the plurality of visual objects.

In the meantime, the server 2400 may identify at least a portion of data related to a shape of the fixed external object, data related to a type of the fixed external object, and data related to a function of the fixed external object, based on a machine learning model.

For example, the server 2400 may receive, from the electronic device 2300, additional information (e.g., information on the geographic location of the second location) for obtaining information on the geographic location of the fixed external object through the first image and the second image. The server 2400 may obtain the information on the geographic location of the fixed external object based on the additional information. For example, the server 2400 may obtain the information on the geographic location of the fixed external object, by performing the same or similar operation as the above-described operation of the electronic device 2300.

Figure 27:
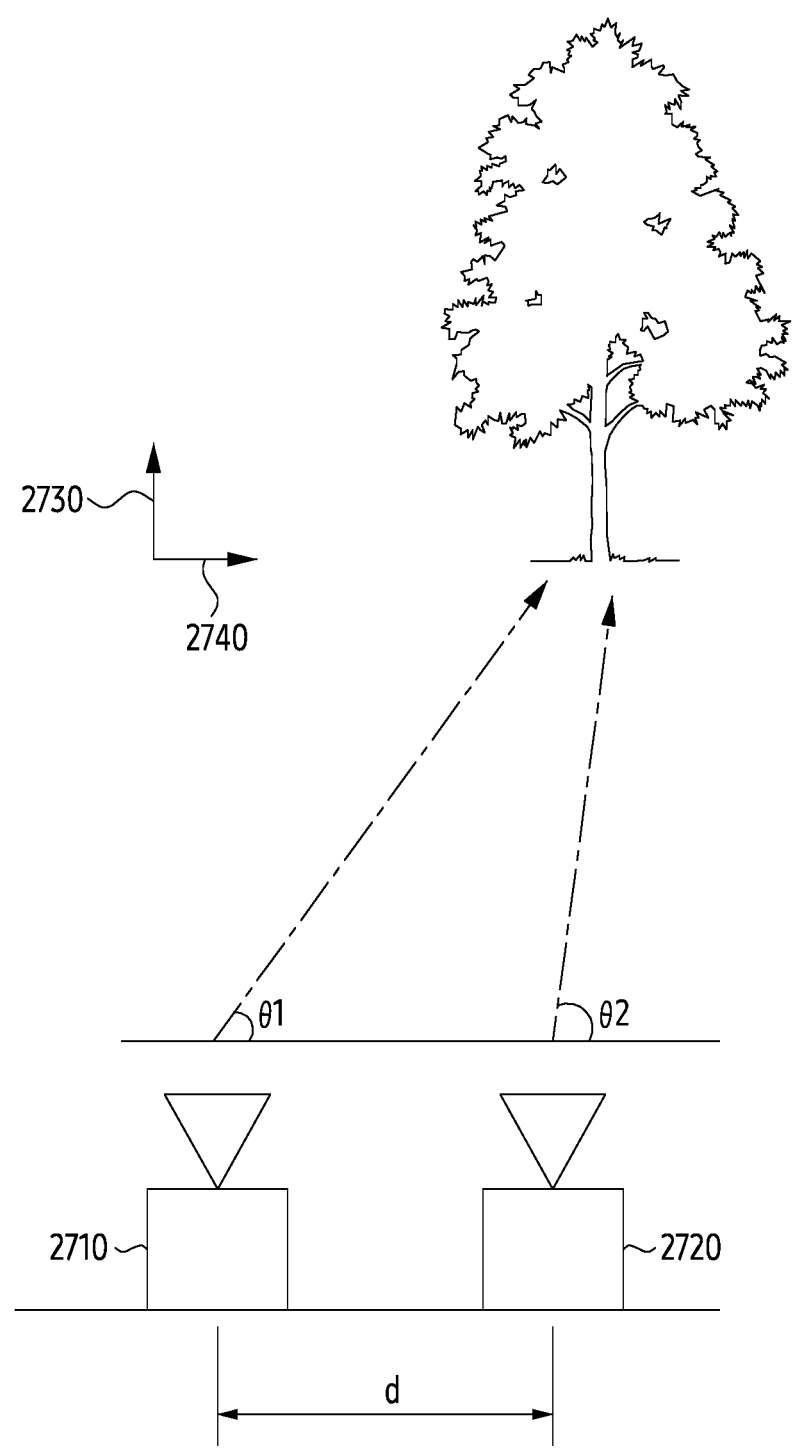
FIGS. 27 and 28 show schematic diagrams for explaining an embodiment for identifying a geographic location of a fixed external object according to various embodiments.
Figure 28:
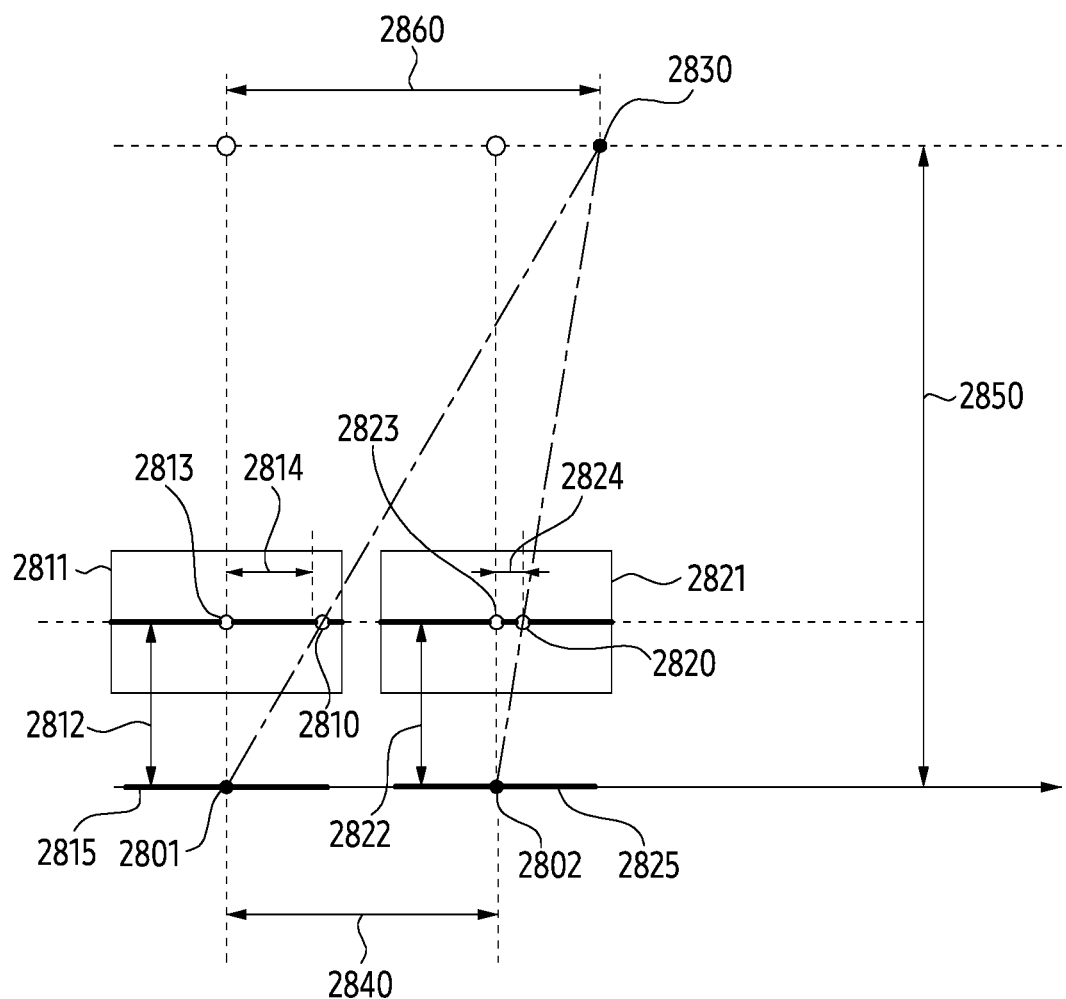

FIGS. 27 and 28 each show a diagram for explaining an embodiment for identifying a geographic location of a fixed external object according to various embodiments of the present disclosure.

Referring now to FIG. 27, the electronic device 2300 in the vehicle may move on in the first direction 2730. The electronic device 2300 may include at least two cameras. For example, the electronic device 2300 may include a first camera 2710 and a second camera 2720, wherein the second camera 2720 may be spaced apart from the first camera 2710 by a first distance "d".

The electronic device 2300 may obtain an image corresponding to the exterior of the vehicle through at least one of the first camera 2710 and the second camera 2720. For example, the electronic device 2300 may capture an image corresponding to the exterior of the vehicle through either one of the first camera 2710 and the second camera 2720. As another example, the electronic device 2300 may obtain an image corresponding to the exterior of the vehicle, by synthesizing the first image captured through the first camera 2710 and the second image obtained through the second camera 2720.

The electronic device 2300 may identify a visual object corresponding to a fixed external object of a plurality of visual objects included in the image.

The electronic device 2300 may identify a first virtual plane spaced apart from the center point of the first lens of the first camera 2710 by the focal length of the first lens in the first direction 2730. For example, the first virtual plane may be formed perpendicular to the first direction 2730. For example, the first virtual plane may correspond to the first image captured through the first camera 2710.

The electronic device 2300 may identify a second virtual plane spaced apart from the center point of the second lens of the second camera 2720 by the focal length of the second lens in the first direction 2730. For example, the second virtual plane may be formed perpendicular to the first direction 2730. For example, the second virtual plane may correspond to the second image captured through the second camera 2720.

The electronic device 2300 may identify a first intersection point between the first straight line extending from the center point of the first lens towards the fixed external object and the first virtual plane.

The electronic device 2300 may identify a second intersection point between the second straight line extending from the center point of the second lens towards the fixed external object and the second virtual plane.

The electronic device 2300 may determine the geographic location of the fixed external object based on the first intersection point and the second intersection point.

In order to add a content corresponding to the fixed external object to the electronic map, the electronic device 2300 may transmit information on the geographic location of the fixed external object to the server 2400. In other words, the information on the geographic location of the fixed external object may be transmitted to the server 2400 in order to add the content corresponding to the fixed external object to the electronic map.

Unlike the above-described embodiment, according to an embodiment, the electronic device 2300 may identify a first angle θ1 between the first straight line and a straight line perpendicular to the first direction 2730. The electronic device 2300 may identify a second angle θ2 between the second straight line and a straight line perpendicular to the first direction 2730. The electronic device 2300 may also obtain information on the geographic location of the fixed external object, based on the distance between the first camera 2710 and the second camera 2720, the first angle θ1, and the second angle θ2.

Hereinafter, a further detailed technical feature for determining the geographic location of the fixed external object will be described with reference to FIG. 28.

Referring to 27 and 28, the electronic device 2300 may determine the geographic location 2830 of the fixed external object, based on the first intersection point 2810 and the second intersection point 2820. A process for determining the geographic location 2830 of the fixed external object will be described below.

The electronic device 2300 may identify the first virtual planes 2811 spaced apart from the center point 2801 of the first lens 2815 of the first camera 2710 by the focal length 2812 of the first lens 2815 in the first direction 2730.

The electronic device 2300 may identify the first intersection point 2810 between the first straight line extending from the center point 2801 of the first lens 2815 towards the fixed external object and the first virtual plane 2811. The electronic device 2300 may identify a third intersection point 2813 between a third straight line extending in the first direction 2730 from the center point 2801 of the first lens 2815 and the first virtual plane 2811. The electronic device 2300 may identify a distance 2814 between the first intersection point 2810 and the third intersection point 2813.

The electronic device 2300 may identify a second virtual plane 2821 spaced apart from the center point 2802 of the second lens 2825 of the second camera 2720 by the focal length 2822 of the second lens 2825 in the first direction 2730. The focal length 2822 of the second lens 2825 may be set equal to the focal length 2812 of the first lens 2815.

The electronic device 2300 may identify the second intersection point 2820 between the second straight line extending from the center point 2802 of the second lens 2825 towards the fixed external object and the second virtual plane 2821. The electronic device 2300 may identify a fourth intersection point 2823 between a fourth straight line extending in the first direction 2730 from the center point 2802 of the second lens 2825 and the second virtual plane 2821. The electronic device 2300 may identify a distance 2824 between the second intersection point 2820 and the fourth intersection point 2823.

The electronic device 2300 may identify a distance 2840 between the center point 2801 of the first lens and the center point 2802 of the second lens. The distance 2840 may correspond to a distance by which the second camera 2720 is separated from the first camera 2710.

The electronic device 2300 may determine the relative location of the fixed external object with respect to the center point 2801 of the first lens 2815, based on the distance 2814, the distance 2824, and the distance 2840.

A distance 2850 that is spaced apart from the center point 2801 of the first lens 2815 towards the fixed external object in the first direction 2730 may be set as in Equation 5 below.

$$Z = \frac{B \times F}{(x_l - x_r)} \quad \text{[Equation 5]}$$

Referring to the Equation 5, 'Z' is a distance 2850 by which the geographical location 2830 of the fixed external object is spaced apart in the first direction 2730 with respect to the center point 2801 of the first lens 2815. 'B' is the distance 2840, '$x_r$' is the distance 2814, and '$x_l$' is the distance 2824. And, 'F' is the focal lengths 2812 and 2822 of the first lens 2815 and the second lens 2825, respectively.

A distance 2860 by which the fixed external object is spaced apart in the second direction 2740 perpendicular to the first direction 2730 with respect to the center point 2801 of the first lens 2815 may be set as in Equation 6 below.

$$X = \frac{B \times x_l}{(x_l - x_r)} \quad \text{[Equation 6]}$$

Referring to the Equation 6, 'X' is a distance 2850 by which the geographical location 2830 of the fixed external object is spaced apart in the second direction 2740 perpendicular to the first direction 2730 with respect to the center point 2801 of the first lens 2815. Further, 'B' is the distance 2840, '$x_r$' is the distance 2814, and '$x_l$' is the distance 2824.

Meanwhile, the electronic device 2300 may identify the geographic location of the electronic device 2300 (or the center point 2801 of the first lens 2815) through the GPS communication circuitry. For example, the electronic device 2300 may identify the latitude and longitude of the electronic device 2300 (or the center point 2801 of the first lens 2815).

The electronic device 2300 may identify the geographic location of the fixed external object based on the geographic location of the electronic device 2300 (or the center point 2801 of the first lens 2815) and the relative location of the fixed external object with respect to the electronic device 2300 (or the center point 2801 of the first lens 2815).

According to an embodiment, at least a portion of the above-described operation of the electronic device 2300 may be performed by the server 2400.

For example, the electronic device 2300 may transmit a first image obtained through the first camera 2710 and a second image obtained through the second camera 2720, to the server. The server 2400 may receive the first image and the second image from the electronic device 2300.

The server 2400 may receive, from the electronic device 2300, additional information (e.g., information on the geographic location of the second location) for obtaining a geographic location of the fixed external object from the first image obtained through the first camera 2710 and the second image obtained through the second camera 2720. The server 2400 may obtain information on the geographic location of the fixed external object based on the additional information. For example, the server 2400 may obtain information on the geographic location of the fixed external object, by performing the same or similar operation as the above-described operation of the electronic device 2300.

Figure 29:
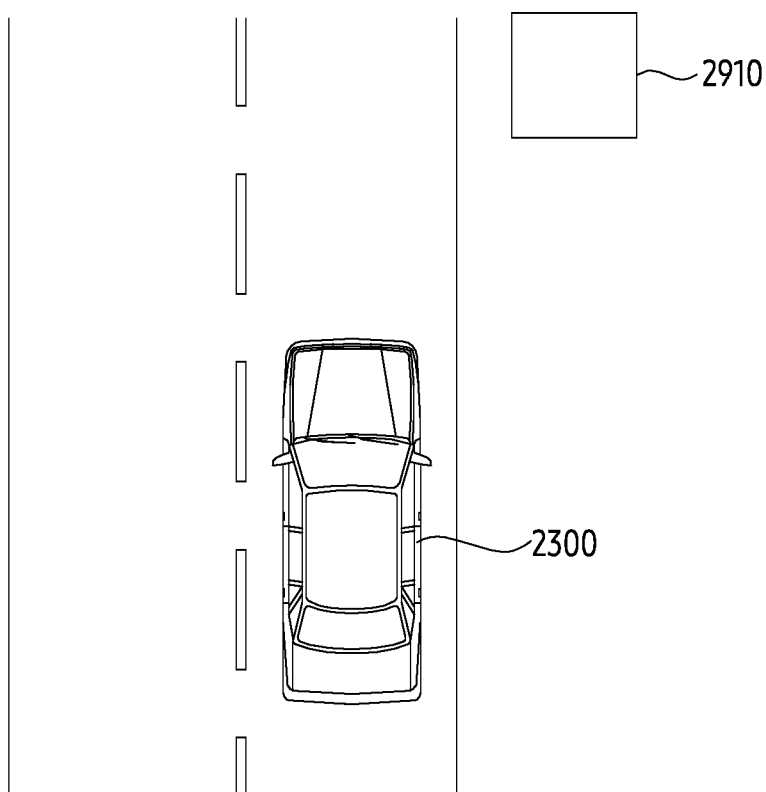
FIG. 29 shows a schematic view for explaining an embodiment for acquiring information on a fixed external object according to various embodiments.

FIG. 29 shows a view for explaining an embodiment for acquiring information on a fixed external object according to various embodiments of the present disclosure;

Referring now to FIG. 29, the electronic device 2300 may obtain an image including a plurality of visual objects respectively corresponding to a plurality of external objects, through a camera 2330.

The electronic device 2300 may analyze the obtained image. The electronic device 2300 may identify a visual object corresponding to the fixed external object 2910 among the plurality of visual objects, based on a result of the analysis of the obtained image. For example, the electronic device 2300 may identify a plurality of visual objects respectively corresponding to the plurality of external objects included in the obtained image. The electronic device 2300 may classify the plurality of visual objects into one of a dynamic object and a static object, respectively. The electronic device 2300 may determine whether the plurality of external objects respectively corresponding to the plurality of visual objects are stationary or movable. Accordingly, the electronic device 2300 may identify the visual object corresponding to the fixed external object 2910.

After identifying the visual object corresponding to the fixed external object 2910, the electronic device 2300 may obtain information on the visual object. The information on the visual object may include information on the fixed external object 2910.

As an example, the electronic device 2300 may identify a tree-shaped visual object and then identify that a fixed external object 2910 corresponding to the visual object is a roadside tree. That is, the electronic device 2300 may obtain information on the fixed external object 2910 being a roadside tree.

As another example, the electronic device 2300 may identify a road sign-shaped visual object and then identify that a fixed external object 2910 corresponding to the visual object is a road sign. After identifying the fixed external object 2910 as a sign, the electronic device 2300 may obtain information on the content of the sign, based on an optical character recognition (OCR) process.

As another example, the electronic device 2300 may identify a building-shaped visual object and then identify that a fixed external object 2910 corresponding to the visual object is a building. After identifying the fixed external object 2910 as a building, the electronic device 2300 may obtain information on a store or stores located within the building, based on the optical character recognition process for a signboard of the building.

As another example, the electronic device 2300 may identify a visual object representing a traffic accident scene and then identify the traffic accident scene. The electronic device 2300 may obtain information that a traffic accident has occurred, based on the identifying the visual object.

As another example, the electronic device 2300 may identify a visual object representing some crack (or a sinkhole, etc.) on a road and then identify that the crack (or the sinkhole, etc.) exists is on the road. The electronic device 2300 may obtain information that such a crack (or a sinkhole, etc.) exists on the road, based on identifying the visual object.

According to an embodiment, the operation of analyzing the image as described above may be performed in the server 2400. The electronic device 2300 may transmit the obtained image to the server 2400. The server 2400 may identify the visual object corresponding to the fixed external object 2910 of a plurality of visual objects, based on analyzing the image received from the electronic device 2300.

In the meantime, the electronic device 2300 may obtain information on a distance between the fixed external object 2910 and the electronic device 2300, obtained through the sensing circuit 2340. For example, the sensing circuit 2340 may include a transmitter configured to emit or irradiate a signal and a receiver configured to receive a reflected signal for the signal. The electronic device 2300 may obtain information on the distance between the fixed external object 2910 and the electronic device 2300, by means of emitting a signal through the sensing circuit 2340 and then receiving its reflected signal.

According to an embodiment, the information on the distance between the fixed external object 2910 and the electronic device 2300 may be distinguished from information on the visual object. For example, the information on the visual object may include data on the shape of the fixed external object 2910, data on the type of the fixed external object 2910, data on the function of the fixed external object 2910, and/or the like. For example, the information on the distance between the fixed external object 2910 and the electronic device 2300 may include information on the distance and the direction (or angle) by which the electronic device 2300 is space apart from the fixed external object 2910. In other words, the electronic device 2300 may obtain the information on the visual object through the camera 2330, and may obtain the information between the distance between the fixed external object 2910 and the electronic device 2300, through the sensing circuit 2340.

According to an embodiment, the electronic device 2300 may identify information on the fixed external object 2910 through the sensing circuit 2340 other than the camera 2330. The electronic device 2300 may obtain the information on the distance between the fixed external object 2910 and the electronic device 2300 through the sensing circuit 2340, as well as the information on the type of the fixed external object 2910, the shape of the fixed external object 2910 and so on.

Meanwhile, the electronic device 2300 may transmit to the server 2400 the information on the distance between the fixed external object 2910 and the electronic device 2300 and the information on the visual object, obtained through the sensing circuit 2340. The information on the distance between the fixed external object 2910 and the electronic device and the information on the visual object may be transmitted to the server for adding the content corresponding to the fixed external object 2910 to an electronic map.

According to embodiments, the electronic device 2300 may identify a plurality of external objects prior to the camera 2330, through the sensing circuit 2340. The electronic device 2300 may identify existence of a plurality of external objects through the sensing circuit 2340, before acquiring an image through the camera 2330. The electronic device 2300 may capture the plurality of external objects through the camera 2330 and obtain an image including a plurality of visual objects each corresponding to the plurality of external objects. Based on the image obtained by the electronic device 2300, the information on the visual object may be obtained by identifying a visual object corresponding to the fixed external object 2910.

Figure 30:
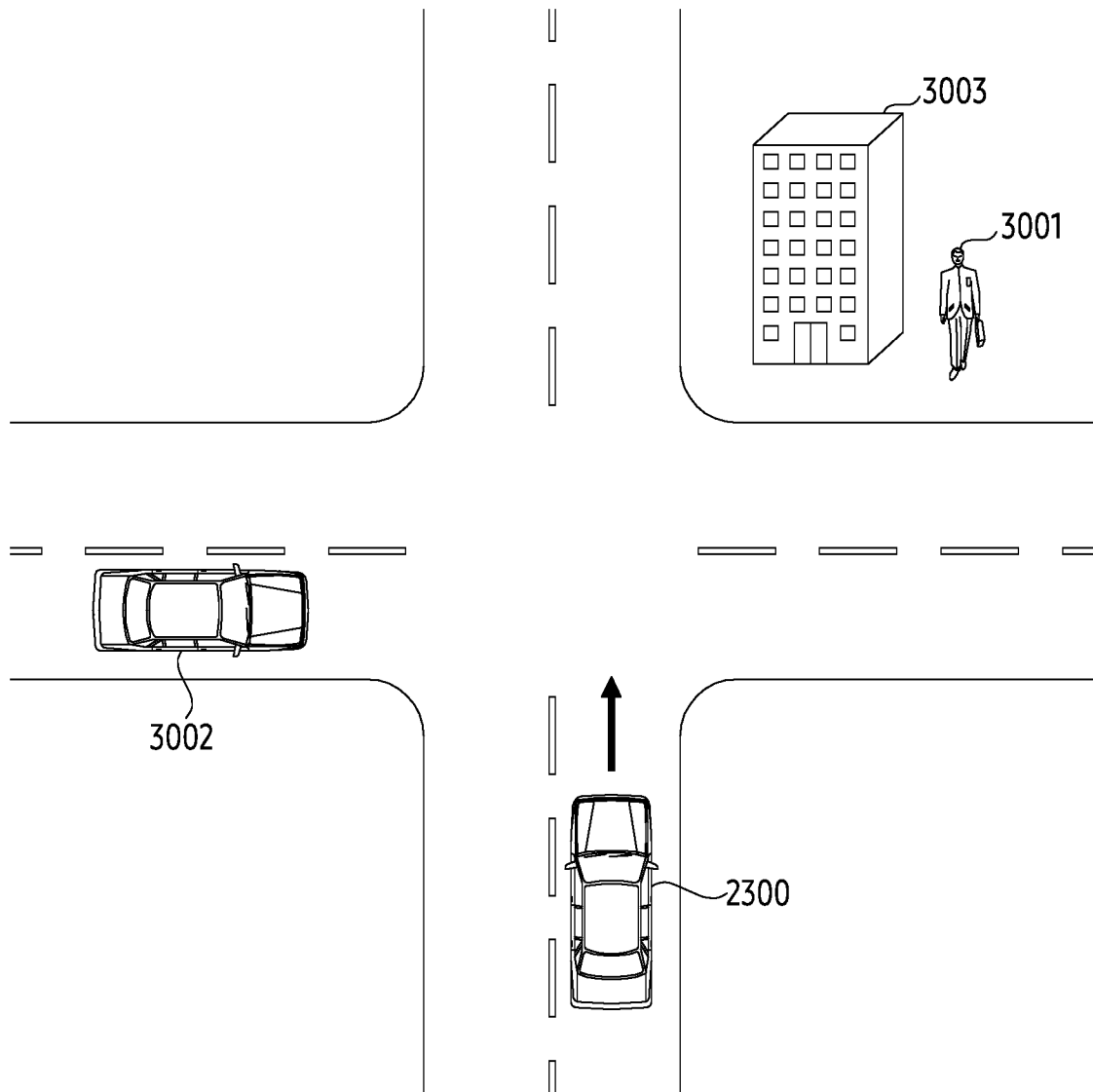
FIGS. 30 to 32 each show examples of operations of an electronic device according to various embodiments.
Figure 31:
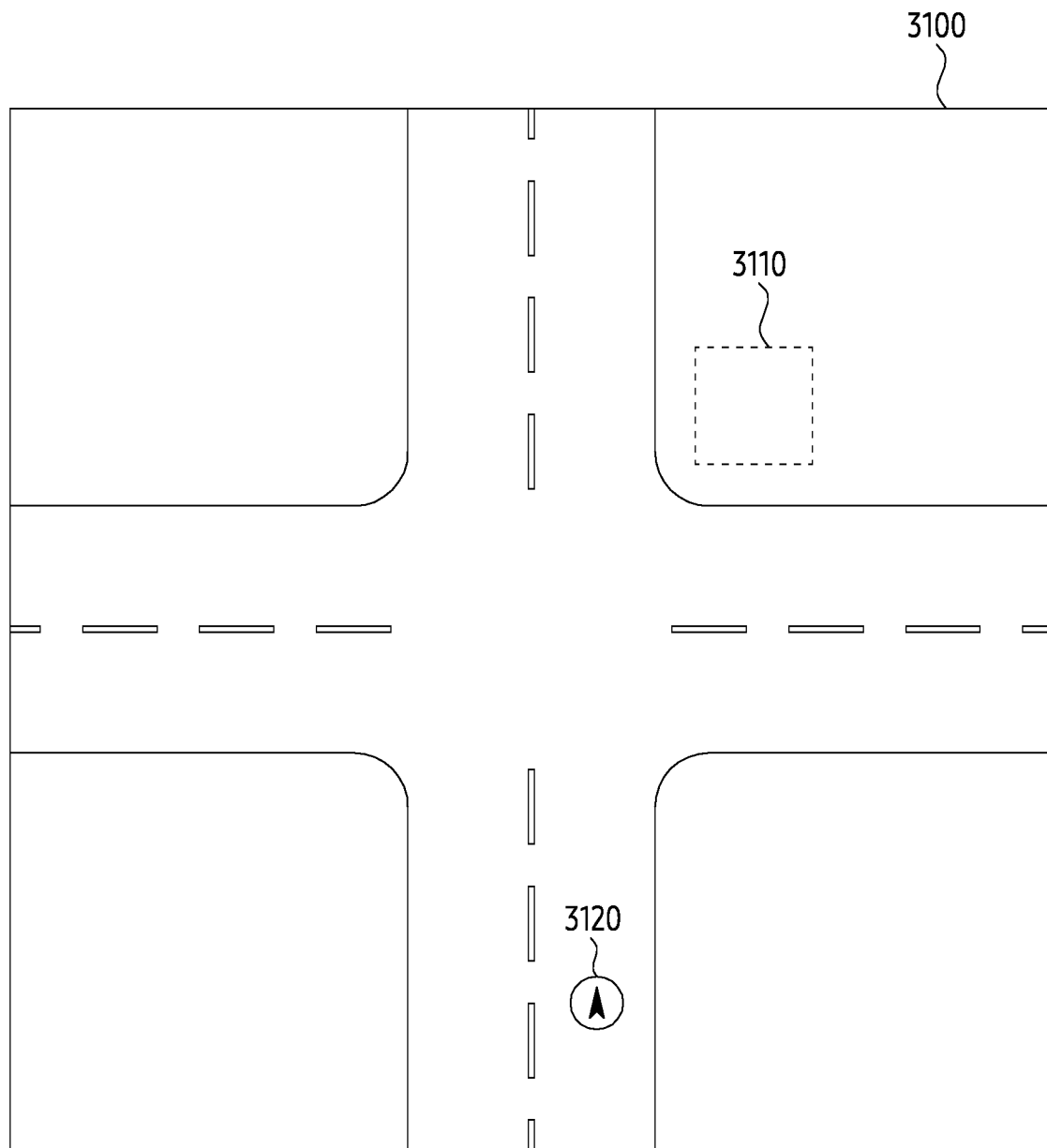
Figure 32:
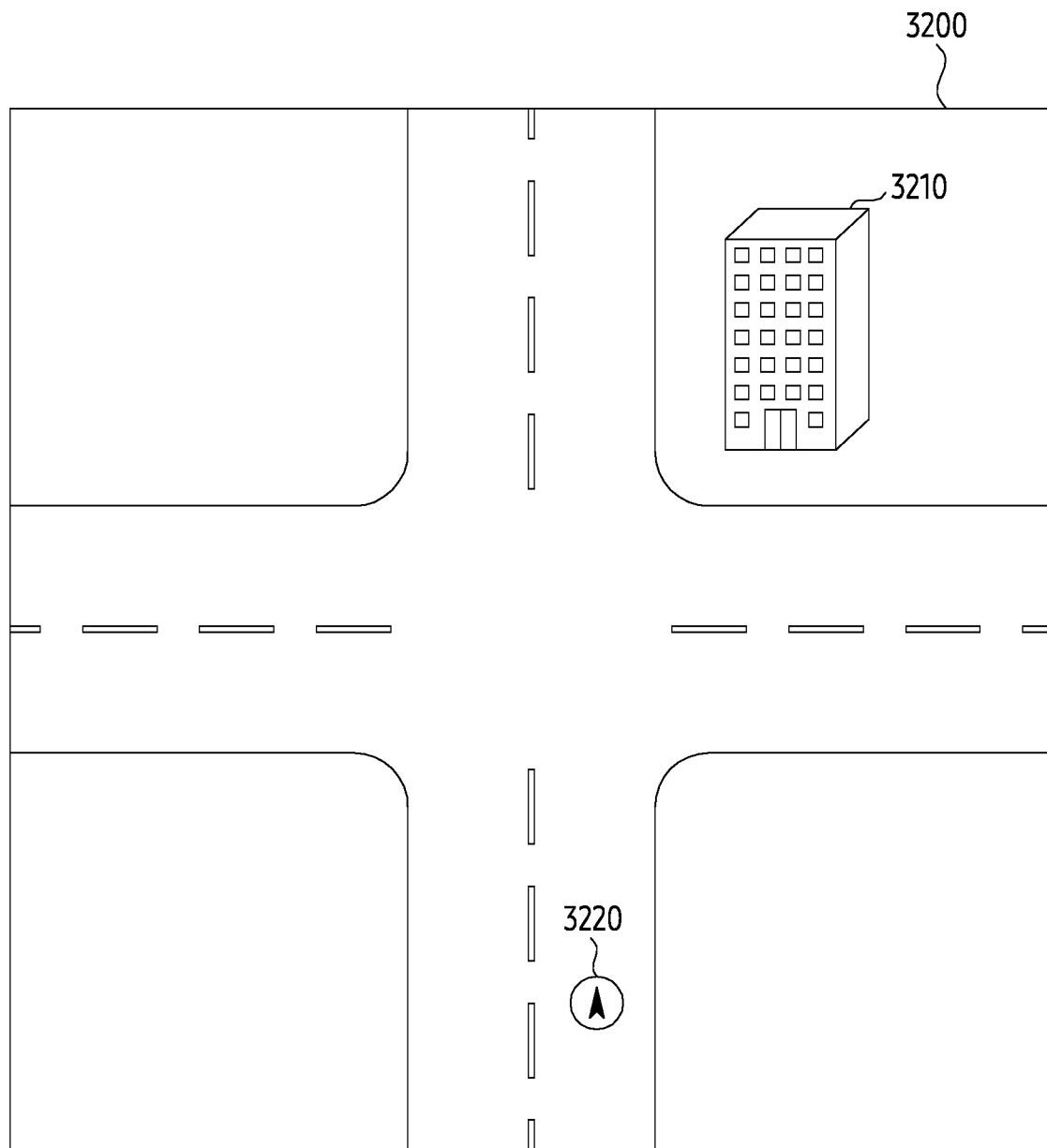

FIGS. 30 to 32 illustrate examples of operations of an electronic device according to various embodiments of the present disclosure.

Referring now to FIG. 30, the electronic device 2300 within a moving vehicle may identify a fixed external object 3003 outside the electronic device 2300 (or the vehicle) through the camera 2330. For example, the electronic device 2300 may obtain an image corresponding to the outside of the electronic device 2300 through the camera 2330. The image may include a plurality of visual objects each corresponding to a plurality of external objects. The electronic device 2300 may analyze the obtained image. The electronic device 2300 may determine whether the plurality of visual objects are dynamic objects or static objects, based on analyzing the obtained image. For example, the electronic device 2300 may obtain a plurality of images and then perform image registration of the plurality of images, so as to determine whether the plurality of visual objects are dynamic objects or static objects, by according to the above-described embodiment.

For example, the electronic device 2300 may determine the external object 3001 and the external object 3002 as a movable external object. The electronic device 2300 may determine the external object 3003 as a fixed external object.

Referring then to FIGS. 30 and 31, the electronic device 2300 may identify that a content representing the external object 3003 is not included in the electronic map 3100 displayed through an application executed in the electronic device 2300. For example, the electronic device 2300 may identify the content for a location 3110 on the electronic map 3100, corresponding to the location of the external object 3003. The electronic device 2300 may identify that the content representing the external object 3003 is different from the content for the location 3110 on the electronic map 3100 corresponding to the location of the external object 3003, or it is not displayed on the location 3110 in the electronic map 3100 corresponding to the location of the external object 3003. In addition, the electronic device 2300 may display the content 3120 for indicating the location of the electronic device 2300 on the electronic map 3100.

The electronic device 2300 may obtain information on a visual object by identifying the visual object corresponding to the external object 3003. The electronic device 2300 may obtain information on a distance between the external object 3003 and the electronic device 2300 through the sensing circuit 2340. The electronic device 2300 may transmit information on the visual object and information on the distance between the external object 3003 and the electronic device 2300, to the server 2400. The server 2400 may receive information on the visual object and the information on the distance between the external object 3003 and the electronic device 2300. The server 2400 may add the content corresponding to the external object 3003 to the electronic map, based on the information on the visual object and the information on the distance between the external object 3003 and the electronic device 2300. The server 2400 may transmit, to the electronic device 2300, the information on the electronic map added with the content.

Referring now to FIGS. 30 to 32, the electronic device 2300 may receive the information on the electronic map 3200 to which the content 3210 corresponding to the external object 3003 is added.

For example, the electronic device 2300 may display the received electronic map 3100 on the display 2360. The electronic device 2300 may transmit to the server 2400 the information on the external object 3003 and the information on the distance between the external object 3003 and the electronic device 2300, based on that the content 3210 representing the external object 3003 is not displayed on the electronic map 3100.

The electronic device 2300 may receive from the server 2400 the information on the electronic map 3200 including the content 3210 representing the external object 3003, and display the received electronic map 3200 on the display 2360.

In other words, the electronic device 2300 may identify the external object 3003 that is not displayed on the electronic map 3100 and add the content representing the external object 3003 to the electronic map 3100 in real time, so as to update the electronic map 3100. In addition, the electronic device 2300 may display a content 3220 for indicating the location of the electronic device 2300 through the updated electronic map 3200.

According to the foregoing embodiments, it has been described that the operation of identifying the information on the fixed external object and the information on the geographic location of the fixed external object is performed in the electronic device 2300, but it is only for convenience of description. Then, the operation of identifying the information on the fixed external object and the information on the geographic location of the fixed external object may be performed by the server 2400.

Figure 33:
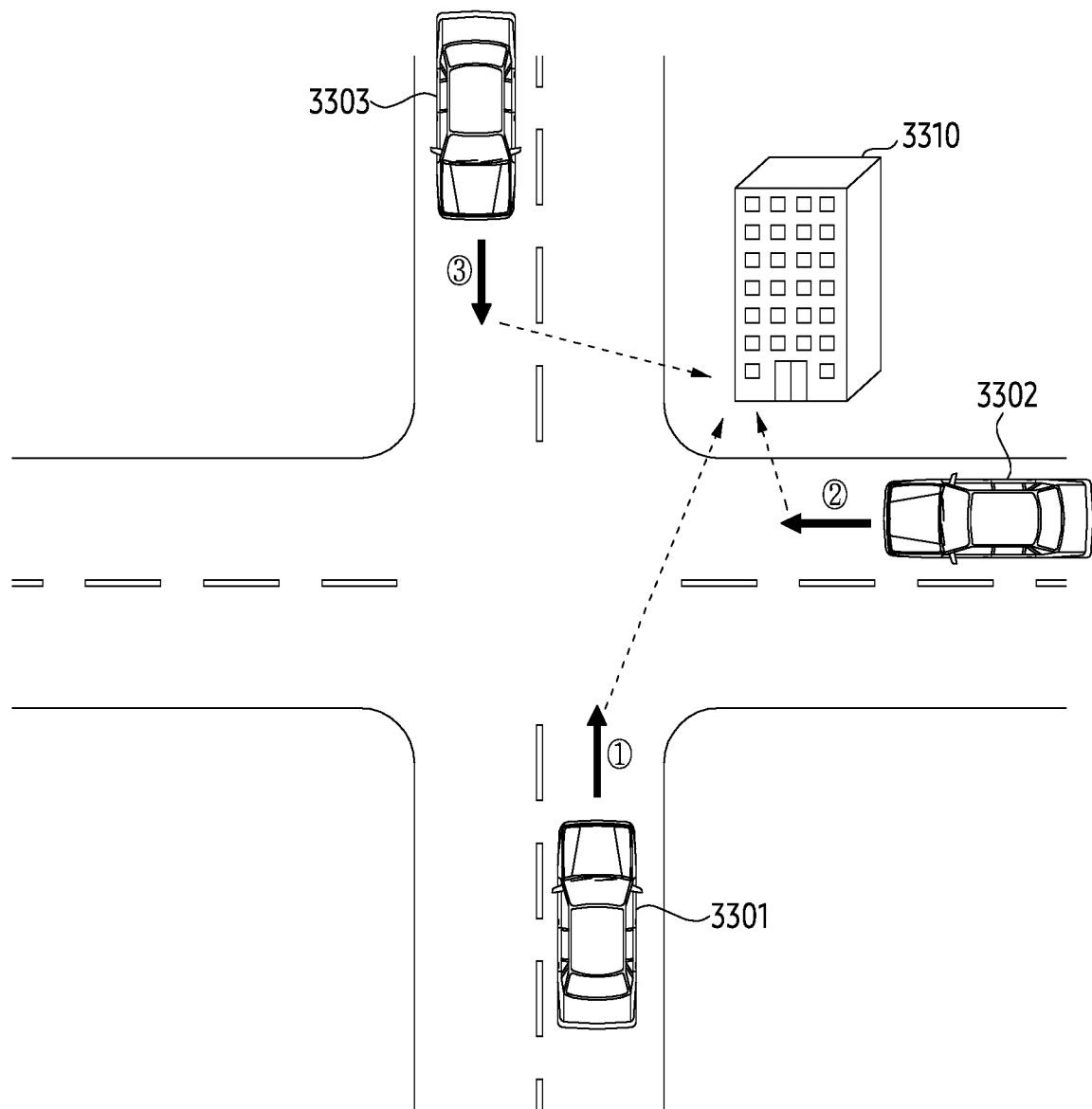
FIGS. 33 and 34 show examples of operations of a server according to various embodiments.
Figure 34:
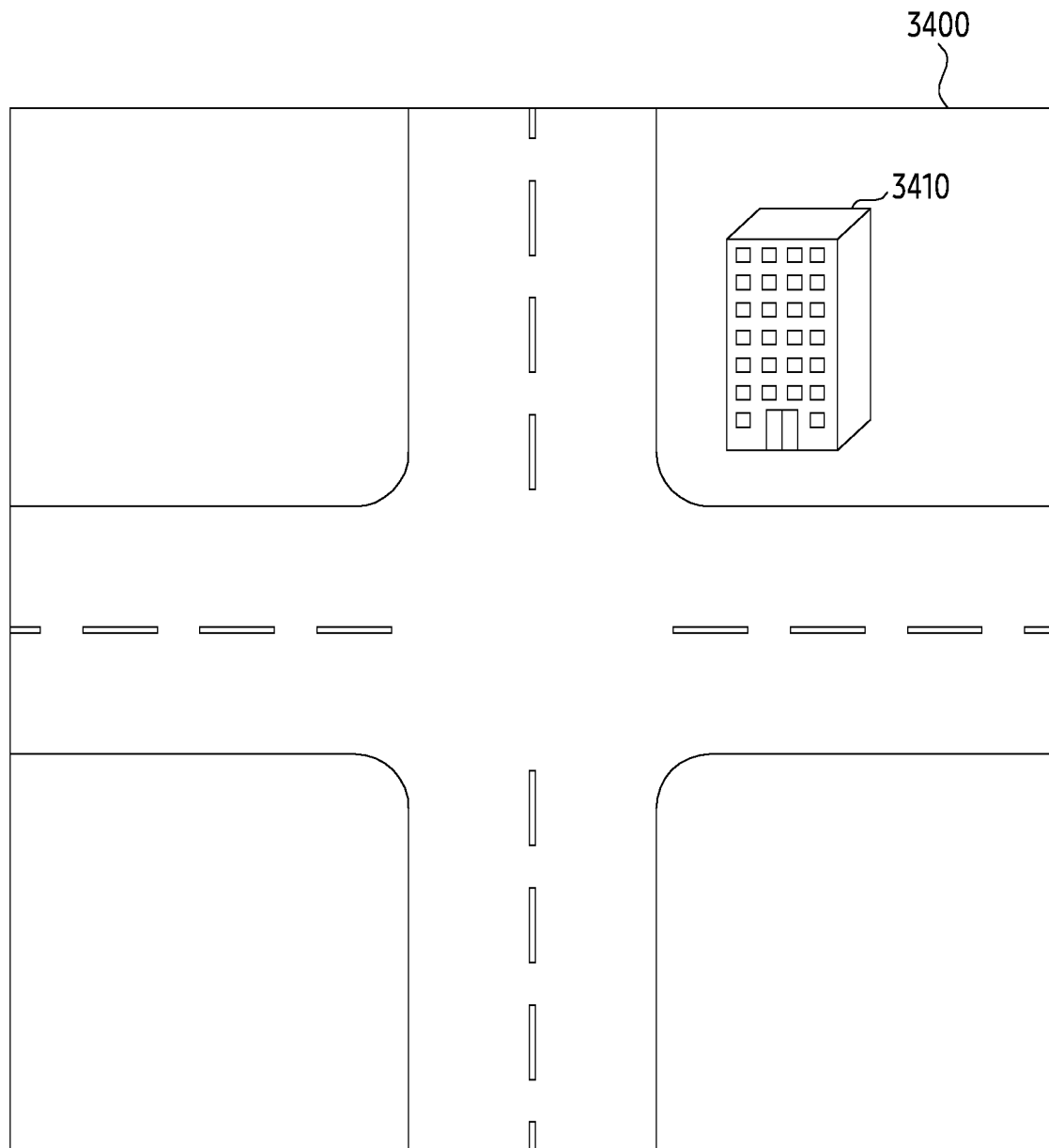

FIGS. 33 and 34 each show an example of operations of a server according to various embodiments.

Referring now to FIG. 33, the server 2400 may store an electronic map and transmit the stored electronic map to a vehicle (or an electronic device). In the electronic map, as geographic information on roads, buildings, and/or bridges requires frequent and continuous updates, the server 2400 may be adapted to receive information on certain external objects through a plurality of vehicles (or a plurality of electronic devices), and update the electronic map based on the information on those external objects.

The server 2400 may obtain the information on a fixed external object 3310, based on information received from the first electronic device 3301, the second electronic device 3302, and the third electronic device 3303. As the first electronic device 3301, the second electronic device 3302 and the third electronic device 3303 are moving in different directions from different positions from each other, the first electronic device 3301, the second electronic device 3302 and the third electronic device 3303 may transmit different information to the server 2400.

For example, the first electronic device 3301 may identify a first visual object corresponding to the fixed external object 3310. The first electronic device 3301 may transmit, to the server 2400, information on a distance between the fixed external object 3310 and the first electronic device 3301, and information on the first visual object. The server 2400 may receive the information on the distance between the fixed external object 3310 and the first electronic device 3301 and the information on the first visual object.

The server 2400 may obtain first information on the fixed external object 3310 and information on a first geographic location of the fixed external object 3310, based on the information on the distance between the fixed external object 3310 and the first electronic device 3301, and the information on the first visual object.

For example, the second electronic device 3302 may identify a second visual object corresponding to the fixed external object 3310. The second electronic device 3302 may transmit, to the server 2400, information on a distance between the fixed external object 3310 and the second electronic device 3302 and information on the second visual object. The server 2400 may receive the information on the distance between the fixed external object 3310 and the second electronic device 3302 and the information on the second visual object.

The server 2400 may obtain second information on the fixed external object 3310 and information on a second geographic location of the fixed external object 3310, based on the information on the distance between the fixed external object 3310 and the second electronic device 3302, and the information on the second visual object.

For example, the third electronic device 3303 may identify a third visual object corresponding to the fixed external object 3310. The third electronic device 3303 may transmit, to the server 2400, information on a distance between the fixed external object 3310 and the third electronic device 3303, and information on the third visual object. The server 2400 may receive the information on the distance between the fixed external object 3310 and the third electronic device 3303, and the information on the third visual object.

The server 2400 provides information on the fixed external object 3310 based on the information on the distance between the fixed external object 3310 and the third electronic device 3303 and the information on the third visual object. The third information and information on the third geographic location of the fixed external object 3310 may be obtained.

The first to third information is of information each obtained through the first electronic device 3301 to the third electronic device 3303, and may be different from each other. In other words, the first to third information may include some errors or tolerance. The server 2400 may obtain accurate information on the fixed external object 3310 based on the first to third information. For example, the server 2400 may calibrate the information on the fixed external object 3310, based on the first to third information, to obtain accurate information on the fixed external object 3310.

For example, the server 2400 may identify the fixed external object 3310 as a traffic light, based on the first information. The server 2400 may identify the fixed external object 3310 as a traffic sign, based on the second information. The server 2400 may identify the fixed external object 3310 as a traffic light, based on the third information. The server 2400 may then identify the fixed external object 3310 as a traffic light, based on the first to third information.

In the meantime, the information on the first to third geographic locations may be different from each other, as they are obtained based on information obtained through the first to third electronic devices 3301 to 3303. In other words, the information on the first to third geographic locations may include some errors or tolerance. The server 2400 may obtain accurate information on the geographic location of the fixed external object 3310, based on the information on the first to third geographic locations. For example, the server 2400 may calibrate the information on the geographic location of the fixed external object 3310, based on the information on the first to third geographic locations, so as to obtain more accurate information on the geographic location of the fixed external object 3310.

Referring to FIGS. 33 and 34, the server 2400 may update the electronic map 3400, based on the accurate information on the fixed external object 3310 and the accurate information on the geographic location of the fixed external object 3310. For example, the server 2400 may add a content 3410 representing the fixed external object 3310 to a location corresponding to the geographic location of the fixed external object 3310 on the electronic map 3400.

Further, the server 2400 may transmit information on the updated electronic map 3400 to the first to third electronic devices 3301 to 3303. For example, the first to third electronic devices 3301 to 3303 may receive the information on the updated electronic map 3400. For example, the first electronic device 3301 may display the updated electronic map 3400 on a display of the first electronic device 3301.

According to embodiments, the electronic device (e.g., the first electronic device 3301) may perform at least some of the functions of the aforementioned server 2400.

For example, the first electronic device may perform at least some of the functions of the above-described server 2400. The first electronic device 3301 may receive, from the second electronic device 3302, information on a distance between the fixed external object 3310 and the second electronic device 3302, and information on the second visual object. The first electronic device 3301 may obtain second information on the fixed external object 3310 and the information on the second geographic location of the fixed external object 3310, based on the information on the distance between the fixed external object 3310 and the second electronic device 3302, and the information on the second visual object.

The first electronic device 3301 may receive, from the third electronic device 3303, information on a distance between the fixed external object 3310 and the third electronic device 3303, and information on the third visual object. The first electronic device 3301 may obtain the third information on the fixed external object 3310 and the information on the third geographic location of the fixed external object 3310, based on the information on the distance between the fixed external object 3310 and the third electronic device 3303 and the information on the third visual object.

The first electronic device 3301 may obtain accurate information on the fixed external object 3310, based on the second information and the third information. The first electronic device 3301 may obtain accurate information on the geographic location of the fixed external object 3310, based on the information on the second geographic location and the information on the third location.

The first electronic device 3301 may update the electronic map. The first electronic device 3301 may transmit information on the updated electronic map to the second electronic device 3302 and the third electronic device 3303.

Figure 35:
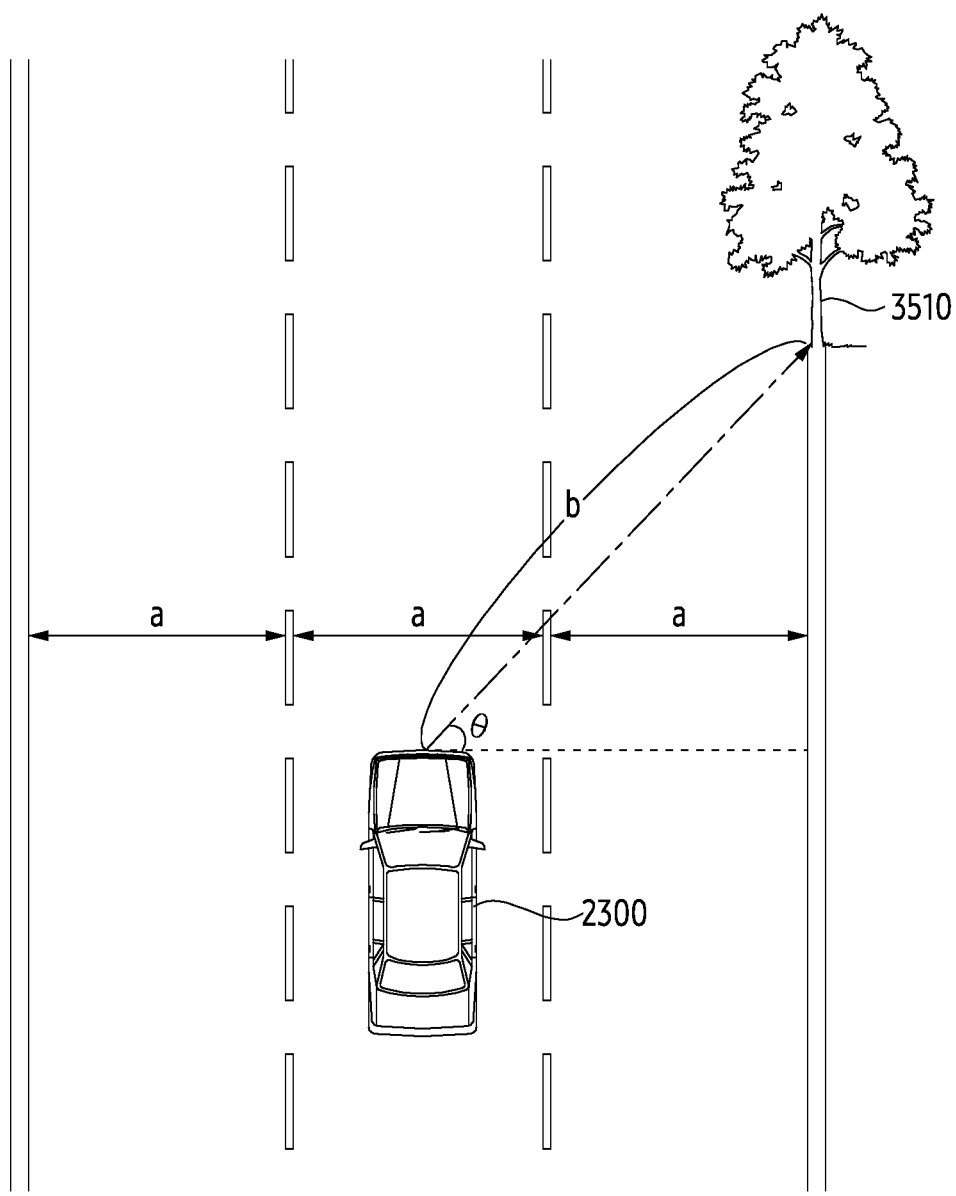
FIG. 35 shows an example for identifying a geographic location of a fixed external object according to various embodiments.

FIG. 35 shows an example for identifying a geographic location of a fixed external object according to various embodiments.

Referring to FIG. 35, the electronic device 2300 may be incorporated into a moving vehicle. The electronic device 2300 may identify in which lane the vehicle is driving. For example, the electronic device 2300 may identify in which lane the vehicle is driving, based on information obtained through the GPS communication circuitry or the camera 2330.

The electronic device 2300 may obtain information on a width of the lane in which the vehicle is traveling. For example, the electronic device 2300 may receive information on the width of the lane in which the vehicle is traveling, through the server 2400. As another example, the electronic device 2300 may obtain information on the width of the lane in which the vehicle is traveling, based on information on the width of the lane included in the electronic map.

The electronic device 2300 may identify a fixed external object 3510. The electronic device 2300 may identify a distance between the fixed external object 3510 and the electronic device 2300. The electronic device 2300 may identify an angle between a first straight line extending from the location of the electronic device 2300 to the location of the fixed external object 3510 and a second straight line perpendicular to the driving lane. The electronic device 2300 may identify the geographical location of the fixed external object 3510, based on the angle between the first straight line and the second straight line perpendicular to the driving lane, and the width of the lane.

For example, the fixed external object 3510 may be located at one side end of the road. The electronic device 2300 may identify the relative location of the fixed external object 3510 with respect to the electronic device 2300, in order to identify the geographic location of the fixed external object 3510. When the vehicle with the electronic device 2300 is driving in a second lane of three lanes of the road, the electronic device 2300 may display the relative location of the fixed external object 3510, on the basis of the electronic device 2300, using the Equations 7 and 8 below.

$$X = \frac{2a}{2} \quad \text{[Equation 7]}$$

Referring to the Equation 7, 'X' is a distance by which the geographic location 2630 of the fixed external object is spaced apart in the second direction perpendicular to the first direction with respect to the electronic device 2300, and 'a' is the width of the lane.

$$Z = \frac{2a}{2}\tan\theta \quad \text{[equation 8]}$$

Referring to the Equation 8, 'Z' is a distance by which the geographical location 2630 of the fixed external object is space apart in the traveling direction of the vehicle with respect to the electronic device 2300, and 'a' is the width of the lane. Further, 'θ' is the angle between the first straight line extending from the location of the electronic device 2300 to the location of the fixed external object 3510 and the second straight line perpendicular to the lane of the road.

The electronic device 2300 may identify the relative location of the fixed external object 3510 with respect to the electronic device 2300, based on the Equations 7 and 8. The electronic device 2300 may identify the current location of the vehicle based on the GPS communication circuitry. The electronic device 2300 may identify the geographic location of the fixed external object 3510, based on the current vehicle location and the relative location of the fixed external object 3510.

According to embodiments, the electronic device 2300 may identify the distance between the fixed external object 3510 and the electronic device 2300. The electronic device 2300 may identify the angle between the first straight line extending from the location of the electronic device 2300 to the location of the fixed external object 3510 and the second straight line perpendicular to the lane of the road. The electronic device 2300 may identify the geographic location of the fixed external object 3510, based on the angle between the first straight line and the second straight line, and the distance between the fixed external object 3510 and the electronic device 2300.

$$X = b\cos\theta \quad \text{[Equation 9]}$$

Referring to the Equation 9, 'X' is a distance by which the geographical location 2630 of the fixed external object is spaced apart from the electronic device 2300 in the second direction perpendicular to the first direction. 'b' is the distance between the fixed external object 3510 and the electronic device 2300. 'θ' is the angle between the first straight line extending from the location of the electronic device 2300 to the location of the fixed external object 3510 and the second straight line perpendicular to the lane of the road.

$$Z = b\sin\theta \quad \text{[Equation 10]}$$

Referring to the Equation 10, 'Z' is the distance by which the geographical location 2630 of the fixed external object is spaced apart in the traveling direction of the vehicle from the electronic device 2300. 'b' is the distance between the fixed external object 3510 and the electronic device 2300), and 'θ' is the angle between the first straight line extending from the location of the electronic device 2300 to the location of the fixed external object 3510 and the second straight line perpendicular to the lane of the road.

According to embodiments, the electronic device 2300 may identify the distance between the external object 3510 and the electronic device 2300, based on the information on the width of the lane in which the vehicle with the electronic device 2300 is traveling, the focal length, and a width of a visual object corresponding to the lane of the road within the image obtained through the camera 2330 of the electronic device 2300. The electronic device 2300 may identify the geographic location of the external object 3510, based on the distance between the external object 3510 and the electronic device 2300.

According to embodiments, the electronic device 2300 may transmit, to the server 2400, the information on the location of the electronic device 2300 and the information on the angle between the first straight line extending from the location of the electronic device 2300 to the location of the fixed external object 3510 and the second straight line perpendicular to the lane of the road. The server 2400 may obtain information on the width of the lane in which the vehicle with the electronic device 2300 is traveling. The server 2400 may identify the geographic location of the fixed external object 3510, based on the information on the location of the electronic device 2300, the information on the angle between the first straight line and the second straight line, and the information on the width of the lane of road.

According to embodiments, the electronic device 2300 may transmit, to the server 2400, the information on the location of the electronic device 2300, the information on the angle between the first straight line extending from the location of the electronic device 2300 to the location of the fixed external object 3510 and the second straight line perpendicular to the lane of the road, and the information on the distance between the external object 3510 and the electronic device 2300. The server 2400 may obtain information on the width of the lane in which the vehicle including the electronic device 2300 is traveling. The server 2400 may identify the geographic location of the fixed external object 3510, based on the information on the location of the electronic device 2300, the information on the angle between the first straight line and the second straight line, and the information on the distance between the external object 3510 and the electronic device 2300.

Figure 36:
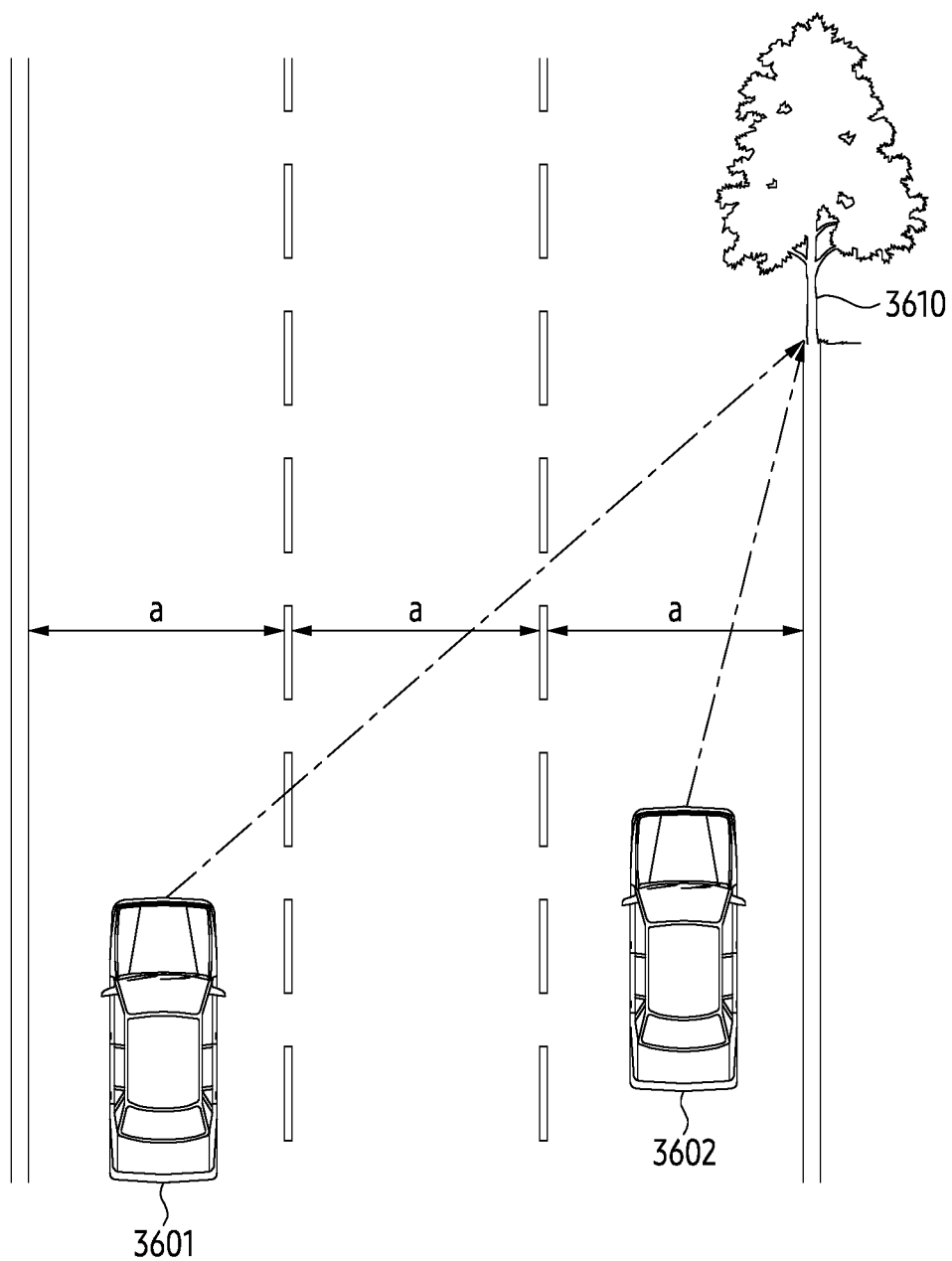
FIG. 36 shows an example for identifying a geographic location of a fixed external object according to various embodiments.

FIG. 36 shows an example for identifying a geographic location of a fixed external object according to various embodiments of the present disclosure.

Referring to FIG. 36, the server 2400 may receive information on the first geographic location of the fixed external object 3610 from the first electronic device 3601. The server 2400 may receive information on the second geographic location of the fixed external object 3610 from the second electronic device 3602. The server 2400 may identify information on the accurate geographic location of the fixed external object 3610, based on the information on the first geographic location and the information on the second geographic location. For example, the server 2400 may identify the information on the accurate geographic location of the fixed external object 3610, by calculating the average of the first geographic location and the second geographic location.

According to an embodiment, the server 2400 may receive a first image including a first visual object corresponding to the fixed external object 3610 from the first electronic device 3601. The server 2400 may receive a second image including a second visual object corresponding to the fixed external object 3610 from the second electronic device 3602. The server 2400 may identify (or estimate) a first geographic location of the fixed external object 3610 based on the first image. The server 2400 may identify (or estimate) a second geographic location of the fixed external object 3610 based on the second image. The server 2400 may identify information on the accurate geographic location of the fixed external object 3610, by calculating the average of the first geographic location and the second geographic location.

Figure 37:
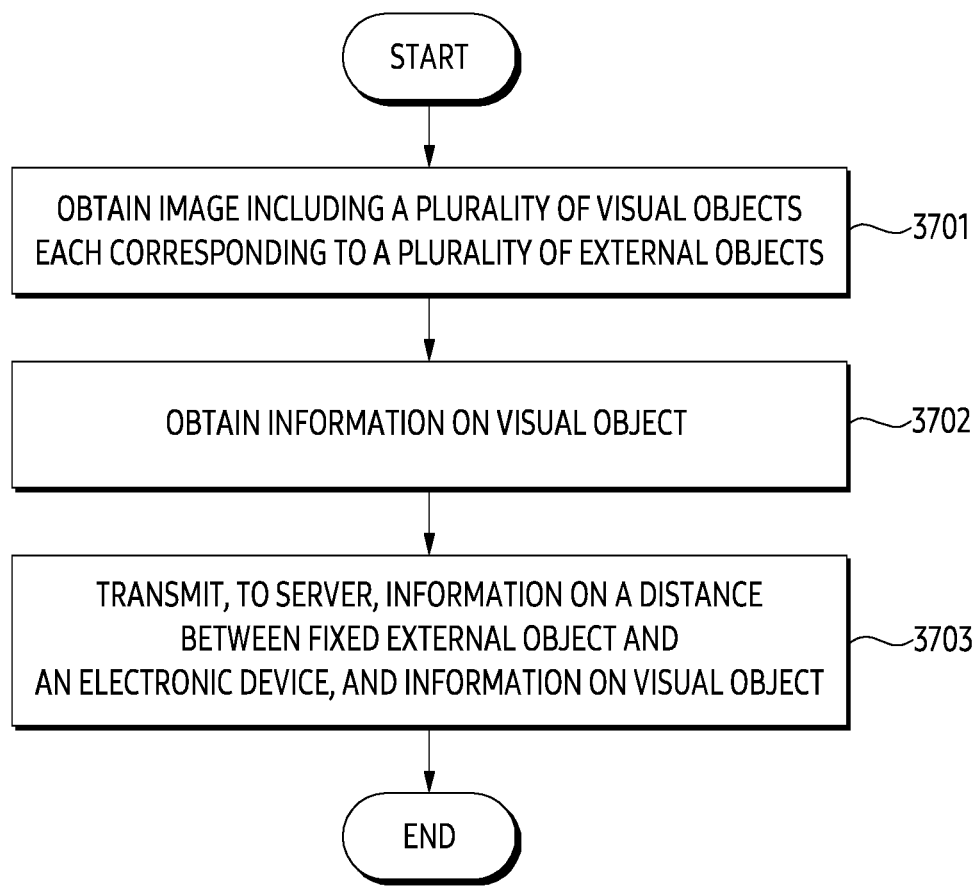
FIG. 37 shows an example of an operation of an electronic device according to various embodiments.

FIG. 37 shows an example of an operation of an electronic device according to various embodiments of the present disclosure.

Referring to FIG. 37, the electronic device may be related to or associated with the electronic device 2300 of FIG. 23. For example, the electronic device may be incorporated into in a moving vehicle.

In operation 3701, the electronic device (e.g., the processor of the electronic device) may obtain an image including a plurality of visual objects respectively corresponding to a plurality of external objects through the camera. The plurality of visual objects may include a visual object corresponding to a fixed external object.

For example, the camera may be located in front of the vehicle. The electronic device may obtain an image including a plurality of visual objects respectively corresponding to a plurality of external objects located in front of the vehicle, through the camera.

According to an embodiment, the electronic device may identify whether a first content corresponding to the fixed external object exists in a location on the electronic map corresponding to the geographic location of the fixed external object. The electronic device may obtain the image including the plurality of visual objects respectively corresponding to the plurality of external objects, based on whether the first content exists or not.

For example, the electronic device may obtain the image including the plurality of visual objects respectively corresponding to the plurality of external objects, based on the absence of the first content at the location on the electronic map corresponding to the geographical location of the fixed external object.

According to an embodiment, the electronic device may identify whether the second content is related to the fixed external object, at the location on the electronic map corresponding to the location of the fixed external object. The electronic device may obtain the image including a plurality of visual objects, based on whether or not the second content is related to the fixed external object.

For example, the electronic device may identify that the second content is displayed at a location on the electronic map corresponding to the location of the fixed external object. The electronic device may obtain the image including a plurality of visual objects, based on determining that the second content is not related to the fixed external object. For example, when the fixed external object is a roadside tree, the electronic device may identify that the content representing a building is displayed at the location on the electronic map corresponding to the location of the roadside tree. Since the content representing the building is not associated with to the roadside tree, the electronic device may obtain an image including a plurality of visual objects.

In operation 3702, the electronic device may obtain information on the visual object, by identifying the visual object corresponding to the fixed external object among a plurality of visual objects, based on a result of analysis of the obtained image.

For example, the electronic device may classify the plurality of visual objects into one of a dynamic object and a static object, based on the result of analysis of the obtained image. For example, the visual object corresponding to the fixed external object may be classified as a static object.

For example, the information on the visual object may include data about the shape of the fixed external object, data about the type of the fixed external object, and data about the function of the fixed external object.

According to an embodiment, the electronic device may analyze the obtained image. The electronic device may identify the visual object corresponding to the fixed external object among the plurality of visual objects. The electronic device may obtain information on the visual object, by identifying the visual object corresponding to the fixed external object.

For example, the electronic device may obtain data on the type of the fixed external object based on the visual object corresponding to the fixed external object among the plurality of visual objects. As an example, the electronic device may obtain information on the width of the fixed external object. The electronic device may obtain data on the type of the fixed external object through the machine learning model, based on the information on the width of the fixed external object. According to an embodiment, the electronic device may transmit the information on the width of the fixed external object to the server for performing a machine learning model, and receive data on the type of the fixed external object through the server for performing the machine learning model.

According to an embodiment, the electronic device may transmit the obtained image to the server. The electronic device may receive information on the result of analysis of the obtained image from the server.

For example, the obtained image may be used together with a reference image to extract a plurality of feature points. In other words, the server may extract the plurality of feature points based on the obtained image and the reference image. The plurality of feature points, which are points at which an image brightness rapidly changes in the reference image or the obtained image, may include an edge of pixel or a corner point. The plurality of feature points may include first feature points extracted from the reference image and second feature points extracted from the obtained image.

According to an embodiment, the electronic device may transmit, to the server, information on the angle at which the obtained image was captured and the direction in which the obtained image was captured, together with the obtained image.

In operation 3703, the electronic device may transmit, to the server, information on a distance between a fixed external object and the electronic device, and information on a visual object, obtained through the sensing circuit. The information on the distance between the fixed external object and the electronic device, and the information on the visual object may be transmitted to the server to add the first content corresponding to the fixed external object to the electronic map.

The electronic device may receive information for displaying the first content on the electronic map within the application for displaying the electronic map. The electronic device may display the electronic map to which the first content is added, through the display.

According to an embodiment, the electronic device may obtain information on the distance between the fixed external object and the electronic device through a sensing circuit. For example, the sensing circuit may include a transmitter configured to emit a signal and a receiver configured to receive its reflected signal. For example, the sensing circuit may include a radar sensor or a lidar sensor.

According to an embodiment, the electronic device may identify angle information between a straight line perpendicular to the travelling direction of the vehicle and another straight line extending from the location of the vehicle (or the location of the electronic device) towards the fixed external object. The electronic device may transmit to the server the angle information together with the information on the distance between the fixed external object and the electronic device.

According to an embodiment, the electronic device may also obtain the information on the distance between the fixed external object and the electronic device through the camera. The electronic device may obtain the information on the distance between the fixed external object and the electronic device, based on the width of the visual object and the focal length of the camera. For example, the electronic device may obtain the information on the width of the fixed external object. The information on the width of the fixed external object may include information on the average width of the fixed external object. The electronic device may obtain the information on the distance between the fixed external object and the electronic device, based on the average width of the fixed external object, the width of the visual object, and the focal length of the camera. For example, the electronic device may obtain the information on the distance between the fixed external object and the electronic device using the Equation 11 below.

$$D = W \times (f + w)$$ [Equation 11]

Referring to the Equation 11, 'D' is the distance between the fixed external object and the electronic device. 'W' is the average width of the fixed external object, 'f' is the focal length of the camera, and 'w' is the width of the visual object.

According to an embodiment, the electronic device may obtain the information on the geographic location of the electronic device through the GPS communication circuitry. The electronic device may identify the information on the geographic location of the fixed external object, based on the information on the geographic location of the electronic device and the information on the distance between the fixed external object and the electronic device. The electronic device may transmit the information on the geographic location of the fixed external object to the server.

According to an embodiment, the electronic device may obtain the information on the width of a lane in which a moving vehicle is located. The electronic device may obtain the information on the width of the fixed external object, based on the information on the width of the lane of the road. The electronic device may transmit the information on the fixed width of the external object to the server. The information on the width of the fixed external object may be used to obtain data about the type of the fixed external object.

According to an embodiment, the electronic device may identify that the fixed external object is located within a predetermined radius of the electronic device. The electronic device may establish a connection with the fixed external object. The electronic device may receive the information on the geographic location of the fixed external object and the information on the fixed external object, from the fixed external object. The electronic device may transmit the information on the geographic location of the fixed external object to the server.

According to embodiments, the electronic device may identify that an external electronic device is located within a predetermined radius of the electronic device. The electronic device may establish a connection with the external electronic device, based on identifying that the external electronic device is located within the predetermined radius of the electronic device. The electronic device may receive the information on the distance between the fixed external object and the external electronic device, from the external electronic device. The electronic device may obtain the information on the geographic location of the fixed external object, based on the information on the distance between the fixed external object and the electronic device, and the information on the distance between the fixed external object and the external electronic device. The electronic device may transmit the information on the geographic location of the fixed external object to the server.

Figure 38:
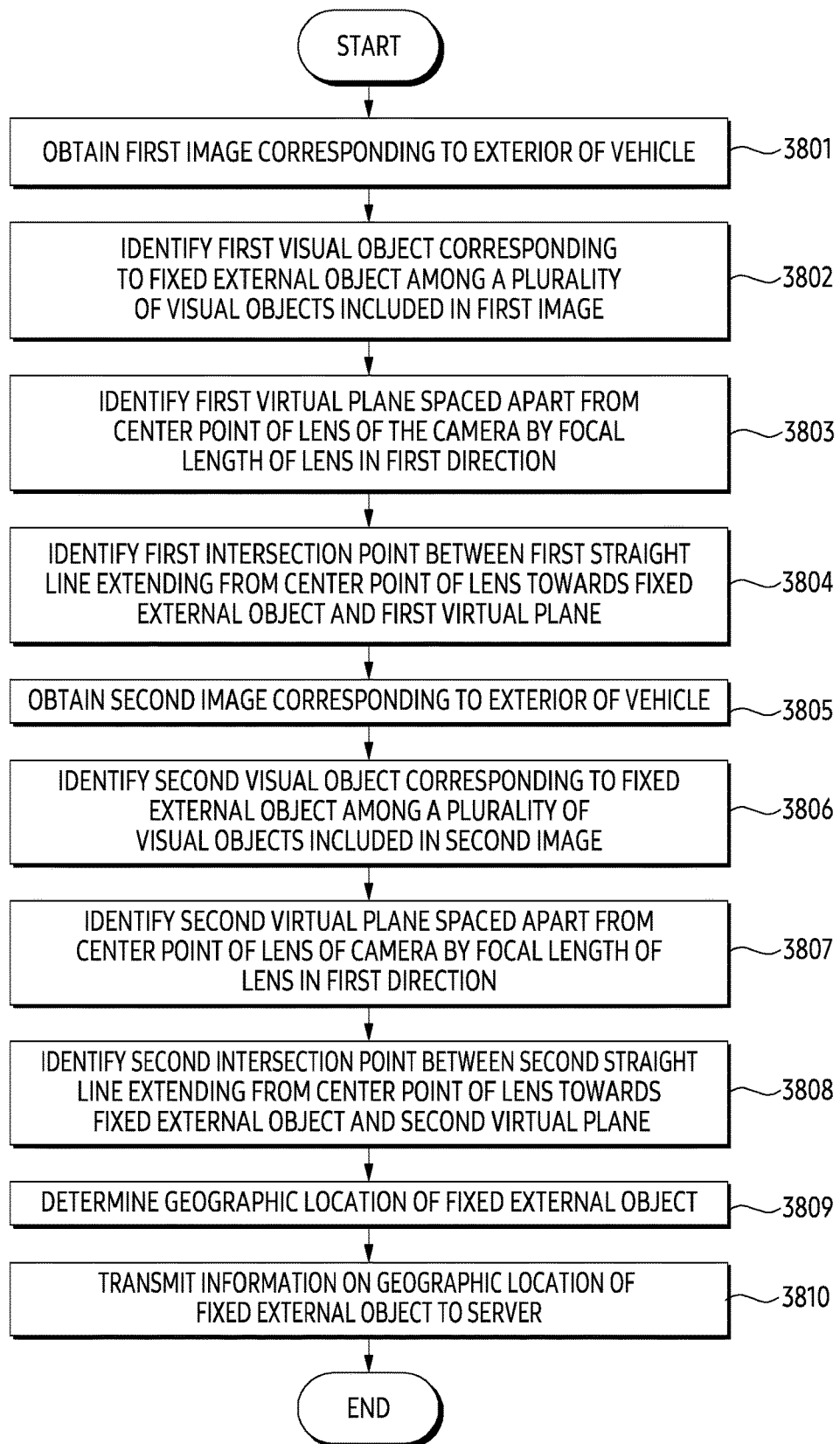
FIG. 38 shows another example of an operation of an electronic device according to various embodiments.

FIG. 38 shows another example of an operation of an electronic device according to various embodiments of the present disclosure.

Referring to FIG. 38, the electronic device may be related to the electronic device 2300 of FIG. 23. For example, the electronic device may be incorporated into a moving vehicle.

In operation 3801, the electronic device (e.g., a processor of the electronic device) may obtain a first image corresponding to the exterior of the vehicle through a camera, at a first location, while the electronic device in the vehicle is moving in a first direction.

For example, the electronic device may obtain the first image corresponding to the outside of the vehicle, through a camera, at a first location capable of identifying a fixed external object, based on that a first content corresponding to a fixed external object is not displayed on the electronic map.

In operation 3802, the electronic device may identify a first visual object corresponding to the fixed external object among a plurality of visual objects included in the first image. For example, the electronic device may identify the first visual object based on a result of analysis of the first image. The electronic device may classify the plurality of visual objects into one of a static object and a dynamic object, and may identify the first visual object classified as the static object.

In operation 3803, while the electronic device is located in the first location, the electronic device may identify a first virtual plane spaced apart from the center point of lens of the camera by a focal length of the lens in a first direction. For example, the first virtual plane may correspond to the first image.

In operation 3804, at the first location, the electronic device may identify a first intersection point between a first straight line extending from the center point of the lens towards the fixed external object and the first virtual plane.

In operation 3805, after moving from the first location in the first direction, the electronic device may obtain a second image corresponding to the exterior of the vehicle at a second location through the camera.

In operation 3806, the electronic device may identify a second visual object corresponding to the fixed external object among a plurality of visual objects included in the second image. For example, the first visual object and the second visual object may correspond to the fixed external object. The first visual object and the second visual object are objects included in images obtained from different locations, and may have different dimensions or shapes.

In operation 3807, the electronic device may identify a second virtual plane spaced apart from the center point of the lens of the camera by the focal length of the lens in the first direction, while the electronic device is located in the second location. For example, the second virtual plane may correspond to the second image.

In operation 3808, at the second location, the electronic device may identify a second intersection point between a second straight line extending from the center point of the lens towards the fixed external object and the second virtual plane.

In operation 3809, the electronic device may determine the geographic location of the fixed external object based on the first intersection point and the second intersection point.

According to an embodiment, the electronic device may identify the first location and the second location through a GPS communication circuitry. The electronic device may determine the relative location of the fixed external object with respect to the second location, based on the first intersection point and the second intersection point. The electronic device may determine the geographic location of the fixed external object based on the determined relative location.

According to an embodiment, the electronic device may identify speed information of the electronic device between the first location and the second location through the speedometer. The electronic device may identify time information required to move from the first location to the second location. The electronic device may obtain a distance between the first location and the second location based on the speed information and the time information. The electronic device may determine the geographic location of the fixed external object based on the obtained distance between the first location and the second location. For example, the electronic device may determine the relative location of the fixed external object with respect to the second location, based on the obtained distance between the first location and the second location, and the first intersection point and the second intersection point. The electronic device may determine the geographic location of the fixed external object based on the geographic location of the second location.

According to an embodiment, the electronic device may obtain information on the width of the lane in which the vehicle is travelling. The electronic device may identify an angle between the first direction and the first straight line. The electronic device may determine the geographic location of the fixed external object, based on the width of the lane of the road and the angle. For example, the electronic device may determine the relative location of the fixed external object on the basis of the first location. The electronic device may determine the geographic location of the fixed external object based on the geographic location of the first location.

In operation 3810, the electronic device may transmit the information on the geographic location of the fixed external object to the server. For example, the information on the geographic location of the fixed external object may be transmitted to the server to add the content corresponding to the fixed external object onto the electronic map.

According to an embodiment, the electronic device may obtain data on the type of the fixed external object based on the first visual object and the second visual object. The electronic device may transmit the data on the type of the fixed external object to the server together with information on the geographic location of the fixed external object.

Figure 39:
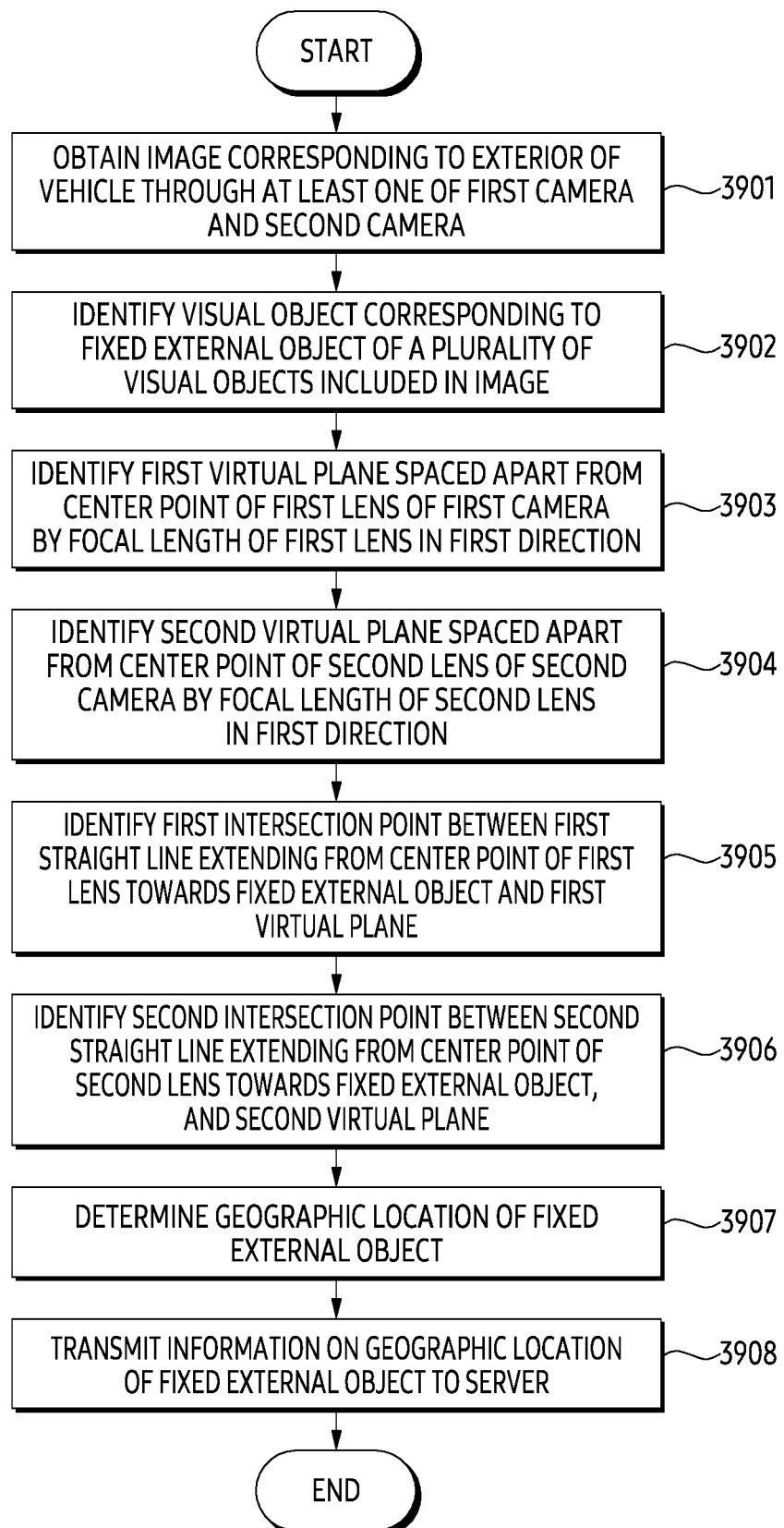
FIG. 39 shows another example of an operation of an electronic device according to various embodiments.

FIG. 39 shows another example of an operation of an electronic device according to various embodiments of the present disclosure.

Referring now to FIG. 39, the electronic device may be related to the electronic device 2300 of FIG. 23. For example, the electronic device may be incorporated into in a moving vehicle. The electronic device may include two or more cameras. As an example, the electronic device may include a first camera and a second camera.

In operation 3901, the electronic device may obtain an image corresponding to the exterior of the vehicle through at least one of the first camera and the second camera.

For example, the electronic device may obtain the image corresponding to the exterior of the vehicle, based on identifying that the first content corresponding to the fixed external object is not displayed on the electronic map.

In operation 3902, the electronic device may identify a visual object corresponding to the fixed external object of a plurality of visual objects included in the image. For example, the electronic device may identify the visual object corresponding to the fixed external object based on a result of analysis of the image. The electronic device may classify the plurality of visual objects into one of a static object and a dynamic object, and may identify the visual object corresponding to the fixed external object classified as the static object.

In operation 3903, the electronic device may identify a first virtual plane spaced apart from the center point of the first lens of the first camera by the focal length of the first lens in the first direction.

In operation 3904, the electronic device may identify a second virtual plane spaced apart from the center point of the second lens of the second camera by the focal length of the second lens in the first direction.

In operation 3905, the electronic device may identify a first intersection point between a first straight line extending from the center point of the first lens towards the fixed external object and the first virtual plane.

In operation 3906, the electronic device may identify a second intersection point between a second straight line extending from the center point of the second lens towards the fixed external object, and the second virtual plane.

In operation 3907, the electronic device may determine the geographic location of the fixed external object based on the first intersection point and the second intersection point. For example, the electronic device may determine the relative location of the fixed external object with respect to the location of the vehicle, based on the first intersection point and the second intersection point. The electronic device may obtain the location of the vehicle through the GPS communication circuitry. The electronic device may determine the geographic location of the fixed external object, based on the location of the vehicle and the relative location of the fixed external object.

In operation 3908, the electronic device may transmit the information on the geographic location of the fixed external object to the server. For example, the information on the geographic location of the fixed external object may be sent to a server to add the content corresponding to the fixed external object onto the electronic map.

Figure 40:
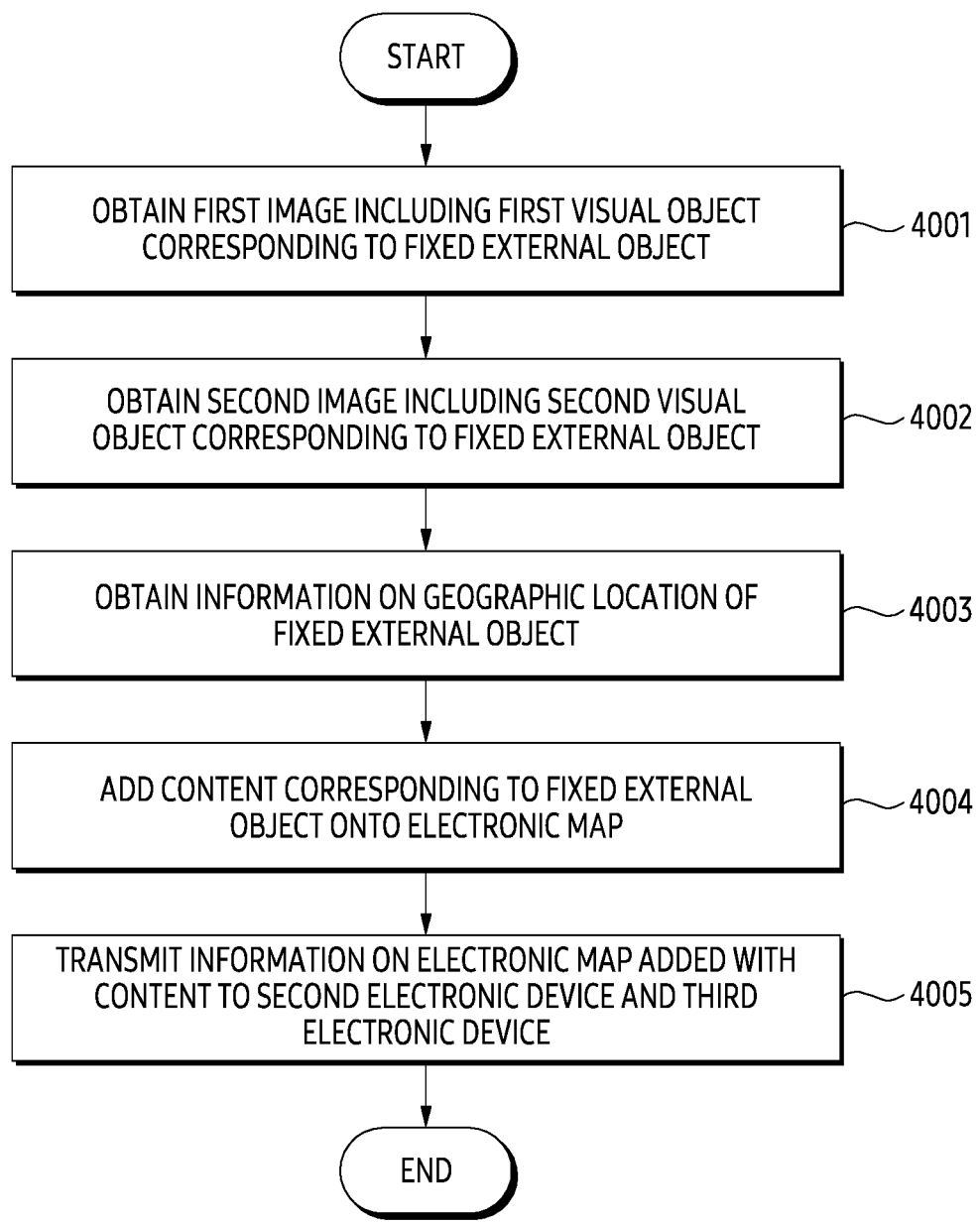
FIG. 40 shows an example of an operation of a first electronic device according to various embodiments.

FIG. 40 shows an example of an operation of the first electronic device according to various embodiments of the present disclosure.

Referring now to FIG. 40, the first electronic device may be related to the server 2400 of FIG. 24.

In operation 4001, the first electronic device may obtain, from the second electronic device, a first image including a first visual object corresponding to the fixed external object.

In operation 4002, the first electronic device may obtain, from the third electronic device, a second image including a second visual object corresponding to the fixed external object.

In operation 4003, the first electronic device may obtain information on the geographic location of the fixed external object, based on the first image and the second image.

According to an embodiment, the first electronic device may classify a plurality of visual objects included in the first image and the second image into one of a static object and a dynamic object, respectively, based on the first image and the second image. The first electronic device may identify a first visual object corresponding to the fixed external object of at least one visual object classified as the static object.

The first electronic device may estimate (or identify) the type of the first visual object based on e.g., a machine learning model. The first electronic device may learn the type of the first visual object based on the machine learning model. The training of the machine learning model may include adjusting weights between a plurality of nodes included in neural networks (such as, for example, a feed-forward neural network, a convolution neural network (CNN), a recurrent neural network (RNN), and/or a long-short term memory Model (LSTM)), based on supervised learning basics and/or unsupervised learning basics.

According to an embodiment, the first electronic device may receive, from the second electronic device, additional information for obtaining the information on the first geographic location of the fixed external object through the first image. The first electronic device may obtain the information on the first geographic location of the fixed external object, by analyzing the first image based on the additional information. For example, the first electronic device may receive, from the second electronic device, information on the focal length of the camera of the second electronic device and information on a geographic location at which the first image is captured.

The first electronic device may receive, from the third electronic device, additional information for obtaining information on the second geographic location of the fixed external object through the second image. The first electronic device may obtain information on the second geographic location of the fixed external object, by analyzing the second image based on the additional information.

The first electronic device may obtain the information on the geographic location of the fixed external object, based on the information on the first geographic location and the information on the second geographic location. The information on the geographic location of the fixed external object may be obtained based on the average of the information on the first geographic location and the information on the second geographic location.

According to an embodiment, the first electronic device may receive information on the first geographic location of the fixed external object from the second electronic device. The first electronic device may receive information on the second geographic location of the fixed external object from the third electronic device. The first electronic device may obtain information on a calibrated geographic location of the fixed external object, based on the information on the first geographic location and the information on the second geographic location.

In operation 4004, the first electronic device may add the content corresponding to the fixed external object onto the electronic map, based on the information on the geographic location of the fixed external object. In other words, the first electronic device may update the electronic map by adding the content corresponding to the fixed external object onto to the electronic map.

In operation 4005, the first electronic device may transmit, to the second electronic device and the third electronic device, information on the electronic map added with the content corresponding to the fixed external object.

Heretofore, the description has been made of an example of the electronic device within the vehicle performing the operations illustrated through the description of FIGS. 23 to 40, but it is only for convenience of description. The operations exemplified through the descriptions of FIGS. 23 to 40 may be performed by an electronic device (e.g., a server, etc.) located outside the vehicle.

As described above, the electronic device disposed within a moving vehicle according to various embodiments of the present disclosure may include at least one camera, a sensing circuit including a transmitter configured to emit a signal and a receiver configured to receive a reflected signal of the signal, a communication circuitry, and a processor operatively connected with the camera, the sensing circuit and the communication circuitry, wherein the processor is configured to: obtain an image including a plurality of visual objects each corresponding to a plurality of external objects, through the camera; identify a visual object corresponding to a fixed external object of the plurality of visual objects, based on a result of analysis of the obtained image, to obtain information on the visual object; and transmit, to a server, information on a distance between the fixed external object and the electronic device, and information on the visual object, obtained through the sensing circuit, wherein the information on the distance between the fixed external object and the electronic device, and the information on the visual object may be transmitted to the server in order to add a first content corresponding to the fixed external object onto an electronic map.

According to an embodiment, the processor may be further configured to identify whether the first content exists at a location on the electronic map corresponding to a geographic location of the fixed external object, and obtain the image including the plurality of visual objects, based on whether the first content exists.

According to an embodiment, the electronic device may further include a display.

According to an embodiment, the processor may be further configured to receive information for displaying the first content on the electronic map, within an application for displaying the electronic map, and display the electronic map with the first content being added thereto.

According to an embodiment, the processor may be further configured to identify whether a second content on a location on the electronic map corresponding to the location of the fixed external object is related to the fixed external object, and obtain the image including the plurality of visual objects, based on whether the second content is related to the fixed external object.

According to an embodiment, the electronic device may further include a global positioning system (GPS) communication circuitry.

According to an embodiment, the processor may be further configured to obtain information on the geographic location of the electronic device, through the GPS communication circuitry, identify the information on the geographic location of the fixed external object, based on the information on the geographic location of the electronic device and the information on the distance between the fixed external object and the electronic device, and transmit the information on the geographic location of the fixed external object to the server.

According to an embodiment, the information on the visual object may include data on a shape of the fixed external object, data on a type of the fixed external object, and data on a function of the fixed external object.

According to an embodiment, the processor may be further configured to obtain information on a width of the fixed external object, based on the visual object.

According to an embodiment, the data on the type of the fixed external object may be determined through a machine learning model, based on the information on the width of the fixed external object.

According to an embodiment, the processor may be further configured to obtain information on a distance between the fixed external object and the electronic device, based on a width of the visual object and a focal length of the camera.

According to an embodiment, the processor may be further configured to classify a plurality of visual objects into one of a dynamic object and a static object, based on a result of analysis on the obtained image.

According to an embodiment, the processor may be further configured to receive, from an external electronic device, information on a distance between the fixed external object and the external electronic device, obtain information on the geographic location of the fixed external object, based the information on the distance between the fixed external object and the electronic device, and the information on the distance between the fixed external object and the external electronic device, and transmit the information on the geographic location of the fixed external object to the server.

According to an embodiment, the processor may be further configured to identify that the external electronic device is located within a predetermined radius of the electronic device, and based on identifying that the external electronic device is located within the predetermined radius of the electronic device, establish a connection with the external electronic device.

According to an embodiment, the processor may be further configured to transmit the obtained image to the server, and receive information on a result of analysis of the obtained image from the server.

According to an embodiment, the obtained image may be used to extract a plurality of feature points together with a reference image, and the plurality of feature points may be points at which image brightness changes rapidly in the reference image or the obtained image and include an edge of a pixel, or a corner point.

According to an embodiment, the plurality of feature points may include a plurality of first feature points extracted from the reference image and a plurality of second feature points extracted from the obtained image.

According to an embodiment, the processor may be further configured to transmit, to the server, information on an angle at which the obtained image was captured and information on a direction in which the obtained image was captured, together with the obtained image.

According to an embodiment, the processor may be further configured to obtain information on the width of the lane in which the moving vehicle is located, obtain information on the width of the fixed external object based on the information on the width of the lane, and transmit the information on the width of the lane of the fixed external object to the server.

According to an embodiment, the processor may be further configured to receive, from the fixed external object, information on the geographic location of the fixed external object and information on the fixed external object, and transmit, to the server, the information on the geographic location of the fixed external object and the information on the fixed external object.

According to an embodiment, the information on the geographic location of the fixed external object and the information on the fixed external object may be transmitted to the server in order to add a first content corresponding to the fixed external object onto the electronic map.

An electronic device within a moving vehicle according to various embodiments of the present disclosure may include at least one camera, a communication circuitry and a processor operatively connected to the camera and the communication circuitry, wherein the processor may be configured to: obtain, at a first location, a first image corresponding to the exterior of the vehicle through the camera, while the electronic device is moving in a first direction; identify a first visual object corresponding to a fixed external object of a plurality of visual objects included in the first image; identify a first virtual plane spaced apart from a center point of a lens of the camera by a focal length of the lens in the first direction, while the electronic device is located in the first location; identify, in the first location, a first intersection point between a first straight line extending from the center point of the lens towards the fixed external object and the first virtual plane; after moving in the first direction from the first location, obtain a second image at a second location, through the camera, corresponding to the exterior of the vehicle; identify a second visual object corresponding to the fixed external object among the plurality of visual objects included in the second image; while the electronic device is located in the second location, identify a second virtual plane spaced apart from the center point of the lens of the camera by the focal length of the lens in the first direction; identify, in the second location, a second intersection point between a second straight line extending from the center point of the lens towards the fixed external object and the second virtual plane; determine a geographic location of the fixed external object based on the first intersection point and the second intersection point; and transmit the information on the geographic location of the fixed external object to the server.

According to an embodiment, the information on the geographic location of the fixed external object may be transmitted to the server in order to add the content corresponding to the fixed external object onto an electronic map.

According to an embodiment, the electronic device may further include a global positioning system (GPS) communication circuitry.

According to an embodiment, the processor may be further configured to identify the first location and the second location through the GPS communication circuitry, determine a relative location of the fixed external object with respect to the second location, based on the first intersection point and the second intersection point, and determine the geographic location of the fixed external object based on the determined relative location.

According to an embodiment, the electronic device may further include a speedometer.

According to an embodiment, the processor may be configured to identify speed information of the electronic device between the first location and the second location, measured through the speedometer, identify time information required for the electronic device to move from the first location to the second location, obtain a distance between the first location and the second location, based on the speed information and the time information, and determine the geographic location of the fixed external object, based on the obtained distance between the first location and the second location.

According to an embodiment, the processor may be further configured to obtain, in the first location, information on the width of the lane in which the vehicle is moving, identify an angle between the first direction and the first straight line, and determine the geographic location of the fixed external object based on the width of the lane and the angle.

According to an embodiment, the processor may be further configured to obtain data on a type of the fixed external object, based on the first visual object and the second visual object, and transmit the data on the type of the fixed external object to the server.

An electronic device within a vehicle moving in a first direction according to various embodiments of the present disclosure may include a first camera, a second camera spaced apart from the first camera by a first distance, a communication circuitry, a processor operatively connected to the first camera, the second camera and the communication circuitry, wherein the processor may be configured to: obtain an image corresponding to the exterior of the vehicle through at least one of the first camera and the second camera; identify a visual object corresponding to a fixed external object of a plurality of visual objects included in the image; identify a first virtual plane spaced apart from a center point of a first lens of the first camera by a focus length of the first lens in the first direction; identify a second virtual plane spaced apart from a center point of a second lens of the second camera by a focal length of the second lens in the first direction; identify a first intersection point between a first straight line extending from the center point of the first lens towards the fixed external object and the first virtual plane; identify a second intersection point between a second straight line extending from the center point of the second lens towards the fixed external object and the second virtual plane; determine the geographic location of the fixed external object based on the first intersection point and the second intersection point; and transmit the information on the geographic location of the fixed external object to the server.

According to an embodiment, the information on the geographic location of the fixed external object may be transmitted to the server in order to add the content corresponding to the fixed external object onto an electronic map.

According to various embodiments, a first electronic device may include a memory and a processor operatively connected to the memory, wherein the processor may be configured to: obtain, from a second electronic device, a first image including a first visual object corresponding to a fixed external object; obtain, from a third electronic device, a second image including a second visual object corresponding to the fixed external object; obtain information on the geographic location of the fixed external object, based on the first image and the second image; add a content corresponding to the fixed external object onto an electronic map, based on the information on the geographic location of the fixed external object; and transmit the information on the electronic map with the content being added thereto, to the second electronic device and the third electronic device.

Meanwhile, the control methods according to various exemplary embodiments of the present disclosure set forth heretofore may be implemented in a program and provided to a server or any other similar devices. Accordingly, the respective devices implementing the above-described control methods may access the server or other similar devices, in which the program is stored, for downloading the same.

Further, the control method according to various exemplary embodiments of the present disclosure described above may be implemented in a program and stored and provided in various non-transitory computer-readable mediums. The non-transitory readable medium is not a medium to store data for a short period of time, such as e.g., a register, a cache, a memory, or the like, and it means a medium to semi-permanently stores data and is readable by a computing device. Specifically, the various applications or programs described above may be stored and provided in the non-transitory computer-readable medium such as e.g., a compact disk (CD), a digital versatile disk (DVD), a hard disk, a Blu-ray disk, a universal serial bus (USB), a memory card, a read only memory (ROM), or the like.

Although exemplary embodiments of the present disclosure have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

What is claimed is:

1. An electronic device disposed within a moving vehicle, comprising:
   at least one camera;
   a sensing circuit including a transmitter configured to emit a signal and a receiver configured to receive a reflected signal of the signal;
   a communication circuitry; and
   a processor operatively connected with the camera, the sensing circuit and the communication circuitry, wherein the processor is configured to:
   obtain an image including a plurality of visual objects each corresponding to a plurality of external objects, through the camera;
   transmit the obtained image to a server;
   receive information on a result of analysis of the obtained image from the server;
   identify a visual object corresponding to a fixed external object of the plurality of visual objects, based on the result of analysis of the obtained image, to obtain information on the visual object; and
   transmit, to the server, information on a distance between the fixed external object and the electronic device, and information on the visual object, obtained through the sensing circuit;
   wherein the information on the distance between the fixed external object and the electronic device, and the information on the visual object are transmitted to the server in order to add a first content corresponding to the fixed external object onto an electronic map.

2. The electronic device according to claim 1, wherein the processor is further configured to:
   identify whether the first content exists at a location on the electronic map corresponding to a geographic location of the fixed external object; and
   obtain the image including the plurality of visual objects, based on whether the first content exists.

3. The electronic device according to claim 2, wherein:
   the electronic device further includes a display, and the processor is further configured to:
   receive information for displaying the first content on the electronic map, within an application for displaying the electronic map; and
   display the electronic map with the first content being added thereto.

4. The electronic device according to claim 1, wherein the processor is further configured to:
   identify whether a second content on a location on the electronic map corresponding to the location of the fixed external object is related to the fixed external object; and
   obtain the image including the plurality of visual objects, based on whether the second content is related to the fixed external object.

5. The electronic device according to claim 1, wherein the electronic device further includes a global positioning system (GPS) communication circuitry, and the processor is further configured to:
   obtain information on a geographic location of the electronic device, through the GPS communication circuitry;
   identify information on a geographic location of the fixed external object, based on the information on the geographic location of the electronic device and the information on the distance between the fixed external object and the electronic device; and
   transmit the information on the geographic location of the fixed external object to the server.

6. The electronic device according to claim 1, wherein the information on the visual object includes data on a shape of the fixed external object, data on a type of the fixed external object, and data on a function of the fixed external object.

7. The electronic device according to claim 6, wherein the processor is further configured to obtain information on a width of the fixed external object, based on the visual object.

8. The electronic device according to claim 7, wherein the data on the type of the fixed external object is determined through a machine learning model, based on the information on the width of the fixed external object.

9. The electronic device according to claim 7, wherein the processor is further configured to obtain the information on the distance between the fixed external object and the electronic device, based on a width of the visual object and a focal length of the camera.

10. The electronic device according to claim 1, wherein the processor is further configured to classify the plurality of visual objects into one of a dynamic object and a static object, based on a result of analysis on the obtained image.

11. The electronic device according to claim 1, wherein the processor is further configured to:
    receive, from an external electronic device, the information on the distance between the fixed external object and the external electronic device;
    obtain information on a geographic location of the fixed external object, based the information on the distance between the fixed external object and the electronic device, and the information on the distance between the fixed external object and the external electronic device; and
    transmit the information on the geographic location of the fixed external object to the server.

12. The electronic device according to claim 11, wherein the processor is further configured to:
    identify that the external electronic device is located within a predetermined radius of the electronic device; and
    based on identifying that the external electronic device is located within the predetermined radius of the electronic device, establish a connection with the external electronic device.

13. The electronic device according to claim 1, wherein:
    the obtained image is used to extract a plurality of feature points together with a reference image; and
    the plurality of feature points are points at which image brightness changes rapidly in the reference image or the obtained image and include an edge of a pixel, or a corner point.

14. The electronic device according to claim 13, wherein the plurality of feature points include a plurality of first feature points extracted from the reference image and a plurality of second feature points extracted from the obtained image.

15. The electronic device according to claim 1, wherein the processor is further configured to transmit, to the server, information on an angle at which the obtained image was captured and information on a direction in which the obtained image was captured, together with the obtained image.

16. The electronic device according to claim 1, wherein the processor is further configured to:
    obtain information on a width of the lane in which the moving vehicle is located;

obtain information on the width of the fixed external object, based on the information on the width of the lane; and transmit the information on the width of the lane of the fixed external object to the server.

17. The electronic device according to claim 1, wherein the processor is further configured to:

receive, from the fixed external object, information on a geographic location of the fixed external object and information on the fixed external object; and transmit, to the server, the information on the geographic location of the fixed external object and the information on the fixed external object; and the information on the geographic location of the fixed external object and the information on the fixed external object are transmitted to the server in order to add a first content corresponding to the fixed external object onto the electronic map.

18. A first electronic device comprising:

a memory; and a processor operatively connected to the memory, wherein the processor is configured to:

obtain, from a second electronic device, a first image including a first visual object corresponding to a fixed external object;

obtain, from a third electronic device, a second image including a second visual object corresponding to the fixed external object;

based on the first image and the second image, transmit information on a result of analysis of the first image and the second image to the second electronic device and the third electronic device, obtain information on a geographic location of the fixed external object, based on the result of analysis of the first image and the second image;

add a content corresponding to the fixed external object onto an electronic map, based on the information on the geographic location of the fixed external object; and transmit the information on the electronic map with the content being added thereto, to the second electronic device and the third electronic device.

\* \* \* \* \*